(12) United States Patent
Bridges et al.

(10) Patent No.: US 8,848,203 B2
(45) Date of Patent: Sep. 30, 2014

(54) SIX DEGREE-OF-FREEDOM LASER TRACKER THAT COOPERATES WITH A REMOTE PROJECTOR TO CONVEY INFORMATION

(75) Inventors: Robert E. Bridges, Kennett Square, PA (US); David H. Parker, Earlysville, VA (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/444,043

(22) Filed: Apr. 11, 2012

(65) Prior Publication Data

US 2012/0262728 A1 Oct. 18, 2012

Related U.S. Application Data

(60) Provisional application No. 61/592,049, filed on Jan. 30, 2012, provisional application No. 61/475,703, filed on Apr. 15, 2011.

(51) Int. Cl.

| | |
|---|---|
| *G01B 11/14* | (2006.01) |
| *G01S 7/48* | (2006.01) |
| *G01C 3/08* | (2006.01) |
| *G01C 15/00* | (2006.01) |
| *G01S 17/89* | (2006.01) |
| *G01S 7/491* | (2006.01) |
| *G01S 17/42* | (2006.01) |
| *G01S 7/481* | (2006.01) |
| *G01S 17/66* | (2006.01) |

(52) U.S. Cl.
CPC ............. *G01S 7/4818* (2013.01); *G01S 7/4808* (2013.01); *G01C 3/08* (2013.01); *G01C 15/002* (2013.01); *G01S 17/89* (2013.01); *G01S 7/491* (2013.01); *G01S 17/42* (2013.01); *G01S 7/4813* (2013.01); *G01S 17/66* (2013.01)
USPC .......................................................... 356/614

(58) Field of Classification Search
USPC ...................................... 356/3, 601, 614–624
See application file for complete search history.

(56) References Cited

U.S. PATENT DOCUMENTS

| | | | |
|---|---|---|---|
| 2,682,804 A | 7/1954 | Clifford et al. | |
| 2,784,641 A | 3/1957 | Keuffel et al. | |

(Continued)

FOREIGN PATENT DOCUMENTS

| | | |
|---|---|---|
| CN | 1531659 A | 9/2004 |
| CN | 101031817 A | 9/2007 |

(Continued)

OTHER PUBLICATIONS

Matsumaru, K., "Mobile Robot with Preliminary-announcement and Display Function of Forthcoming Motion using Projection Equipment," Robot and Human Interactive Communication, 2006. ROMAN 2006. The 15th IEEE International Symposium on , vol., No., pp. 443,450, Sep. 6-8, 2006.*

(Continued)

*Primary Examiner* — Tri Ton
*Assistant Examiner* — Willie Merrell, II
(74) *Attorney, Agent, or Firm* — Cantor Colburn LLP

(57) ABSTRACT

A method of conveying information to a user of a coordinate measurement device, includes providing a first target projector, sending a first light beam from the device to a retroreflector; receiving a second light beam from the retroreflector; measuring the orientational and translational sets, the translational set based on the second light beam; selecting first information to be conveyed from the group consisting of one or more positions on the object, a direction indicated by a moving pattern, a message that includes one or more symbols or alphanumeric characters, a hidden feature, a measured object characteristic, a modeled characteristic, a magnified representation of surface characteristics, a pattern having meaning according to a rule, and combinations thereof; determining a first light pattern corresponding to the information; storing the first light pattern; and projecting the first light pattern onto the object based on the translational and orientational sets.

25 Claims, 39 Drawing Sheets

(56) References Cited

U.S. PATENT DOCUMENTS

| | | | |
|---|---|---|---|
| 3,339,457 A | 9/1967 | Pun | |
| 3,365,717 A | 1/1968 | Holscher | |
| 3,464,770 A | 9/1969 | Schmidt | |
| 3,497,695 A | 2/1970 | Smith et al. | |
| 3,508,828 A | 4/1970 | Froome et al. | |
| 3,619,058 A | 11/1971 | Hewlett et al. | |
| 3,627,429 A | 12/1971 | Jaenicke et al. | |
| 3,658,426 A | 4/1972 | Vyce | |
| 3,728,025 A | 4/1973 | Madigan et al. | |
| 3,740,141 A | 6/1973 | DeWitt, Jr. | |
| 3,779,645 A | 12/1973 | Nakazawa et al. | |
| 3,813,165 A | 5/1974 | Hines et al. | |
| 3,832,056 A | 8/1974 | Shipp et al. | |
| 3,900,260 A | 8/1975 | Wendt | |
| 3,914,052 A | 10/1975 | Wiklund | |
| 4,113,381 A | 9/1978 | Epstein | |
| 4,297,030 A | 10/1981 | Chaborski | |
| 4,403,857 A | 9/1983 | Holscher | |
| 4,453,825 A | 6/1984 | Buck et al. | |
| 4,498,764 A | 2/1985 | Bolkow et al. | |
| 4,531,833 A | 7/1985 | Ohtomo | |
| 4,632,547 A | 12/1986 | Kaplan et al. | |
| 4,652,130 A | 3/1987 | Tank | |
| 4,689,489 A | 8/1987 | Cole | |
| 4,692,023 A | 9/1987 | Ohtomo et al. | |
| 4,699,508 A | 10/1987 | Bolkow et al. | |
| 4,707,129 A | 11/1987 | Hashimoto et al. | |
| 4,714,339 A | 12/1987 | Lau et al. | |
| 4,790,651 A | 12/1988 | Brown et al. | |
| 5,002,388 A | 3/1991 | Ohishi et al. | |
| 5,051,934 A | 9/1991 | Wiklund | |
| 5,082,364 A | 1/1992 | Russell | |
| 5,090,131 A | 2/1992 | Deer | |
| 5,162,862 A | 11/1992 | Bartram et al. | |
| 5,319,434 A | 6/1994 | Croteau et al. | |
| 5,400,130 A | 3/1995 | Tsujimoto et al. | |
| 5,402,193 A * | 3/1995 | Choate | 353/80 |
| 5,416,321 A | 5/1995 | Sebastian et al. | |
| 5,440,112 A | 8/1995 | Sakimura et al. | |
| 5,455,670 A | 10/1995 | Payne et al. | |
| 5,534,992 A | 7/1996 | Takeshima et al. | |
| 5,737,068 A | 4/1998 | Kaneko et al. | |
| 5,742,379 A | 4/1998 | Reifer | |
| 5,754,284 A | 5/1998 | Leblanc et al. | |
| 5,764,360 A | 6/1998 | Meier | |
| 5,771,623 A | 6/1998 | Pernstich et al. | |
| 5,861,956 A | 1/1999 | Bridges et al. | |
| 5,880,822 A | 3/1999 | Kubo | |
| 5,886,777 A | 3/1999 | Hirunuma | |
| 5,892,575 A | 4/1999 | Marino | |
| 5,991,011 A | 11/1999 | Damm | |
| 6,017,125 A | 1/2000 | Vann | |
| D427,087 S | 6/2000 | Kaneko et al. | |
| 6,100,540 A | 8/2000 | Ducharme et al. | |
| 6,324,024 B1 | 11/2001 | Shirai et al. | |
| 6,330,379 B1 | 12/2001 | Hendriksen | |
| 6,351,483 B1 | 2/2002 | Chen | |
| 6,369,880 B1 | 4/2002 | Steinlechner | |
| 6,437,859 B1 | 8/2002 | Ohtomo et al. | |
| 6,463,393 B1 | 10/2002 | Giger | |
| 6,490,027 B1 | 12/2002 | Rajchel et al. | |
| 6,532,060 B1 | 3/2003 | Kindaichi et al. | |
| 6,563,569 B2 | 5/2003 | Osawa et al. | |
| 6,583,862 B1 | 6/2003 | Perger | |
| 6,633,367 B2 | 10/2003 | Gogolla | |
| 6,727,984 B2 | 4/2004 | Becht | |
| 6,727,985 B2 | 4/2004 | Giger | |
| 6,765,653 B2 | 7/2004 | Shirai et al. | |
| 6,847,436 B2 | 1/2005 | Bridges | |
| 6,859,744 B2 | 2/2005 | Giger | |
| 6,864,966 B2 | 3/2005 | Giger | |
| 7,023,531 B2 | 4/2006 | Gogolla et al. | |
| 7,095,490 B2 | 8/2006 | Ohtomo et al. | |
| 7,099,000 B2 | 8/2006 | Connolly | |
| 7,177,014 B2 | 2/2007 | Mori et al. | |
| 7,196,776 B2 | 3/2007 | Ohtomo et al. | |
| 7,224,444 B2 | 5/2007 | Stierle et al. | |
| 7,248,374 B2 | 7/2007 | Bridges | |
| 7,256,899 B1 * | 8/2007 | Faul et al. | 356/623 |
| 7,262,863 B2 | 8/2007 | Schmidt et al. | |
| 7,327,446 B2 | 2/2008 | Cramer et al. | |
| 7,336,346 B2 | 2/2008 | Aoki et al. | |
| 7,339,655 B2 | 3/2008 | Nakamura et al. | |
| 7,352,446 B2 | 4/2008 | Bridges et al. | |
| 7,372,558 B2 | 5/2008 | Kaufman et al. | |
| 7,453,554 B2 | 11/2008 | Yang et al. | |
| 7,466,401 B2 | 12/2008 | Cramer et al. | |
| 7,471,377 B2 | 12/2008 | Liu et al. | |
| 7,474,388 B2 | 1/2009 | Ohtomo et al. | |
| 7,480,037 B2 | 1/2009 | Palmateer et al. | |
| 7,492,444 B2 | 2/2009 | Osada | |
| 7,511,824 B2 | 3/2009 | Sebastian et al. | |
| 7,518,709 B2 | 4/2009 | Oishi et al. | |
| 7,535,555 B2 | 5/2009 | Nishizawa et al. | |
| 7,586,586 B2 | 9/2009 | Constantikes | |
| D605,959 S | 12/2009 | Apotheloz | |
| 7,701,559 B2 | 4/2010 | Bridges et al. | |
| 7,738,083 B2 | 6/2010 | Luo et al. | |
| 7,751,654 B2 | 7/2010 | Lipson et al. | |
| 7,800,758 B1 | 9/2010 | Bridges et al. | |
| 7,804,602 B2 | 9/2010 | Raab | |
| 7,812,736 B2 | 10/2010 | Collingwood et al. | |
| D629,314 S | 12/2010 | Ogasawara | |
| 7,929,150 B1 | 4/2011 | Schweiger | |
| 7,990,523 B2 | 8/2011 | Schlierbach et al. | |
| 8,087,315 B2 | 1/2012 | Goossen et al. | |
| 8,314,939 B2 | 11/2012 | Kato | |
| 2002/0093646 A1 | 7/2002 | Muraoka et al. | |
| 2003/0133092 A1 | 7/2003 | Rogers | |
| 2004/0075823 A1 | 4/2004 | Lewis et al. | |
| 2005/0147477 A1 | 7/2005 | Clark | |
| 2006/0066836 A1 | 3/2006 | Bridges et al. | |
| 2006/0103853 A1 * | 5/2006 | Palmateer | 356/601 |
| 2006/0132803 A1 | 6/2006 | Clair et al. | |
| 2006/0145703 A1 | 7/2006 | Steinbichler et al. | |
| 2006/0222237 A1 * | 10/2006 | Du et al. | 382/152 |
| 2007/0016386 A1 | 1/2007 | Husted | |
| 2007/0024842 A1 | 2/2007 | Nishizawa et al. | |
| 2007/0121095 A1 | 5/2007 | Lewis | |
| 2007/0127013 A1 | 6/2007 | Hertzman et al. | |
| 2007/0130785 A1 | 6/2007 | Bublitz et al. | |
| 2007/0247615 A1 | 10/2007 | Bridges | |
| 2008/0203299 A1 | 8/2008 | Kozuma et al. | |
| 2008/0239281 A1 | 10/2008 | Bridges | |
| 2008/0316497 A1 | 12/2008 | Taketomi et al. | |
| 2008/0316503 A1 | 12/2008 | Smarsh et al. | |
| 2009/0009747 A1 | 1/2009 | Wolf et al. | |
| 2009/0046271 A1 | 2/2009 | Constantikes | |
| 2009/0066932 A1 | 3/2009 | Bridges et al. | |
| 2009/0190125 A1 | 7/2009 | Foster et al. | |
| 2010/0058252 A1 * | 3/2010 | Ko | 715/863 |
| 2010/0128259 A1 * | 5/2010 | Bridges et al. | 356/138 |
| 2010/0176270 A1 | 7/2010 | Lau et al. | |
| 2010/0207938 A1 | 8/2010 | Yau et al. | |
| 2010/0245851 A1 | 9/2010 | Teodorescu | |
| 2010/0250175 A1 | 9/2010 | Briggs et al. | |
| 2010/0277747 A1 | 11/2010 | Rueb et al. | |
| 2011/0032509 A1 | 2/2011 | Bridges | |
| 2011/0069322 A1 | 3/2011 | Hoffer, Jr. | |
| 2011/0109502 A1 | 5/2011 | Sullivan | |
| 2011/0166824 A1 | 7/2011 | Haisty et al. | |
| 2011/0169924 A1 | 7/2011 | Haisty et al. | |
| 2011/0173827 A1 | 7/2011 | Bailey et al. | |
| 2011/0175745 A1 | 7/2011 | Atwell et al. | |
| 2012/0262728 A1 | 10/2012 | Bridges et al. | |
| 2013/0096873 A1 | 4/2013 | Rosengaus et al. | |

FOREIGN PATENT DOCUMENTS

| | | |
|---|---|---|
| DE | 3827458 A1 | 2/1990 |
| DE | 202006020299 U1 | 5/2008 |
| EP | 0166106 | 1/1986 |
| EP | 598523 A1 | 5/1994 |
| EP | 1067363 A2 | 1/2001 |

(56) References Cited

FOREIGN PATENT DOCUMENTS

| EP | 1607767 A1 | 12/2005 |
|---|---|---|
| EP | 2177868 A2 | 10/2009 |
| EP | 2259010 A1 | 12/2010 |
| EP | 2259013 A1 | 12/2010 |
| JP | 57147800 | 9/1982 |
| JP | 5804881 | 3/1983 |
| JP | 2184788 | 7/1990 |
| JP | 5302976 | 11/1993 |
| JP | 6097288 | 4/1994 |
| JP | 11337642 | 12/1999 |
| JP | 2000-275042 A | 10/2000 |
| JP | 2001272468 | 10/2001 |
| JP | 2002098762 | 4/2002 |
| JP | 2004527751 | 9/2004 |
| JP | 2008514967 | 5/2008 |
| WO | 0177613 A1 | 10/2001 |
| WO | 02084327 | 10/2002 |
| WO | 2003062744 A1 | 7/2003 |
| WO | 2004/636668 | 7/2004 |
| WO | 2007/084209 | 7/2007 |
| WO | 2008052348 A1 | 5/2008 |
| WO | 2008119073 A2 | 10/2008 |
| WO | 2010141120 A2 | 12/2010 |
| WO | 2010148525 A1 | 12/2010 |
| WO | 2011/035290 | 3/2011 |

OTHER PUBLICATIONS

Office Action for Japanese Patent Application No. 2010-176909 filed Aug. 6, 2010; issued on Mar. 19, 2013.
Optical Circulator (3-Ports & 4-Ports); [on-line technical data sheet]; Alliance Fiber Optic Products, Inc. REV.D Jan. 15, 2004; Retrieved from www.afop.com.
Super-Nyquist Operation of the AD9912 Yields a High RF Output Signal; Analog Devices, Inc., AN-939 Application Note; www.analog.com; Copyright 2007.
Nanona High Speed & Low Loss Optical Switch; [on-line technical data sheet]; [Retrieved Oct. 14, 2010]; Retrieved from http://www.bostonati.com/products/PI-FOS.pdf.
Making the Big Step from Electronics to Photonics by Modulating a Beam of Light with Electricity; May 18, 2005; [on-line]; [Retrieved May 7, 2009]; Cornell University News Service; Retrieved from http://www.news.cornell.edu/stories/May05/LipsonElectroOptical.ws.html.
EOSpace—High-Speed Switches; [on-line technical brochure]; [Retrieved May 18, 2009]; Retrieved from http://www.cospace.com/Switches.htm.
FARO Laser Tracker ION; 2 pages; revised Apr. 23, 2010; FARO Technologies, Inc., www.lasertracker.faro.com.
Great Britain Search Report for Application No. GB1013200.9 dated Nov. 22, 2010.
AO Modulator—M040-8J-FxS; [online—technical data sheet]; Gooch & Housego; Nov. 2006; Retrieved from http://www.goochandhousego.com/.
2×2 High Speed Lithium Niobate Interferometric Switch; [on-line]; JDS Uniphase Corporation; 2007; Retrieved from www.jdsu.com.
Integrated Optical Amplitude Modulator; [on-line technical data sheet]; [Retrieved Oct. 14, 2010]; Jenoptik; Retrieved from http://www.jenoptik.com/cms/products.nsf/0/A6DF20B50AEE7819C12576FE0074E8E6/$File/amplitudemodulators_en.pdf?Open.
Kester, Walt, Practical Analog Design Techniques, Analog Devices, Section 5, Undersampling Applications, Copyright 1995, pp. 5-1 to 5-34.
Optical Circulators Improve Bidirectional Fiber Systems; by Jay S. Van Delden; [online]; [Retrieved May 18, 2009]; Laser Focus World; Retrieved from http://www.laserfocusworld.com/display_article/28411/12/nonc/nonc/News/Optical-circulators-improve-bidirectional-fiber-systems.
Leica Absolute Tracker AT401-ASME B89.4.19-2006 Specifications; Hexagon Metrology; Leica Geosystems Metrology Products, Switzerland; 2 pages; www.leica-geosystems.com/metrology.

Lightvision—High Speed Variable Optical Attenuators (VOA); [on-line]; A publication of Lightwaves 2020, Feb. 1, 2008; Retrieved from http://www.lightwaves2020.com/home/.
LaserTRACER-measuring sub-micron in space; http://www.etalon-ag.com/index.php/en/products/lasertracer; 4 pages; Jun. 28, 2011; ETALON AG.
Computer Giants Embrace On-Chip Optics; Mar. 27, 2008; [on-line]; Optics.org; [Retrieved on Apr. 2, 2008]; Retrieved from http://optics.org/cws/article/research/33521.
MEMS Variable Optical Attenuators Single/Multi-Channel; [on-line]; Jan. 17, 2005; Retrieved from www.ozoptics.com.
PCMM System Specifications Leica Absolute Tracker and Leica T-Products; Hexagon Metrology; Leica Geosystems Metrology Products, Switzerland; 8 pages; www.leica-geosystems.com/metrology.
Poujouly, Stephane, et al., Digital Laser Range Finder: Phase-Shift Estimation by Undersampling Technique; IEEE, Copyright 1999.
RS Series Remote Controlled Optical Switch; [on-line technical data sheet]; Sercalo Microtechnology, Ltd. [Retrieved Oct. 14, 2010]; Retrieved from http://www.sercalo.com/document/PDFs/DataSheets/RS%20datasheet.pdf.
Tracker3; Ultra-Portable Laser Tracking System; 4 pages; 2010 Automated Precision Inc.; www.apisensor.com.
International Search Report of the International Searching Authority for Application No. PCT/US2012/032970; Date of Mailing Nov. 28, 2012.
International Search Report of the International Searching Authority for Application No. PCT/US2012/032972; Date of Mailing Nov. 28, 2012.
International Search Report of the International Searching Authority for Application No. PCT/US2012/032990; Date of Mailing Dec. 4, 2012.
Written Opinion of the International Searching Authority for Application No. PCT/US2012/032970; Date of Mailing Nov. 28, 2012.
Written Opinion of the International Searching Authority for Application No. PCT/US2012/032972; Date of Mailing Nov. 28, 2012.
Written Opinion of the International Searching Authority for Application No. PCT/US2012/032990; Date of Mailing Dec. 4, 2012.
International Search Report of the International Searching Authority for Application No. PCT/US2012/034611; Date of Mailing Dec. 13, 2012.
Written Opinion of the International Searching Authority for Application No. PCT/US2012/034611; Date of Mailing Dec. 13, 2012.
Japanese Patent Application No. 2010-176909 filed Aug. 6, 2010; issued on Oct. 23, 2012. All art cited within.
Chen, Junewen, "Novel Laser Range Finding Algorithms", Proceedings of SPIE, vol. 6100, Jan. 1, 2006, pp. 61001Q-61001Q-8, XP55031002, ISSN: 0277-786X, DOI: 10.1117/12.645131, the whole document.
International Search Report of the International Searching Authority for PCT/US2012/032715; Date of Mailing Jul. 5, 2012.
Ou-Yang, Mang, et al., "High-Dynamic-Range Laser Range Finders Based on a Novel Multimodulated Frequency Method", Optical Engineering, vol. 45, No. 12, Dec. 2006, p. 123603, XP55031001, ISSN: 0091-3286, DOI: 10.1117/1.2402517, the whole document.
Poujouly, Stephane, et al., "A Twofold Modulation Frequency Laser Range Finder", Journal of Optics A: Pure and Applied Optics, Institute of Physics Publishing, Bristol, GB, vol. 4, No. 6, Nov. 1, 2002, pp. S356-S363, XP020080997, ISSN: 1464-4258, DOI: 10.1088/1464-4258/4/6/380, the whole document.
Written Opinion of the International Searching Authority for PCT/US2012/032715; Date of Mailing Jul. 5, 2012.
International Search Report of the International Searching Authority for Application No. PCT/US2012/030835; Date of Mailing Jul. 23, 2012.
International Search Report of the International Searching Authority for Application No. PCT/US2012/031368; Date of Mailing Jul. 18, 2012.
International Search Report of the International Searching Authority for Application No. PCT/US2012/033477; Date of Mailing Jul. 20, 2012.
Leica Laser Tracker System, Leica Geosystems AG, Jan. 1, 1999, XP002678836, Retrieved from the Internet:.URL:http://www.a-so-

(56) References Cited

OTHER PUBLICATIONS lution.com.au/pages/downloads/LTD500_Brochure_EN.pdf [retrieved on 2012] the whole document.
Written Opinion of the International Searching Authority for Application No. PCT/US2012/030835; Date of Mailing Jul. 23, 2012.
Written Opinion of the International Searching Authority for Application No. PCT/US2012/031368; Date of Mailing Jul. 18, 2012.
Written Opinion of the International Searching Authority for Application No. PCT/US2012/033477; Date of Mailing Jul. 20, 2012.
International Search Report of the International Searching Authority for Application No. PCT/2012/030225; Date of Mailing Sep. 28, 2012.
International Search Report of the International Searching Authority for Application No. PCT/US2012/032971; Date of Mailing Sep. 3, 2012.
International Search Report of the International Searching Authority for Application No. PCT/US2012/0033435; Date of Mailing Sep. 17, 2012.
International Search Report of the International Seracrhing Aurhority for Application No. PCT/YS2012/033720; Date of Mailing Sep. 26, 2012.
Written Opinion of the International Searching Authority for Application No. PCT/US2012/030225; Date of Mailing Sep. 28, 2012.
Written Opinion of the International Searching Authority for Application No. PCT/US2012/032971; Date of Mailing Sep. 3, 2012.
Written Opinion of the International Searching Authority for Application No. PCT/US2012/033435; Date of Mailing Sep. 17, 2012.
Written Opinion of the International Searching Authority for Application No., PCT/US2012/033720; Date of Mailing Sep. 26, 2012.
Chinese Office Action issued Sep. 22, 2013 for Patent Application No. 201010251189.3.
Chinese Search Report for Chinese Patent Application No. 2010102511893; Dated Sep. 10, 2013.
International Preliminary Report on Patentability for International Application Serial No. PCT/US2012/030225. International filing date Mar. 23, 2012. Date of Issuance Oct. 15, 2013.
International Preliminary Report on Patentability for International Application Serial No. PCT/US2012/030835. International filing date Mar. 28, 2012. Date of Issuance Oct. 15, 2013.
International Preliminary Report on Patentability for International Application Serial No. PCT/US2012/032715. International filing date Apr. 9, 2012. Date of Issuance Oct. 15, 2013.
International Preliminary Report on Patentability for International Application Serial No. PCT/US2012/032970. International filing date Apr. 11, 2012. Date of Issuance Oct. 15, 2013.
International Preliminary Report on Patentability for International Application Serial No. PCT/US2012/032971. International filing date Apr. 11, 2012. Date of Issuance Oct. 15, 2013.
International Preliminary Report on Patentability for International Application Serial No. PCT/US2012/032972. International filing date Apr. 11, 2012. Date of Issuance Oct. 15, 2013.
International Preliminary Report on Patentability for International Application Serial No. PCT/US2012/032990. International filing date Apr. 11, 2012. Date of Issuance Oct. 15, 2013.
International Preliminary Report on Patentability for International Application Serial No. PCT/US2012/033435. International filing date Apr. 13, 2012. Date of Issuance Oct. 15, 2013.
International Preliminary Report on Patentability for International Application Serial No. PCT/US2012/033477. International filing date Apr. 13, 2012. Date of Issuance Oct. 15, 2013.
International Preliminary Report on Patentability for International Application Serial No. PCT/US2012/033720. International filing date Apr. 16, 2012. Date of Issuance Oct. 15, 2013.
International Preliminary Report on Patentability for International Application Serial No. PCT/US2012/031368. International filing date Mar. 30, 2012. Date of Issuance Oct. 15, 2013.
Office Action for Japanese Patent Application No. 2014-505151 filed Oct. 11, 2013; issued on Apr. 30, 2014.

* cited by examiner

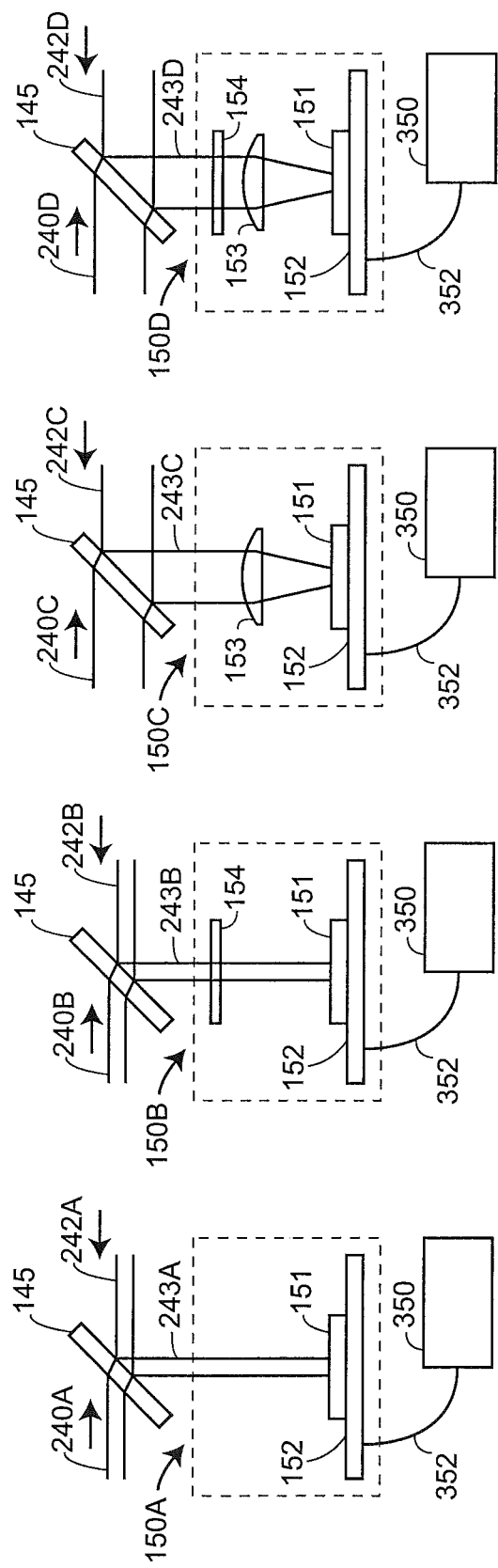

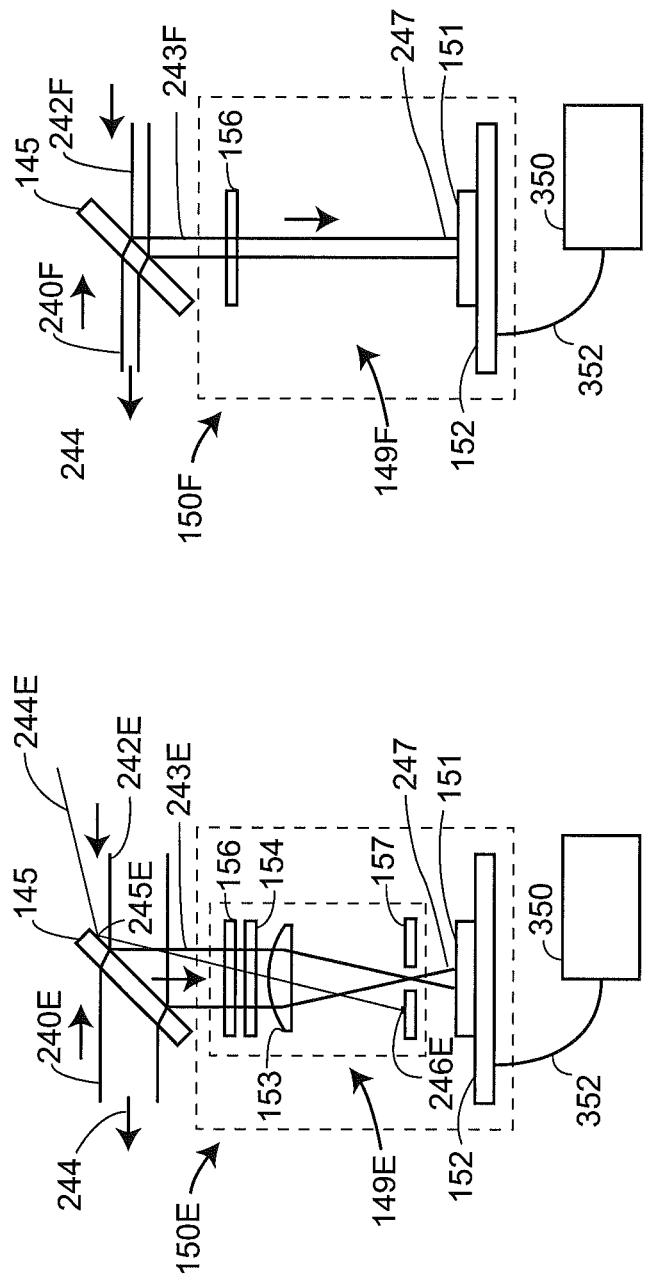

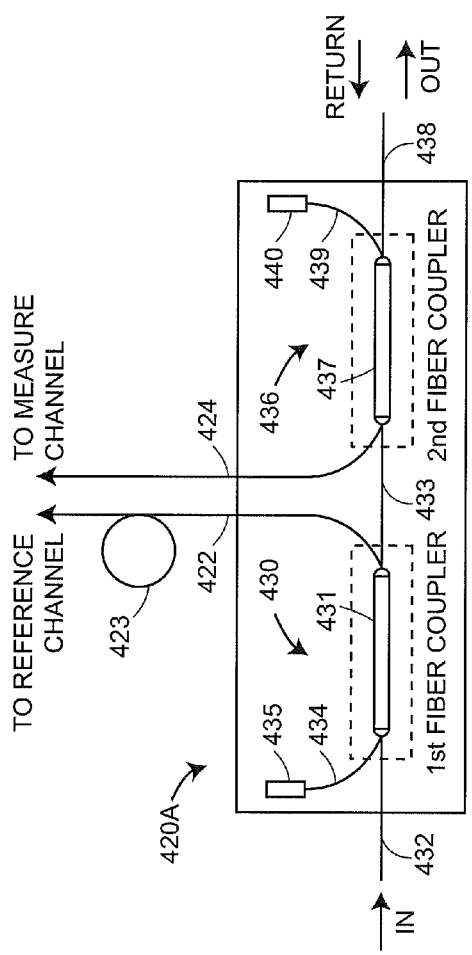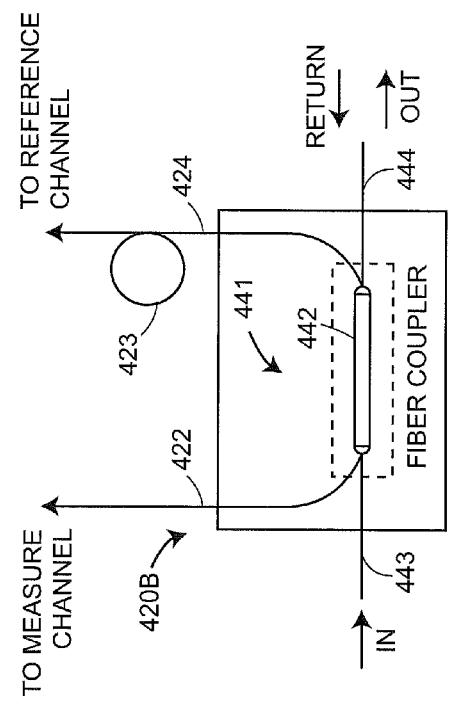
PRIOR ART
FIGURE 8A
PRIOR ART
FIGURE 8B

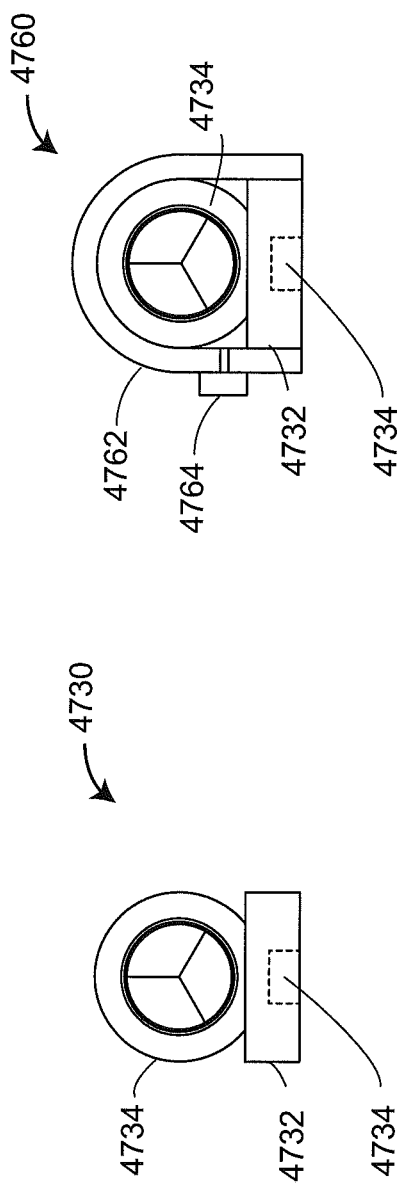

SIX DEGREE-OF-FREEDOM LASER TRACKER THAT COOPERATES WITH A REMOTE PROJECTOR TO CONVEY INFORMATION

CROSS REFERENCE TO RELATED APPLICATIONS

The present application claims the benefit of U.S. Provisional Patent Application No. 61/592,049 filed Jan. 30, 2012, and U.S. Provisional Patent Application No. 61/475,703 filed Apr. 15, 2011, the entire contents of both of which are hereby incorporated by reference.

BACKGROUND

The present disclosure relates to a coordinate measuring device. One set of coordinate measurement devices belongs to a class of instruments that measure the three-dimensional (3D) coordinates of a point by sending a laser beam to the point. The laser beam may impinge directly on the point or on a retroreflector target in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. Coordinate-measuring devices closely related to the laser tracker are the laser scanner and the total station. The laser scanner steps one or more laser beams to points on a surface. It picks up light scattered from the surface and from this light determines the distance and two angles to each point. The total station, which is most often used in surveying applications, may be used to measure the coordinates of diffusely scattering or retroreflective targets. Hereinafter, the term laser tracker is used in a broad sense to include laser scanners and total stations.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner, as described in more detail below. Some laser trackers contain only an ADM without an interferometer. U.S. Pat. No. 7,352,446 ('446) to Bridges et al., the contents of which are herein incorporated by reference, describes a laser tracker having only an ADM (and no IFM) that is able to accurately scan a moving target. Prior to the '446 patent, absolute distance meters were too slow to accurately find the position of a moving target.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest.

Angle measuring devices such as angular encoders are attached to the mechanical axes of the tracker. The one distance measurement and two angle measurements performed by the laser tracker are sufficient to completely specify the three-dimensional location of the SMR.

Several laser trackers are available or have been proposed for measuring six, rather than the ordinary three, degrees of freedom. Exemplary six degree-of-freedom (six-DOF) systems are described by U.S. Pat. No. 7,800,758 (758) to Bridges et al., the contents of which are herein incorporated by reference, and U.S. Published Patent Application 2010/0128259 to Bridges et al., the contents of which are herein incorporated by reference.

There is a need for new types of six-DOF accessories that provide a wide variety of capabilities when used with six-DOF laser trackers.

SUMMARY

According to an embodiment of the present invention, a method of measuring three or more surface sets on an object surface with a coordinate measurement device and a target scanner, each of the three of more surface sets being three-dimensional coordinates of a point on the object surface in a device frame of reference, each surface set including three values, the device frame of reference being associated with the coordinate measurement device. The method includes the steps of: providing the target scanner having a body, a first retroreflector, a projector, a camera, and a scanner processor, wherein the first retroreflector, projector, and camera are rigidly affixed to the body, and the target scanner is mechanically detached to the coordinate measurement device, wherein the projector includes a source pattern of light and a projector lens, the source pattern of light located on a source plane and including at least three non-collinear pattern elements, the projector lens configured to project the source pattern of light onto the object to form an object pattern of light on the object, each of the at least three non-collinear pattern elements corresponding to at least one surface set, wherein the camera includes a camera lens and a photosensitive array, the camera lens configured to image the object pattern of light onto the photosensitive array as an image pattern of light, the photosensitive array including camera pixels, the photosensitive array configured to produce, for each camera pixel, a corresponding pixel digital value responsive to an amount of light received by the camera pixel from the image pattern of light. The method also includes: providing the coordinate measurement device, the coordinate measurement device configured to measure a translational set and an orientational set, the translational set being values of three translational degrees of freedom of the target scanner in the device frame of reference and the orientational set being values of three orientational degrees of freedom of the target scanner in the device frame of reference, the translational set and the orientational set being sufficient to define a position and orientation of the target scanner in space, the coordinate measurement device configured to send a first beam of light to the first retroreflector and to receive a second beam of light from the first retroreflector, the second beam of light being a portion of the first beam of light, the coordinate measurement device including a device processor, the device processor configured to determine the orientational set and the translational set, the translation set based at least in part on the second beam of light, wherein the scanner processor and the device processor are jointly configured to determine the three or more surface sets, each of the surface sets based at least in part on the translational set, the orientational set, and the pixel digital values. The method further includes: selecting the source pattern of light; projecting the source pattern of light onto the object to produce the object pattern of light; imaging the object pattern of light onto the photosensitive array to obtain the image pattern of light; obtaining the pixel digital values for the image pattern of light; sending the first beam of light from the coordinate measurement device to the first retroreflector; receiving the second beam of light from the first retroreflector; measuring the translational set and the orientational set with the coordinate measurement device based at least in part on the second beam of light; determining the surface sets corresponding to each of the at least three non-collinear pattern elements; and saving the surface sets.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 4A and 4B, shows two types of prior art afocal beam expanders;

FIG. 6A-D are schematic figures that show four types of prior art position detector assemblies;

FIGS. 6E and 6F are schematic figures showing position detector assemblies according to embodiments of the present invention;

FIGS. 8A and 8B are schematic figures showing fiber-optic elements within a prior art fiber-optic network;

FIGS. 16, 16A, and 16B are schematic diagrams showing elements of a six-DOF indicator according to an embodiment of the present invention;

DETAILED DESCRIPTION

Figure 1:
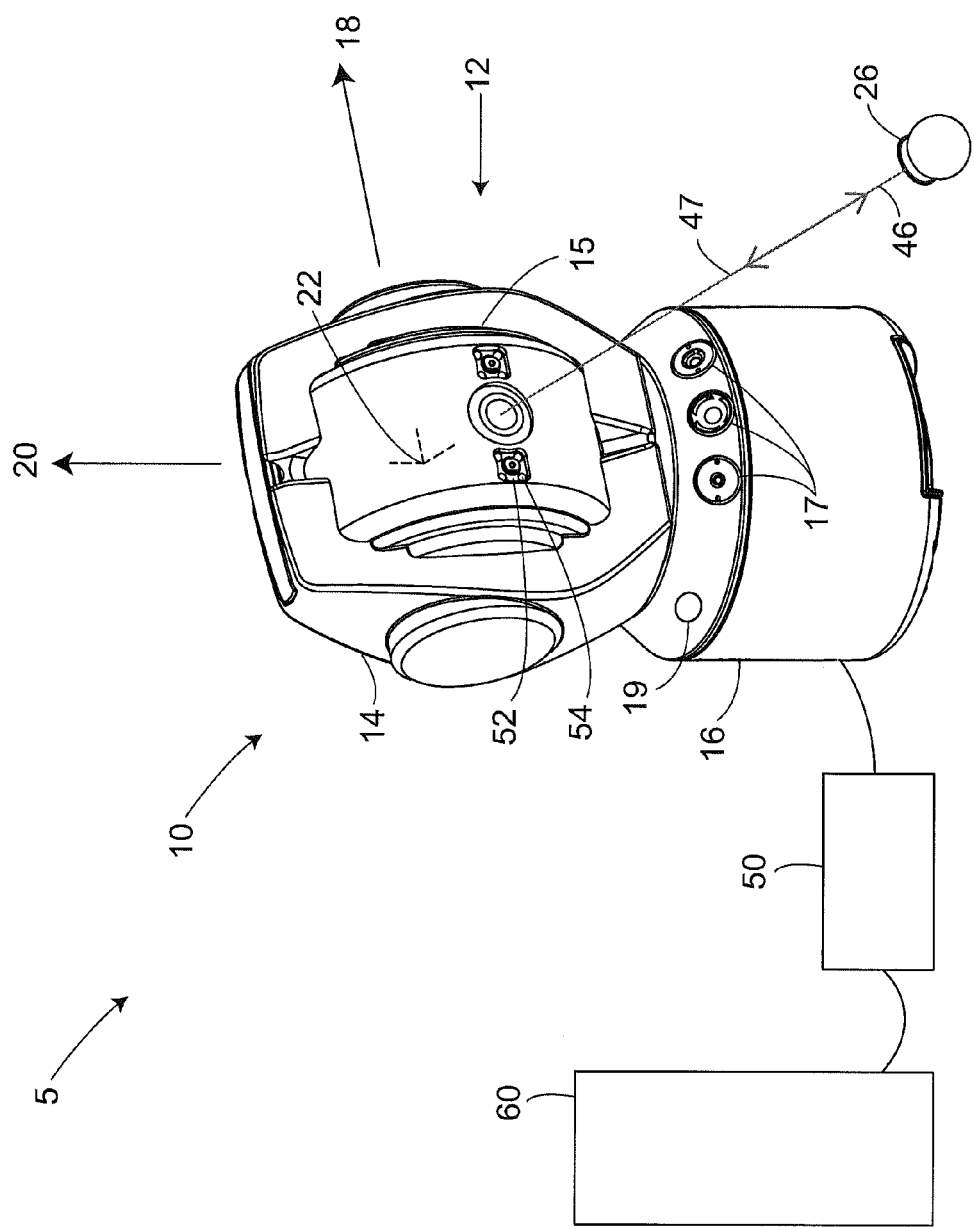
FIG. 1 is a perspective view of a laser tracker system with a retroreflector target in accordance with an embodiment of the present invention.

An exemplary laser tracker system 5 illustrated in FIG. 1 includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A laser beam 46 virtually passes through the gimbal point 22 and is pointed orthogonal to zenith axis 18. In other words, laser beam 46 lies in a plane approximately perpendicular to the zenith axis 18 and that passes through the azimuth axis 20. Outgoing laser beam 46 is pointed in the desired direction by rotation of payload 15 about zenith axis 18 and by rotation of zenith carriage 14 about azimuth axis 20. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing laser beam 46 travels to the retroreflector target 26, which might be, for example, a spherically mounted retroreflector (SMR) as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing laser beam 46 may include one or more laser wavelengths, as described hereinafter. For the sake of clarity and simplicity, a steering mechanism of the sort shown in FIG. 1 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 17 may be included on the laser tracker for resetting the laser tracker to a "home" position for different sized SMRs—for example, 1.5, ⅞, and ½ inch SMRs. An on-tracker retroreflector 19 may be used to reset the tracker to a reference distance. In addition, an on-tracker mirror, not visible from the view of FIG. 1, may be used in combination with the on-tracker retroreflector to enable performance of a self-compensation, as described in U.S. Pat. No. 7,327,446, the contents of which are incorporated by reference.

Figure 2:
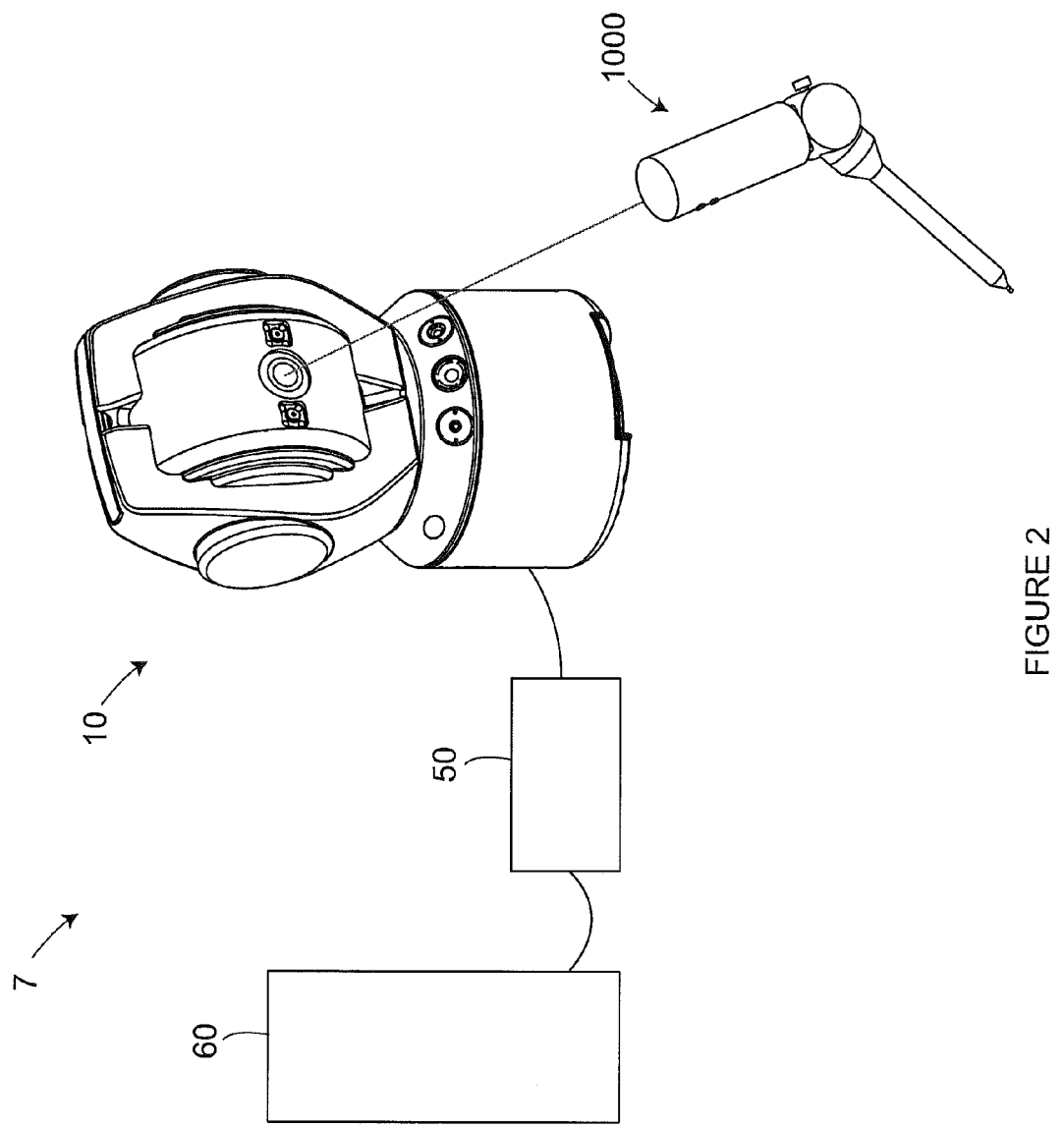
FIG. 2 is a perspective view of a laser tracker system with a six-DOF target in accordance with an embodiment of the present invention.

FIG. 2 shows an exemplary laser tracker system 7 that is like the laser tracker system 5 of FIG. 1 except that retroreflector target 26 is replaced with a six-DOF probe 1000. In FIG. 1, other types of retroreflector targets may be used. For example, a cateye retroreflector, which is a glass retroreflector in which light focuses to a small spot of light on a reflective rear surface of the glass structure, is sometimes used.

Figure 3:
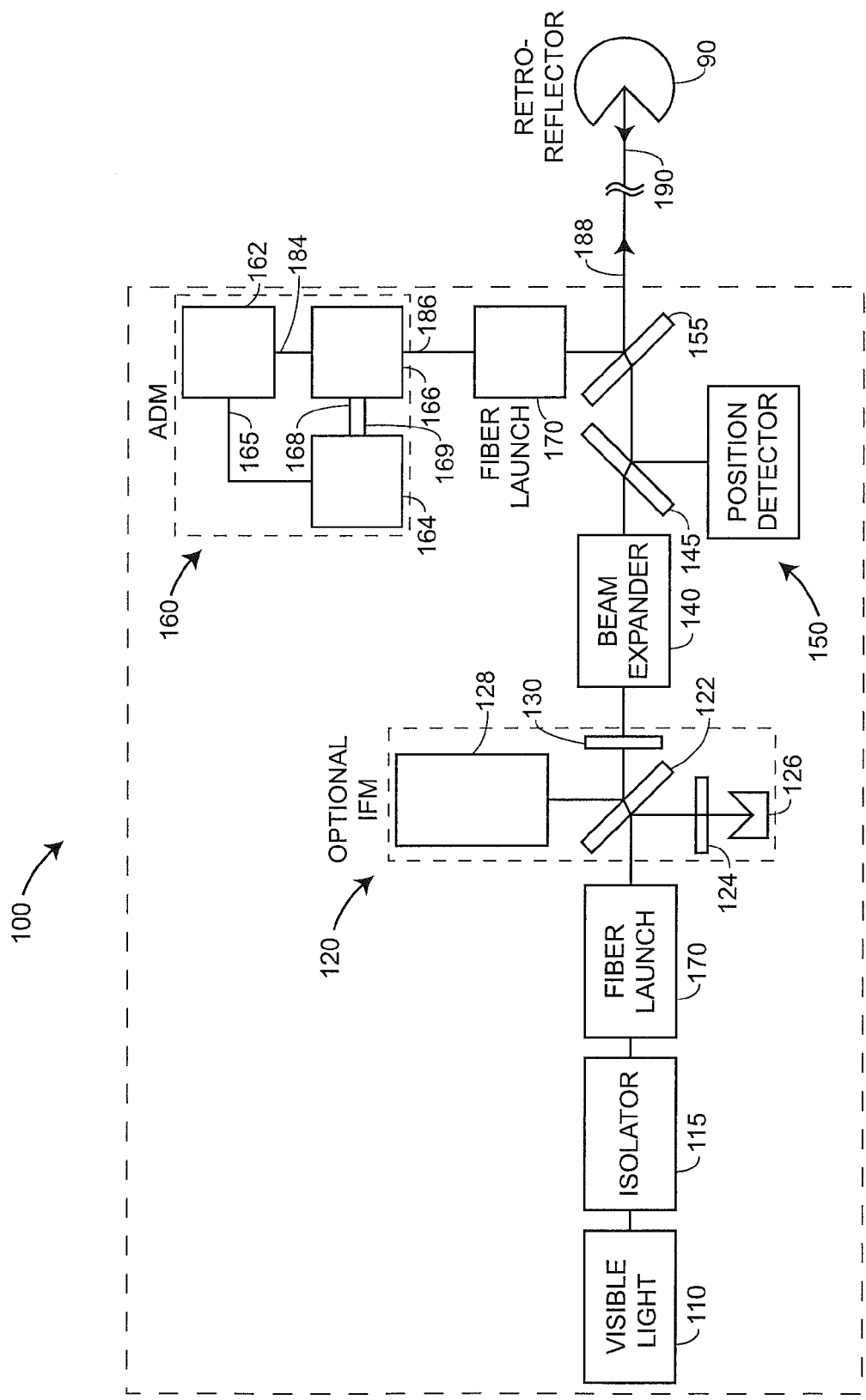
FIG. 3 is a block diagram describing elements of laser tracker optics and electronics in accordance with an embodiment of the present invention.

FIG. 3 is a block diagram showing optical and electrical elements in a laser tracker embodiment. It shows elements of a laser tracker that emit two wavelengths of light—a first wavelength for an ADM and a second wavelength for a visible pointer and for tracking. The visible pointer enables the user to see the position of the laser beam spot emitted by the tracker. The two different wavelengths are combined using a free-space beam splitter. Electrooptic (EO) system 100 includes visible light source 110, isolator 115, optional first fiber launch 170, optional interferometer (IFM) 120, beam expander 140, first beam splitter 145, position detector assembly 150, second beam splitter 155, ADM 160, and second fiber launch 170.

Visible light source 110 may be a laser, superluminescent diode, or other light emitting device. The isolator 115 may be a Faraday isolator, attenuator, or other device capable of reducing the light that reflects back into the light source. Optional IFM may be configured in a variety of ways. As a specific example of a possible implementation, the IFM may include a beam splitter 122, a retroreflector 126, quarter waveplates 124, 130, and a phase analyzer 128. The visible light source 110 may launch the light into free space, the light then traveling in free space through the isolator 115, and optional IFM 120. Alternatively, the isolator 115 may be coupled to the visible light source 110 by a fiber optic cable. In this case, the light from the isolator may be launched into free space through the first fiber-optic launch 170, as discussed herein below with reference to FIG. 5.

Figure 4:
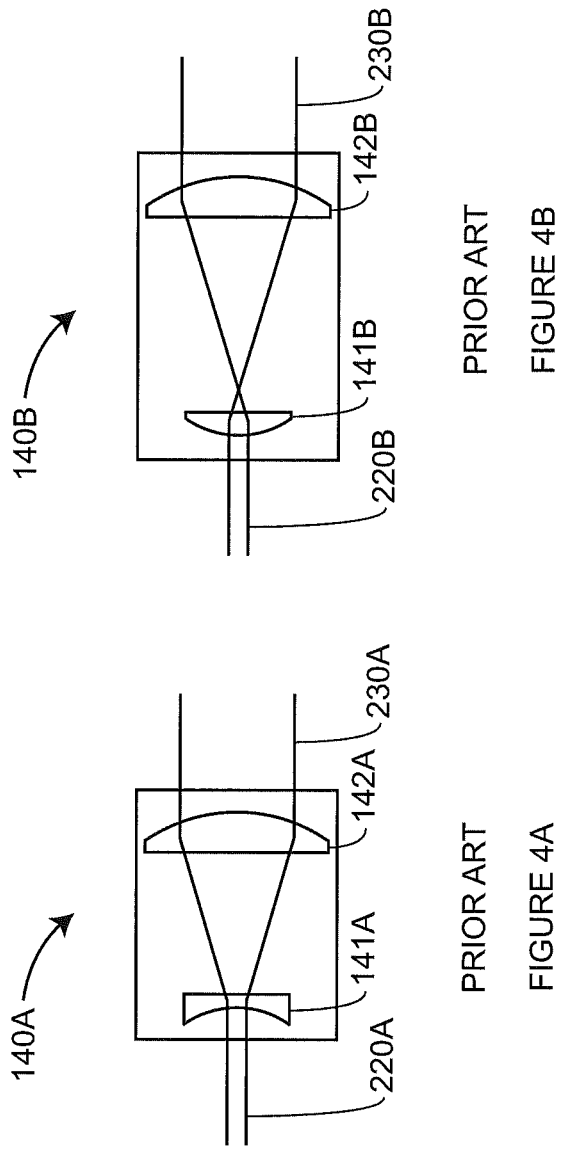
FIG. 4, which includes

Beam expander 140 may be set up using a variety of lens configurations, but two commonly used prior-art configurations are shown in FIGS. 4A, 4B. FIG. 4A shows a configuration 140A based on the use of a negative lens 141A and a positive lens 142A. A beam of collimated light 220A incident on the negative lens 141A emerges from the positive lens 142A as a larger beam of collimated light 230A. FIG. 4B shows a configuration 140B based on the use of two positive lenses 141B, 142B. A beam of collimated light 220B incident on a first positive lens 141B emerges from a second positive lens 142B as a larger beam of collimated light 230B. Of the light leaving the beam expander 140, a small amount reflects off the beam splitters 145, 155 on the way out of the tracker and is lost. That part of the light that passes through the beam splitter 155 is combined with light from the ADM 160 to form a composite beam of light 188 that leaves that laser tracker and travels to the retroreflector 90.

In an embodiment, the ADM 160 includes a light source 162, ADM electronics 164, a fiber network 166, an interconnecting electrical cable 165, and interconnecting optical fibers 168, 169, 184, 186. ADM electronics send electrical modulation and bias voltages to light source 162, which may, for example, be a distributed feedback laser that operates at a wavelength of approximately 1550 nm. In an embodiment, the fiber network 166 may be the prior art fiber-optic network 420A shown in FIG. 8A. In this embodiment, light from the light source 162 in FIG. 3 travels over the optical fiber 184, which is equivalent to the optical fiber 432 in FIG. 8A.

The fiber network of FIG. 8A includes a first fiber coupler 430, a second fiber coupler 436, and low-transmission reflectors 435, 440. The light travels through the first fiber coupler 430 and splits between two paths, the first path through optical fiber 433 to the second fiber coupler 436 and the second path through optical fiber 422 and fiber length equalizer 423. Fiber length equalizer 423 connects to fiber length 168 in FIG. 3, which travels to the reference channel of the ADM electronics 164. The purpose of fiber length equalizer 423 is to match the length of optical fibers traversed by light in the reference channel to the length of optical fibers traversed by light in the measure channel. Matching the fiber lengths in this way reduces ADM errors caused by changes in the ambient temperature. Such errors may arise because the effective optical path length of an optical fiber is equal to the average index of refraction of the optical fiber times the length of the fiber. Since the index of refraction of the optical fibers depends on the temperature of the fiber, a change in the temperature of the optical fibers causes changes in the effective optical path lengths of the measure and reference channels. If the effective optical path length of the optical fiber in the measure channel changes relative to the effective optical path length of the optical fiber in the reference channel, the result will be an apparent shift in the position of the retroreflector target 90, even if the retroreflector target 90 is kept stationary. To get around this problem, two steps are taken. First, the length of the fiber in the reference channel is matched, as nearly as possible, to the length of the fiber in the measure channel. Second, the measure and reference fibers are routed side by side to the extent possible to ensure that the optical fibers in the two channels see nearly the same changes in temperature.

The light travels through the second fiber optic coupler 436 and splits into two paths, the first path to the low-reflection fiber terminator 440 and the second path to optical fiber 438, from which it travels to optical fiber 186 in FIG. 3. The light on optical fiber 186 travels through to the second fiber launch 170.

Figure 5:
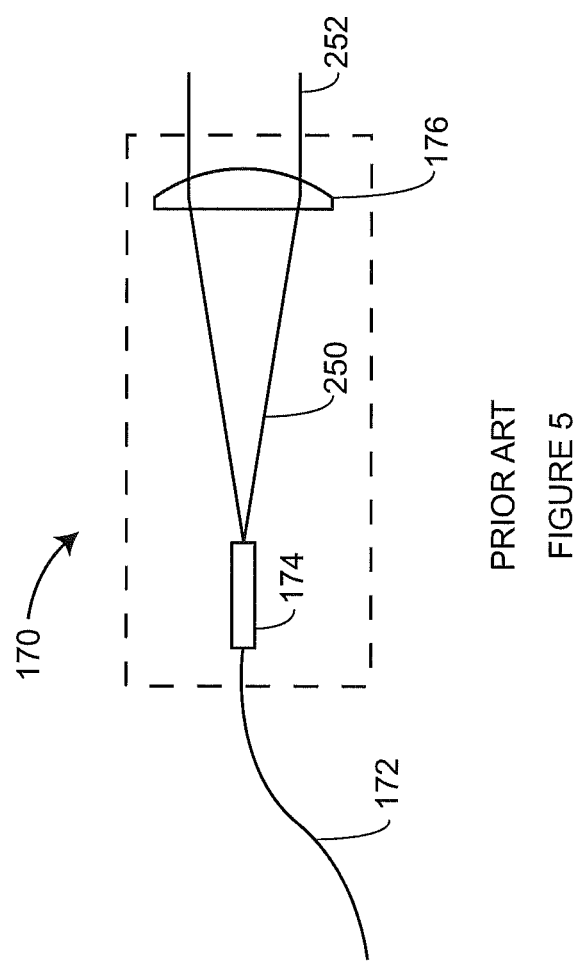
FIG. 5 shows a prior art fiber-optic beam launch.

In an embodiment, fiber launch 170 is shown in prior art FIG. 5. The light from optical fiber 186 of FIG. 3 goes to fiber 172 in FIG. 5. The fiber launch 170 includes optical fiber 172, ferrule 174, and lens 176. The optical fiber 172 is attached to ferrule 174, which is stably attached to a structure within the laser tracker 10. If desired, the end of the optical fiber may be polished at an angle to reduce back reflections. The light 250 emerges from the core of the fiber, which may be a single mode optical fiber with a diameter of between 4 and 12 micrometers, depending on the wavelength of the light being used and the particular type of optical fiber. The light 250 diverges at an angle and intercepts lens 176, which collimates it. The method of launching and receiving an optical signal through a single optical fiber in an ADM system was described in reference to FIG. 3 in patent '758.

Referring to FIG. 3, the beam splitter 155 may be a dichroic beam splitter, which transmits different wavelengths than it reflects. In an embodiment, the light from the ADM 160 reflects off dichroic beam splitter 155 and combines with the light from the visible laser 110, which is transmitted through the dichroic beam splitter 155. The composite beam of light 188 travels out of the laser tracker to retroreflector 90 as a first beam, which returns a portion of the light as a second beam. That portion of the second beam that is at the ADM wavelength reflects off the dichroic beam splitter 155 and returns to the second fiber launch 170, which couples the light back into the optical fiber 186.

In an embodiment, the optical fiber 186 corresponds to the optical fiber 438 in FIG. 8A. The returning light travels from optical fiber 438 through the second fiber coupler 436 and splits between two paths. A first path leads to optical fiber 424 that, in an embodiment, corresponds to optical fiber 169 that leads to the measure channel of the ADM electronics 164 in FIG. 3. A second path leads to optical fiber 433 and then to the first fiber coupler 430. The light leaving the first fiber coupler 430 splits between two paths, a first path to the optical fiber 432 and a second path to the low reflectance termination 435. In an embodiment, optical fiber 432 corresponds to the optical fiber 184, which leads to the light source 162 in FIG. 3. In most cases, the light source 162 contains a built-in Faraday isolator that minimizes the amount of light that enters the light source from optical fiber 432. Excessive light fed into a laser in the reverse direction can destabilize the laser.

Figure 7:
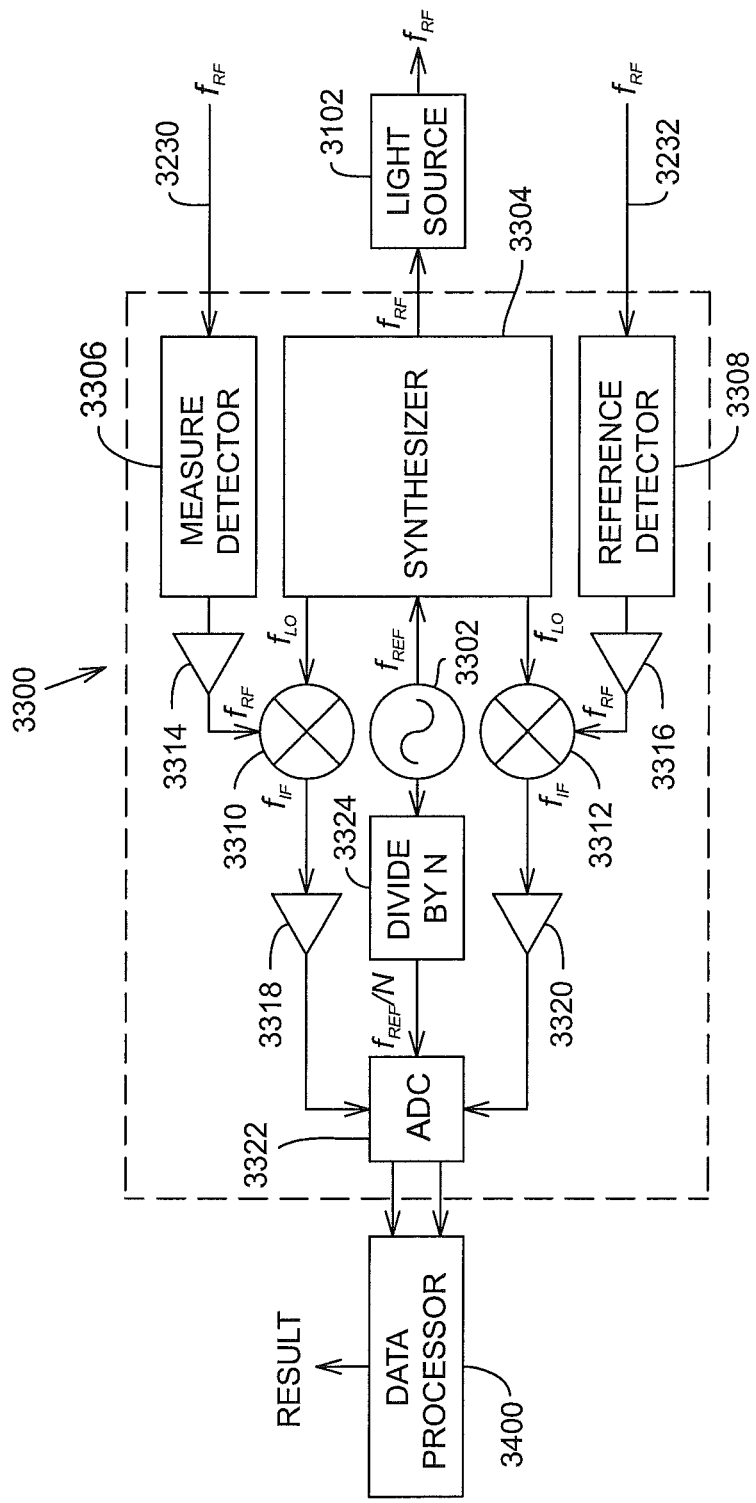
FIG. 7 is a block diagram of electrical and electro-optical elements within a prior art ADM.

The light from the fiber network 166 enters ADM electronics 164 through optical fibers 168, 169. An embodiment of prior art ADM electronics is shown in FIG. 7. Optical fiber 168 in FIG. 3 corresponds to optical fiber 3232 in FIG. 7, and optical fiber 169 in FIG. 3 corresponds to optical fiber 3230 in FIG. 7. Referring now to FIG. 7, ADM electronics 3300 includes a frequency reference 3302, a synthesizer 3304, a measure detector 3306, a reference detector 3308, a measure mixer 3310, a reference mixer 3312, conditioning electronics 3314, 3316, 3318, 3320, a divide-by-N prescaler 3324, and an analog-to-digital converter (ADC) 3322. The frequency reference, which might be an oven-controlled crystal oscillator (OCXO), for example, sends a reference frequency $f_{REF}$, which might be 10 MHz, for example, to the synthesizer, which generates two electrical signals—one signal at a frequency $f_{RF}$ and two signals at frequency $f_{LO}$. The signal $f_{RF}$ goes to the light source 3102, which corresponds to the light source 162 in FIG. 3. The two signals at frequency $f_{LO}$ go to the measure mixer 3310 and the reference mixer 3312. The light from optical fibers 168, 169 in FIG. 3 appear on fibers 3232, 3230 in FIG. 7, respectively, and enter the reference and measure channels, respectively. Reference detector 3308 and measure detector 3306 convert the optical signals into electrical signals. These signals are conditioned by electrical components 3316, 3314, respectively, and are sent to mixers 3312, 3310, respectively. The mixers produce a frequency $f_{IF}$ equal to the absolute value of $f_{LO}-f_{RF}$. The signal $f_{RF}$ may be a relatively high frequency, for example, 2 GHz, while the signal $f_{IF}$ may have a relatively low frequency, for example, 10 kHz.

The reference frequency $f_{REF}$ is sent to the prescaler 3324, which divides the frequency by an integer value. For example, a frequency of 10 MHz might be divided by 40 to obtain an output frequency of 250 kHz. In this example, the 10 kHz signals entering the ADC 3322 would be sampled at a rate of 250 kHz, thereby producing 25 samples per cycle. The signals from the ADC 3322 are sent to a data processor 3400, which might, for example, be one or more digital signal processor (DSP) units located in ADM electronics 164 of FIG. 3.

The method for extracting a distance is based on the calculation of phase of the ADC signals for the reference and measure channels. This method is described in detail in U.S. Pat. No. 7,701,559 ('559) to Bridges et al., the contents of which are herein incorporated by reference. Calculation includes use of equations (1)-(8) of patent '559. In addition, when the ADM first begins to measure a retroreflector, the frequencies generated by the synthesizer are changed some number of times (for example, three times), and the possible ADM distances calculated in each case. By comparing the possible ADM distances for each of the selected frequencies, an ambiguity in the ADM measurement is removed. The equations (1)-(8) of patent '559 combined with synchronization methods described with respect to FIG. 5 of patent '559 and the Kalman filter methods described in patent '559 enable the ADM to measure a moving target. In other embodiments, other methods of obtaining absolute distance measurements, for example, by using pulsed time-of-flight rather than phase differences, may be used.

The part of the return light beam 190 that passes through the beam splitter 155 arrives at the beam splitter 145, which sends part of the light to the beam expander 140 and another part of the light to the position detector assembly 150. The light emerging from the laser tracker 10 or EO system 100 may be thought of as a first beam and the portion of that light reflecting off the retroreflector 90 or 26 as a second beam. Portions of the reflected beam are sent to different functional elements of the EO system 100. For example, a first portion may be sent to a distance meter such as an ADM 160 in FIG. 3. A second portion may be sent to a position detector assembly 150. In some cases, a third portion may be sent to other functional units such as an optional interferometer 120. It is important to understand that, although, in the example of FIG. 3, the first portion and the second portion of the second beam are sent to the distance meter and the position detector after reflecting off beam splitters 155 and 145, respectively, it would have been possible to transmit, rather than reflect, the light onto a distance meter or position detector.

Four examples of prior art position detector assemblies 150A-150D are shown in FIGS. 6A-D. FIG. 6A depicts the simplest implementation, with the position detector assembly including a position sensor 151 mounted on a circuit board 152 that obtains power from and returns signals to electronics box 350, which may represent electronic processing capability at any location within the laser tracker 10, auxiliary unit 50, or external computer 60. FIG. 6B includes an optical filter 154 that blocks unwanted optical wavelengths from reaching the position sensor 151. The unwanted optical wavelengths may also be blocked, for example, by coating the beam splitter 145 or the surface of the position sensor 151 with an appropriate film. FIG. 6C includes a lens 153 that reduces the size of the beam of light. FIG. 6D includes both an optical filter 154 and a lens 153.

FIG. 6E shows a novel position detector assembly that includes an optical conditioner 149E. Optical conditioner contains a lens 153 and may also contain optional wavelength filter 154. In addition, it includes at least one of a diffuser 156 and a spatial filter 157. As explained hereinabove, a popular type of retroreflector is the cube-corner retroreflector. One type of cube corner retroreflector is made of three mirrors, each joined at right angles to the other two mirrors. Lines of intersection at which these three mirrors are joined may have a finite thickness in which light is not perfectly reflected back to the tracker. The lines of finite thickness are diffracted as they propagate so that upon reaching the position detector they may not appear exactly the same as at the position detector. However, the diffracted light pattern will generally depart from perfect symmetry. As a result, the light that strikes the position detector 151 may have, for example, dips or rises in optical power (hot spots) in the vicinity of the diffracted lines. Because the uniformity of the light from the retroreflector may vary from retroreflector to retroreflector and also because the distribution of light on the position detector may vary as the retroreflector is rotated or tilted, it may be advantageous to include a diffuser 156 to improve the smoothness of the light that strikes the position detector 151. It might be argued that, because an ideal position detector should respond to a centroid and an ideal diffuser should spread a spot symmetrically, there should be no effect on the resulting position given by the position detector. However, in practice the diffuser is observed to improve performance of the position detector assembly, probably because the effects of nonlinearities (imperfections) in the position detector 151 and the lens 153. Cube corner retroreflectors made of glass may also produce non-uniform spots of light at the position detector 151. Variations in a spot of light at a position detector may be particularly prominent from light reflected from cube corners in six-DOF targets, as may be understood more clearly from commonly assigned U.S. patent application Ser. No. 13/370,339 filed Feb. 10, 2012, and Ser. No. 13/407,983, filed Feb. 29, 2012, the contents of which are incorporated by reference. In an embodiment, the diffuser 156 is a holographic diffuser. A holographic diffuser provides controlled, homogeneous light over a specified diffusing angle. In other embodiments, other types of diffusers such as ground glass or "opal" diffusers are used.

The purpose of the spatial filter 157 of the position detector assembly 150E is to block ghost beams that may be the result, for example, of unwanted reflections off optical surfaces, from striking the position detector 151. A spatial filter includes a plate 157 that has an aperture. By placing the spatial filter 157 a distance away from the lens equal approximately to the focal length of the lens, the returning light 243E passes through the spatial filter when it is near its narrowest—at the waist of the beam. Beams that are traveling at a different angle, for example, as a result of reflection of an optical element strike the spatial filter away from the aperture and are blocked from reaching the position detector 151. An example is shown in FIG. 6E, where an unwanted ghost beam 244E reflects off a surface of the beam splitter 145 and travels to spatial filter 157, where it is blocked. Without the spatial filter, the ghost beam 244E would have intercepted the position detector 151, thereby causing the position of the beam 243E on the position detector 151 to be incorrectly determined. Even a weak ghost beam may significantly change the position of the centroid on the position detector 151 if the ghost beam is located a relatively large distance from the main spot of light.

A retroreflector of the sort discussed here, a cube corner or a cateye retroreflector, for example, has the property of reflecting a ray of light that enters the retroreflector in a direction parallel to the incident ray. In addition, the incident and reflected rays are symmetrically placed about the point of symmetry of the retroreflector. For example, in an open-air cube corner retroreflector, the point of symmetry of the retroreflector is the vertex of the cube corner. In a glass cube corner retroreflector, the point of symmetry is also the vertex, but one must consider the bending of the light at the glass-air interface in this case. In a cateye retroreflector having an index of refraction of 2.0, the point of symmetry is the center of the sphere. In a cateye retroreflector made of two glass hemispheres symmetrically seated on a common plane, the point of symmetry is a point lying on the plane and at the spherical center of each hemisphere. The main point is that, for the type of retroreflectors ordinarily used with laser trackers, the light returned by a retroreflector to the tracker is shifted to the other side of the vertex relative to the incident laser beam.

This behavior of a retroreflector 90 in FIG. 3 is the basis for the tracking of the retroreflector by the laser tracker. The position sensor has on its surface an ideal retrace point. The ideal retrace point is the point at which a laser beam sent to the point of symmetry of a retroreflector (e.g., the vertex of the cube corner retroreflector in an SMR) will return. Usually the retrace point is near the center of the position sensor. If the laser beam is sent to one side of the retroreflector, it reflects back on the other side and appears off the retrace point on the position sensor. By noting the position of the returning beam of light on the position sensor, the control system of the laser tracker 10 can cause the motors to move the light beam toward the point of symmetry of the retroreflector.

If the retroreflector is moved transverse to the tracker at a constant velocity, the light beam at the retroreflector will strike the retroreflector (after transients have settled) a fixed offset distance from the point of symmetry of the retroreflector. The laser tracker makes a correction to account for this offset distance at the retroreflector based on scale factor obtained from controlled measurements and based on the distance from the light beam on the position sensor to the ideal retrace point.

As explained hereinabove, the position detector performs two important functions—enabling tracking and correcting measurements to account for the movement of the retroreflector. The position sensor within the position detector may be any type of device capable of measuring a position. For example, the position sensor might be a position sensitive detector or a photosensitive array. The position sensitive detector might be lateral effect detector or a quadrant detector, for example. The photosensitive array might be a CMOS or CCD array, for example.

In an embodiment, the return light that does not reflect off beam splitter 145 passes through beam expander 140, thereby becoming smaller. In another embodiment, the positions of the position detector and the distance meter are reversed so that the light reflected by the beam splitter 145 travels to the distance meter and the light transmitted by the beam splitter travels to the position detector.

The light continues through optional IFM, through the isolator and into the visible light source 110. At this stage, the optical power should be small enough so that it does not destabilize the visible light source 110.

In an embodiment, the light from visible light source 110 is launched through a beam launch 170 of FIG. 5. The fiber launch may be attached to the output of light source 110 or a fiber optic output of the isolator 115.

In an embodiment, the fiber network 166 of FIG. 3 is prior art fiber network 420B of FIG. 8B. Here the optical fibers 184, 186, 168, 169 of FIG. 3 correspond to optical fibers 443, 444, 424, 422 of FIG. 8B. The fiber network of FIG. 8B is like the fiber network of FIG. 8A except that the fiber network of FIG. 8B has a single fiber coupler instead of two fiber couplers. The advantage of FIG. 8B over FIG. 8A is simplicity; however, FIG. 8B is more likely to have unwanted optical back reflections entering the optical fibers 422 and 424.

Figure 8C:
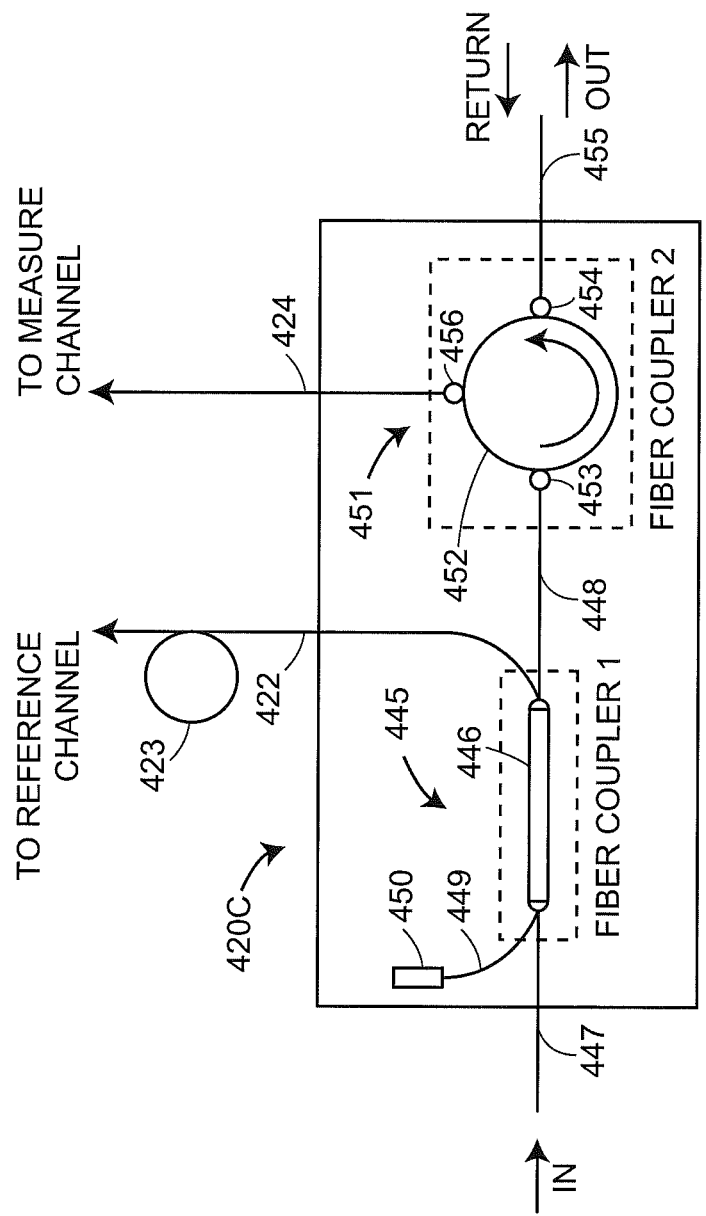
FIG. 8C is a schematic figure showing fiber-optic elements within a fiber-optic network in accordance with an embodiment of the present invention.

In an embodiment, the fiber network 166 of FIG. 3 is fiber network 420C of FIG. 8C. Here the optical fibers 184, 186, 168, 169 of FIG. 3 correspond to optical fibers 447, 455, 423, 424 of FIG. 8C. The fiber network 420C includes a first fiber coupler 445 and a second fiber coupler 451. The first fiber coupler 445 is a 2×2 coupler having two input ports and two output ports. Couplers of this type are usually made by placing two fiber cores in close proximity and then drawing the fibers while heated. In this way, evanescent coupling between the fibers can split off a desired fraction of the light to the adjacent fiber. The second fiber coupler 451 is of the type called a circulator. It has three ports, each having the capability of transmitting or receiving light, but only in the designated direction. For example, the light on optical fiber 448 enters port 453 and is transported toward port 454 as indicated by the arrow. At port 454, light may be transmitted to optical fiber 455. Similarly, light traveling on port 455 may enter port 454 and travel in the direction of the arrow to port 456, where some light may be transmitted to the optical fiber 424. If only three ports are needed, then the circulator 451 may suffer less losses of optical power than the 2×2 coupler. On the other hand, a circulator 451 may be more expensive than a 2×2 coupler, and it may experience polarization mode dispersion, which can be problematic in some situations.

Figure 9:
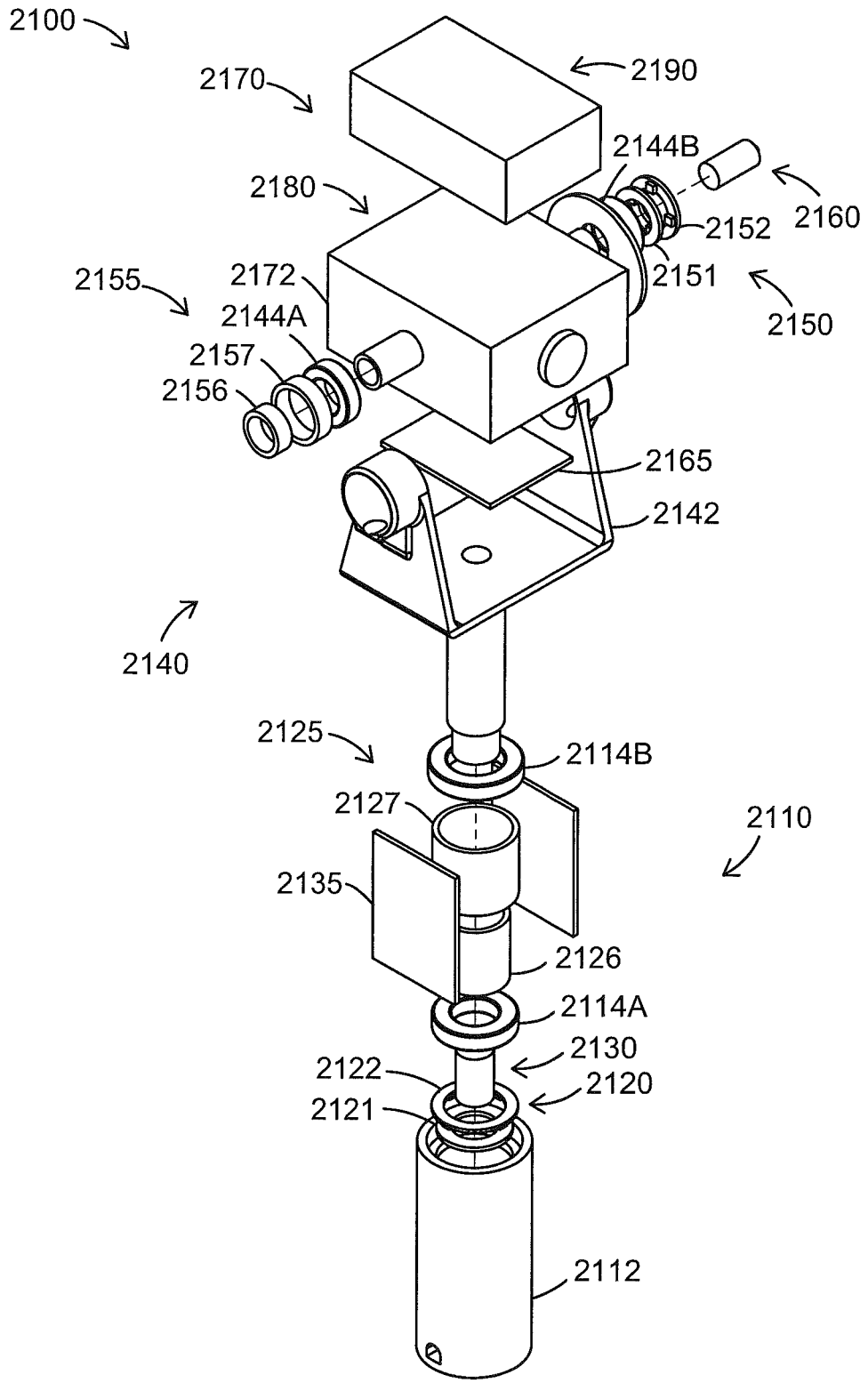
FIG. 9 is an exploded view of a prior art laser tracker.
Figure 10:
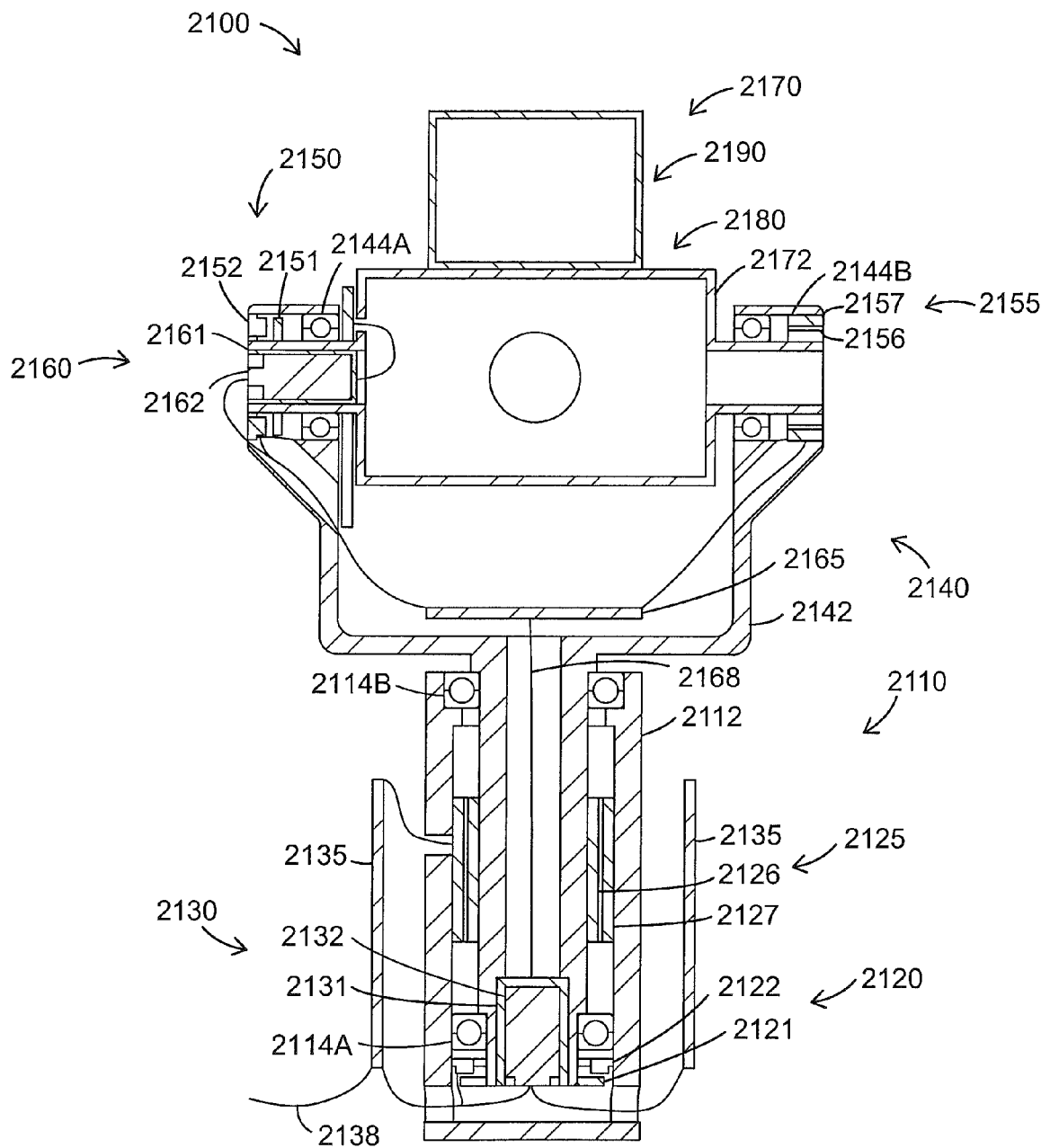
FIG. 10 is a cross-sectional view of a prior art laser tracker.

FIGS. 9 and 10 show exploded and cross sectional views, respectively, of a prior art laser tracker 2100, which is depicted in FIGS. 2 and 3 of U.S. Published Patent Application No. 2010/0128259 to Bridges et al., incorporated by reference. Azimuth assembly 2110 includes post housing 2112, azimuth encoder assembly 2120, lower and upper azimuth bearings 2114A, 2114B, azimuth motor assembly 2125, azimuth slip ring assembly 2130, and azimuth circuit boards 2135.

The purpose of azimuth encoder assembly 2120 is to accurately measure the angle of rotation of yoke 2142 with respect to the post housing 2112. Azimuth encoder assembly 2120 includes encoder disk 2121 and read-head assembly 2122. Encoder disk 2121 is attached to the shaft of yoke housing 2142, and read head assembly 2122 is attached to post assembly 2110. Read head assembly 2122 comprises a circuit board onto which one or more read heads are fastened. Laser light sent from read heads reflect off fine grating lines on encoder disk 2121. Reflected light picked up by detectors on encoder read head(s) is processed to find the angle of the rotating encoder disk in relation to the fixed read heads.

Azimuth motor assembly 2125 includes azimuth motor rotor 2126 and azimuth motor stator 2127. Azimuth motor rotor comprises permanent magnets attached directly to the shaft of yoke housing 2142. Azimuth motor stator 2127 comprises field windings that generate a prescribed magnetic field. This magnetic field interacts with the magnets of azimuth motor rotor 2126 to produce the desired rotary motion. Azimuth motor stator 2127 is attached to post frame 2112.

Azimuth circuit boards 2135 represent one or more circuit boards that provide electrical functions required by azimuth components such as the encoder and motor. Azimuth slip ring assembly 2130 includes outer part 2131 and inner part 2132. In an embodiment, wire bundle 2138 emerges from auxiliary unit processor 50. Wire bundle 2138 may carry power to the tracker or signals to and from the tracker. Some of the wires of wire bundle 2138 may be directed to connectors on circuit boards. In the example shown in FIG. 10, wires are routed to azimuth circuit board 2135, encoder read head assembly 2122, and azimuth motor assembly 2125. Other wires are routed to inner part 2132 of slip ring assembly 2130. Inner part 2132 is attached to post assembly 2110 and consequently remains stationary. Outer part 2131 is attached to yoke assembly 2140 and consequently rotates with respect to inner part 2132. Slip ring assembly 2130 is designed to permit low impedance electrical contact as outer part 2131 rotates with respect to the inner part 2132.

Zenith assembly 2140 comprises yoke housing 2142, zenith encoder assembly 2150, left and right zenith bearings 2144A, 2144B, zenith motor assembly 2155, zenith slip ring assembly 2160, and zenith circuit board 2165.

The purpose of zenith encoder assembly 2150 is to accurately measure the angle of rotation of payload frame 2172 with respect to yoke housing 2142. Zenith encoder assembly 2150 comprises zenith encoder disk 2151 and zenith read-head assembly 2152. Encoder disk 2151 is attached to payload housing 2142, and read head assembly 2152 is attached to yoke housing 2142. Zenith read head assembly 2152 comprises a circuit board onto which one or more read heads are fastened. Laser light sent from read heads reflect off fine grating lines on encoder disk 2151. Reflected light picked up by detectors on encoder read head(s) is processed to find the angle of the rotating encoder disk in relation to the fixed read heads.

Zenith motor assembly 2155 comprises azimuth motor rotor 2156 and azimuth motor stator 2157. Zenith motor rotor 2156 comprises permanent magnets attached directly to the shaft of payload frame 2172. Zenith motor stator 2157 comprises field windings that generate a prescribed magnetic field. This magnetic field interacts with the rotor magnets to produce the desired rotary motion. Zenith motor stator 2157 is attached to yoke frame 2142.

Zenith circuit board 2165 represents one or more circuit boards that provide electrical functions required by zenith components such as the encoder and motor. Zenith slip ring assembly 2160 comprises outer part 2161 and inner part 2162. Wire bundle 2168 emerges from azimuth outer slip ring 2131 and may carry power or signals. Some of the wires of wire bundle 2168 may be directed to connectors on circuit board. In the example shown in FIG. 10, wires are routed to zenith circuit board 2165, zenith motor assembly 2150, and encoder read head assembly 2152. Other wires are routed to inner part 2162 of slip ring assembly 2160. Inner part 2162 is attached to yoke frame 2142 and consequently rotates in azimuth angle only, but not in zenith angle. Outer part 2161 is attached to payload frame 2172 and consequently rotates in both zenith and azimuth angles. Slip ring assembly 2160 is designed to permit low impedance electrical contact as outer part 2161 rotates with respect to the inner part 2162. Payload assembly 2170 includes a main optics assembly 2180 and a secondary optics assembly 2190.

Figure 11:
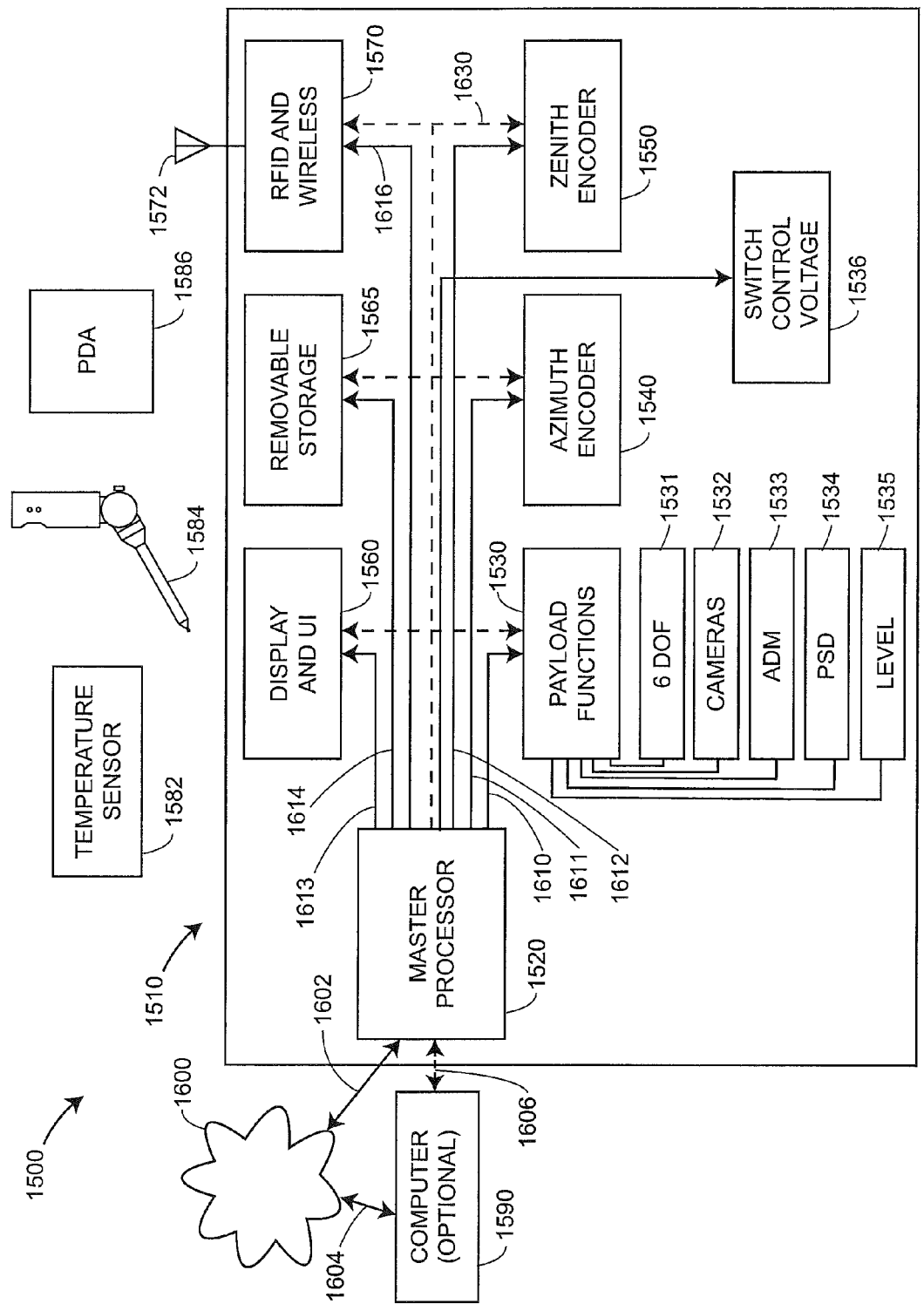
FIG. 11 is a block diagram of the computing and communication elements of a laser tracker in accordance with an embodiment of the present invention.

FIG. 11 is a block diagram depicting a dimensional measurement electronics processing system 1500 that includes a laser tracker electronics processing system 1510, processing systems of peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics, and an antenna 1572. The payload functions electronics 1530 includes a number of subfunctions including the six-DOF electronics 1531, the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in the payload 2170 of FIGS. 9, 10, while the azimuth encoder electronics 1540 is located in the azimuth assembly 2110 and the zenith encoder electronics 1550 is located in the zenith assembly 2140.

Many types of peripheral devices are possible, but here three such devices are shown: a temperature sensor 1582, a six-DOF probe 1584, and a personal digital assistant, 1586, which might be a smart phone, for example. The laser tracker may communicate with peripheral devices in a variety of means, including wireless communication over the antenna 1572, by means of a vision system such as a camera, and by means of distance and angular readings of the laser tracker to a cooperative target such as the six-DOF probe 1584. Peripheral devices may contain processors. The six-DOF accessories may include six-DOF probing systems, six-DOF scanners, six-DOF projectors, six-DOF sensors, and six-DOF indicators. The processors in these six-DOF devices may be used in conjunction with processing devices in the laser tracker as well as an external computer and cloud processing resources. Generally, when the term laser tracker processor or measurement device processor is used, it is meant to include possible external computer and cloud support.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock-signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The azimuth encoder electronics 1540 and zenith encoder electronics 1550 are separated from one another and from the payload electronics 1530 by the slip rings 2130, 2160 shown in FIGS. 9, 10. This is why the bus lines 1610, 1611, and 1612 are depicted as separate bus line in FIG. 11.

The laser tracker electronics processing system 1510 may communicate with an external computer 1590, or it may provide computation, display, and UI functions within the laser tracker. The laser tracker communicates with computer 1590 over communications link 1606, which might be, for example, an Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

Laser trackers today use one visible wavelength (usually red) and one infrared wavelength for the ADM. The red wavelength may be provided by a frequency stabilized helium-neon (HeNe) laser suitable for use in an interferometer and also for use in providing a red pointer beam. Alternatively, the red wavelength may be provided by a diode laser that serves just as a pointer beam. A disadvantage in using two light sources is the extra space and added cost required for the extra light sources, beam splitters, isolators, and other components. Another disadvantage in using two light sources is that it is difficult to perfectly align the two light beams along the entire paths the beams travel. This may result in a variety of problems including inability to simultaneously obtain good performance from different subsystems that operate at different wavelengths. A system that uses a single light source, thereby eliminating these disadvantages, is shown in opto-electronic system 500 of FIG. 12A.

Figure 12A:
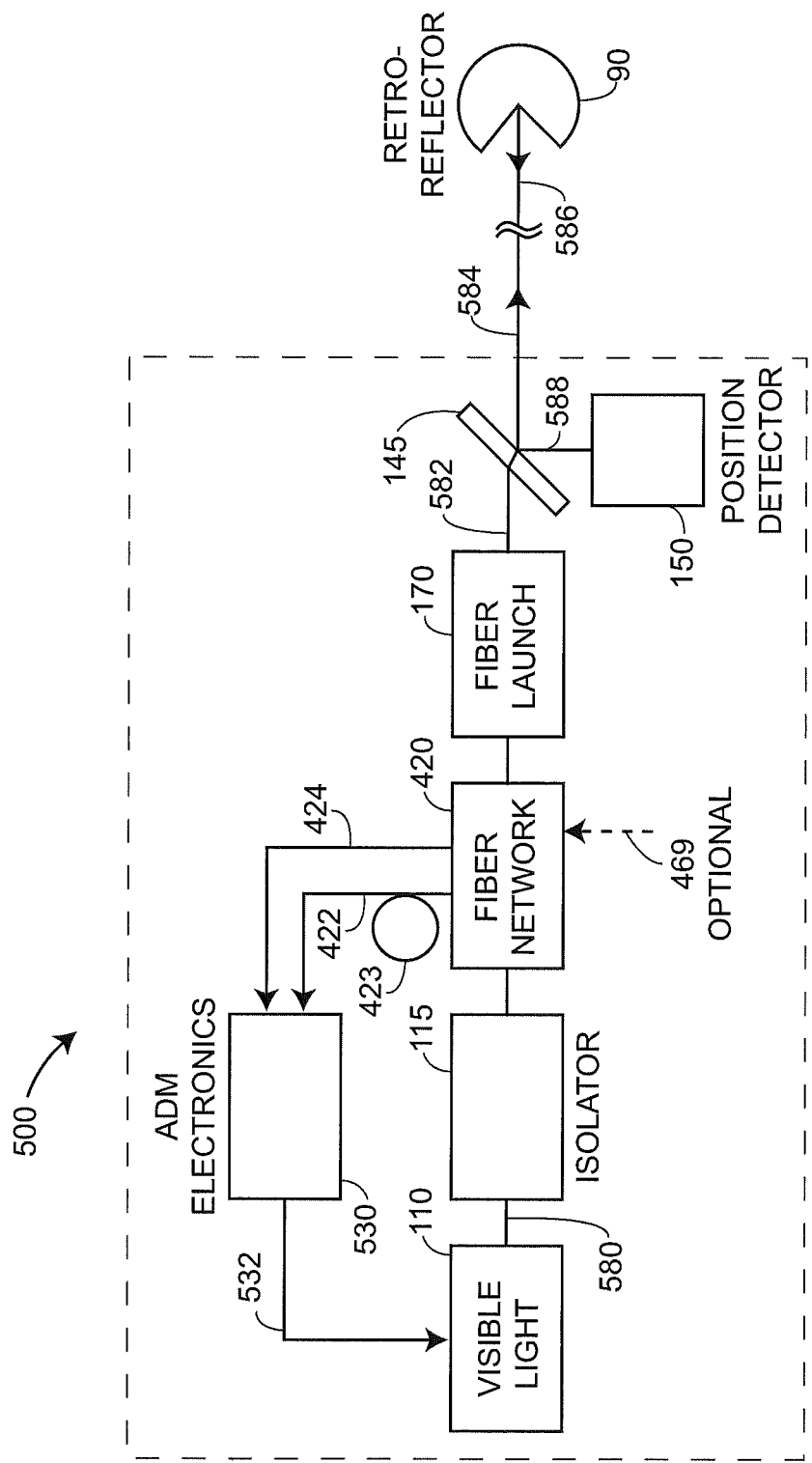
FIG. 12A is a block diagram of elements in a laser tracker that uses a single wavelength according to an embodiment of the present invention.

FIG. 12A includes a visible light source 110, an isolator 115, a fiber network 420, ADM electronics 530, a fiber launch 170, a beam splitter 145, and a position detector 150. The visible light source 110 might be, for example, a red or green diode laser or a vertical cavity surface emitting laser (VCSEL). The isolator might be a Faraday isolator, an attenuator, or any other device capable of sufficiently reducing the amount of light fed back into the light source. The light from the isolator 115 travels into the fiber network 420, which in an embodiment is the fiber network 420A of FIG. 8A.

Figure 12B:
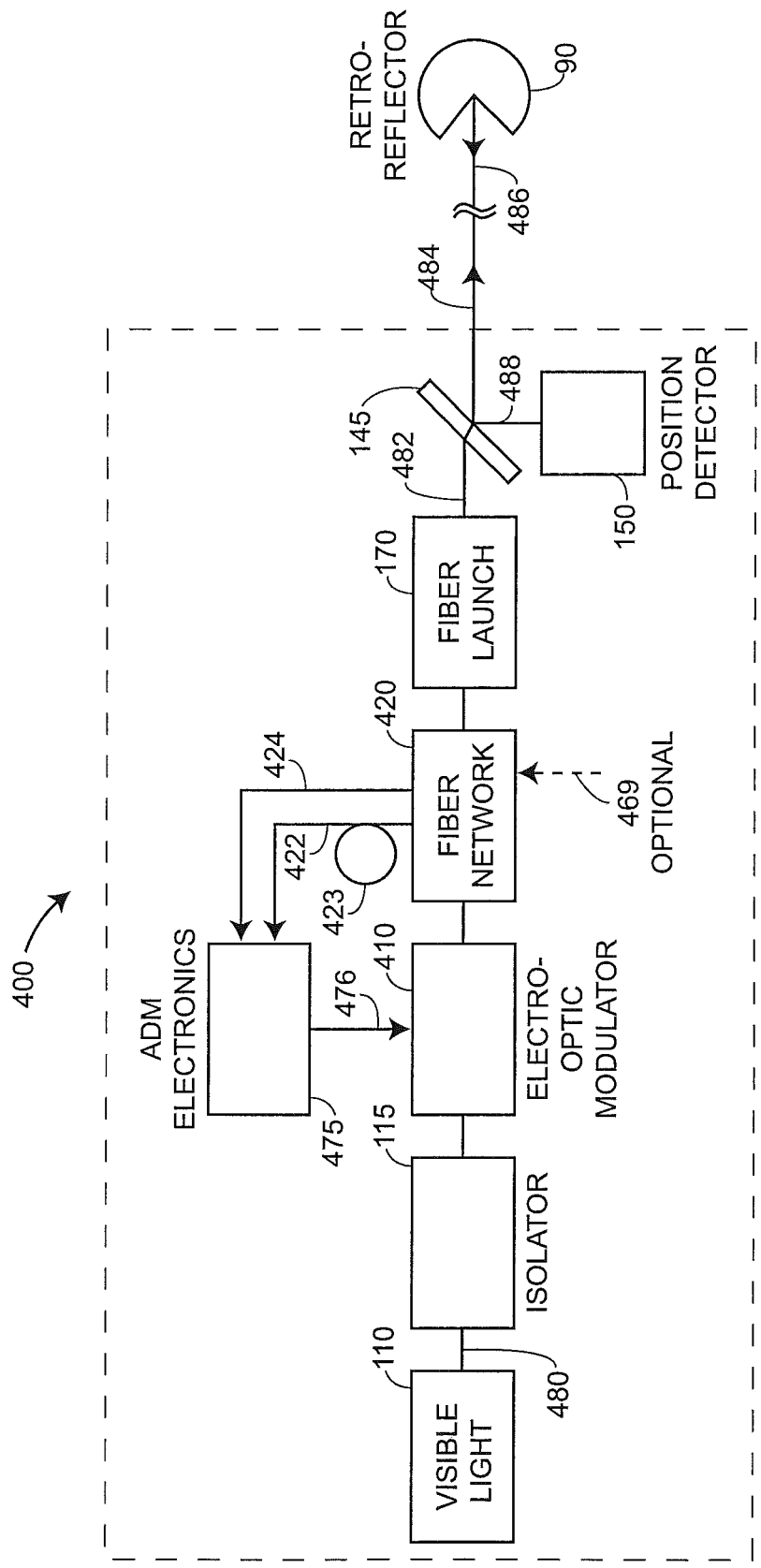
FIG. 12B is a block diagram of elements in a laser tracker that uses a single wavelength according to an embodiment of the present invention.

FIG. 12B shows an embodiment of an optoelectronic system 400 in which a single wavelength of light is used but wherein modulation is achieved by means of electro-optic modulation of the light rather than by direct modulation of a light source. The optoelectronic system 400 includes a visible light source 110, an isolator 115, an electrooptic modulator 410, ADM electronics 475, a fiber network 420, a fiber launch 170, a beam splitter 145, and a position detector 150. The visible light source 110 may be, for example, a red or green laser diode. Laser light is sent through an isolator 115, which may be a Faraday isolator or an attenuator, for example. The isolator 115 may be fiber coupled at its input and output ports. The isolator 115 sends the light to the electrooptic modulator 410, which modulates the light to a selected frequency, which may be up to 10 GHz or higher if desired. An electrical signal 476 from ADM electronics 475 drives the modulation in the electrooptic modulator 410. The modulated light from the electrooptic modulator 410 travels to the fiber network 420, which might be the fiber network 420A, 420B, 420C, or 420D discussed hereinabove. Some of the light travels over optical fiber 422 to the reference channel of the ADM electronics 475. Another portion of the light travels out of the tracker, reflects off retroreflector 90, returns to the tracker, and arrives at the beam splitter 145. A small amount of the light reflects off the beam splitter and travels to position detector 150, which has been discussed hereinabove with reference to FIGS. 6A-F. A portion of the light passes through the beam splitter 145 into the fiber launch 170, through the fiber network 420 into the optical fiber 424, and into the measure channel of the ADM electronics 475. In general, the system 500 of FIG. 12A can be manufactured for less money than system 400 of FIG. 12B; however, the electro-optic modulator 410 may be able to achieve a higher modulation frequency, which can be advantageous in some situations.

Figure 13:
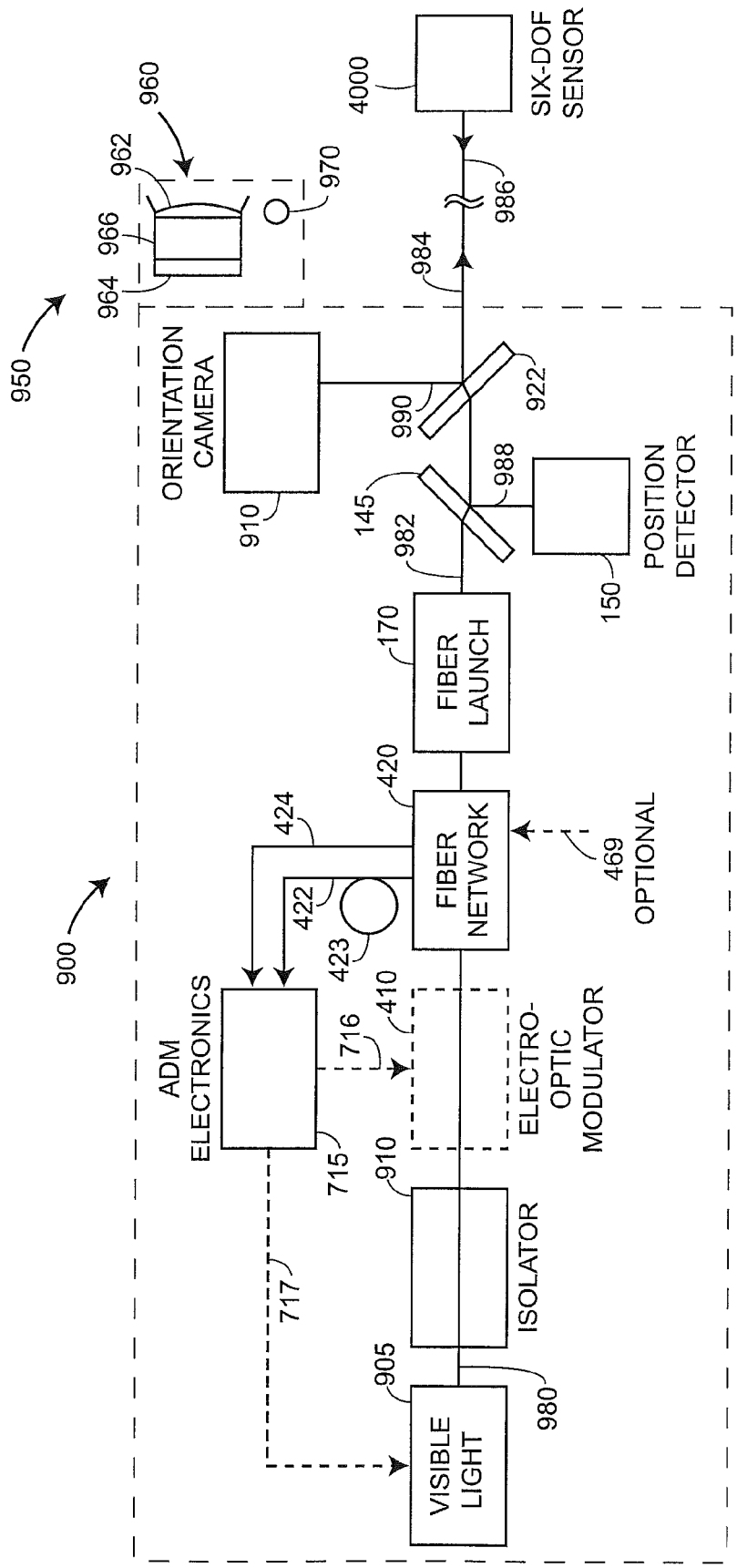
FIG. 13 is a block diagram of elements in a laser tracker with six-DOF capability according to an embodiment of the present invention.

FIG. 13 shows an embodiment of a locator camera system 950 and an optoelectronic system 900 in which an orientation camera 910 is combined with the optoelectronic functionality of a 3D laser tracker to measure six degrees of freedom. The optoelectronic system 900 includes a visible light source 905, an isolator 910, an optional electrooptic modulator 410, ADM electronics 715, a fiber network 420, a fiber launch 170, a beam splitter 145, a position detector 150, a beam splitter 922, and an orientation camera 910. The light from the visible light source is emitted in optical fiber 980 and travels through isolator 910, which may have optical fibers coupled on the input and output ports. The light may travel through the electrooptic modulator 410 modulated by an electrical signal 716 from the ADM electronics 715. Alternatively, the ADM electronics 715 may send an electrical signal over cable 717 to modulate the visible light source 905. Some of the light entering the fiber network travels through the fiber length equalizer 423 and the optical fiber 422 to enter the reference channel of the ADM electronics 715. An electrical signal 469 may optionally be applied to the fiber network 420 to provide a switching signal to a fiber optic switch within the fiber network 420. A part of the light travels from the fiber network to the fiber launch 170, which sends the light on the optical fiber into free space as light beam 982. A small amount of the light reflects off the beamsplitter 145 and is lost. A portion of the light passes through the beam splitter 145, through the beam splitter 922, and travels out of the tracker to six degree-of-freedom (DOF) device 4000. The six-DOF device 4000 may be a probe, a scanner, a projector, a sensor, or other device.

On its return path, the light from the six-DOF device 4000 enters the optoelectronic system 900 and arrives at beamsplitter 922. Part of the light is reflected off the beamsplitter 922 and enters the orientation camera 910. The orientation camera 910 records the positions of some marks placed on the retroreflector target. From these marks, the orientation angle (i.e., three degrees of freedom) of the six-DOF probe is found. The principles of the orientation camera are described hereinafter in the present application and also in patent '758. A portion of the light at beam splitter 145 travels through the beamsplitter and is put onto an optical fiber by the fiber launch 170. The light travels to fiber network 420. Part of this light travels to optical fiber 424, from which it enters the measure channel of the ADM electronics 715.

The locator camera system 950 includes a camera 960 and one or more light sources 970. The locator camera system is also shown in FIG. 1, where the cameras are elements 52 and the light sources are elements 54. The camera includes a lens system 962, a photosensitive array 964, and a body 966. One use of the locator camera system 950 is to locate retroreflector targets in the work volume. It does this by flashing the light source 970, which the camera picks up as a bright spot on the photosensitive array 964. A second use of the locator camera system 950 is establish a coarse orientation of the six-DOF device 4000 based on the observed location of a reflector spot or LED on the six-DOF device 4000. If two or more locator camera systems are available on the laser tracker, the direction to each retroreflector target in the work volume may be calculated using the principles of triangulation. If a single locator camera is located to pick up light reflected along the optical axis of the laser tracker, the direction to each retroreflector target may be found. If a single camera is located off the optical axis of the laser tracker, then approximate directions to the retroreflector targets may be immediately obtained from the image on the photosensitive array. In this case, a more accurate direction to a target may be found by rotating the mechanical axes of the laser to more than one direction and observing the change in the spot position on the photosensitive array.

Figure 14:
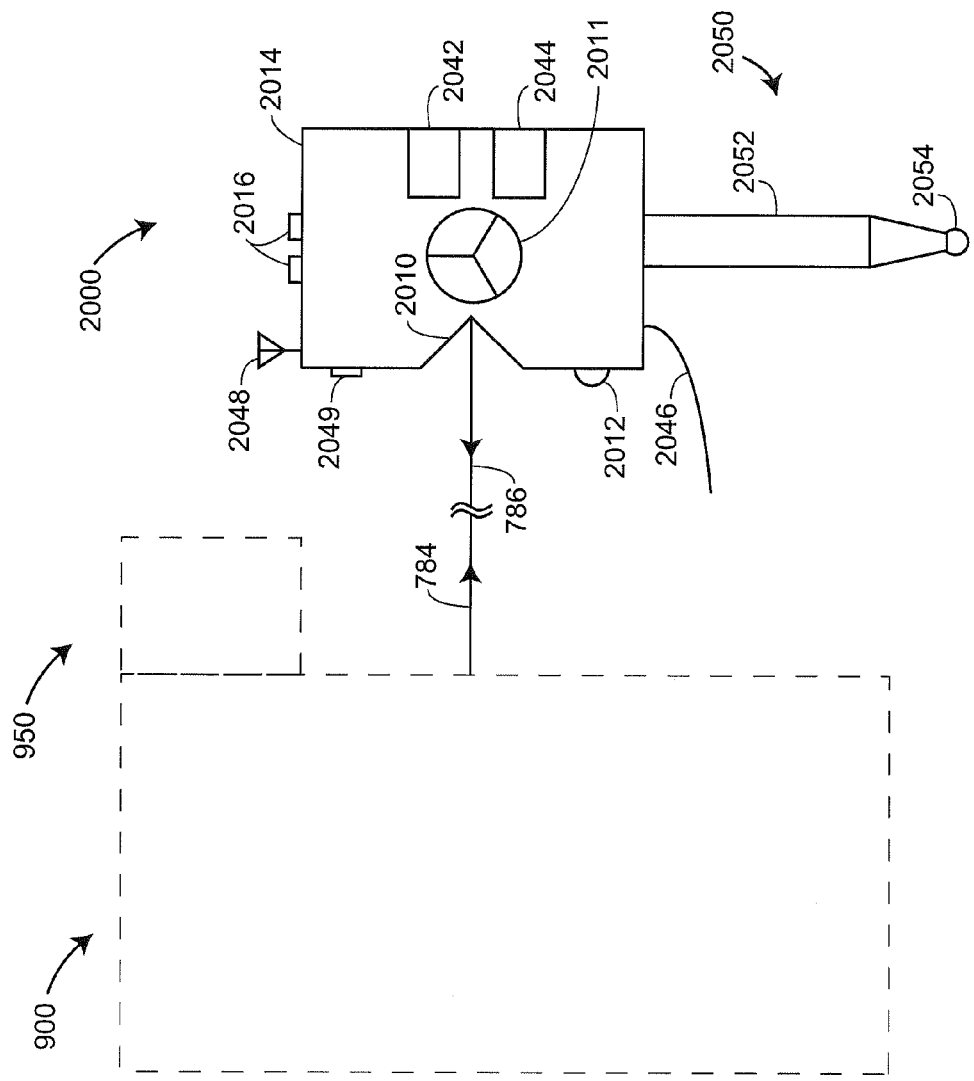
FIG. 14 are block diagrams of elements in a laser tracker having six-DOF capability according to an embodiment of the present invention.

FIG. 14 shows an embodiment of a six-DOF probe 2000 used in conjunction with an optoelectronic system 900 and a locator camera system 950. The optoelectronic system 900 and the locator camera system 950 were discussed in reference to FIG. 13. In another embodiment, the optoelectronic system 900 is replaced by the optoelectronic system having two or more wavelengths of light. The six-DOF probe 2000 includes a body 2014, a retroreflector 2010, a probe extension assembly 2050, an optional electrical cable 2046, an optional battery 2044, an interface component 2012, an identifier element 2049, actuator buttons 2016, an antenna 2048, and an electronics circuit board 2042. The retroreflector may be a cube corner retroreflector with a hollow core or a glass core. The retroreflector may be marked in a way that enables determination by the orientation camera within optoelectronic system 900 of the three orientational degrees of freedom of the six-DOF probe 2000. An example of such markings is a darkening of the lines of intersection between the three planar reflector surfaces of the retroreflector 2010, as discussed in patent '758. The probe extension assembly 2050 includes a probe extension 2052 and a probe tip 2054. The probe tip is brought into contact with the object under test. Although the probe tip 2054 is separated from the retroreflector 2010, it is possible for a six-DOF laser tracker to determine the three dimensional coordinates of the probe tip 2054 at a point hidden from the line of sight of the light beam 784 from the laser tracker. This is why a six-DOF probe is sometimes referred to as a hidden-point probe.

Electric power may be provided over an optional electrical cable 2046 or by an optional battery 2044. The electric power provides power to an electronics circuit board 2042. The electronics circuit board 2042 provides power to the antenna 2048, which may communicate with the laser tracker or an external computer, and to actuator buttons 2016, which provide the user with a convenient way of communicating with the laser tracker or external computer. The electronics circuit board 2042 may also provide power to an LED, a material temperature sensor (not shown), an air temperature sensor (not shown), an inertial sensor (not shown) or inclinometer (not shown). The interface component 2012 may be, for example, a light source (such as an LED), a small retroreflector, a region of reflective material, or a reference mark. The interface component 2012 is used to establish the coarse orientation of the retroreflector 2010, which is needed in the calculations of the six-DOF angle. The identifier element 2049 is used to provide the laser tracker with parameters or a serial number for the six-DOF probe. The identifier element may be, for example, a bar code or an RF identification tag.

The laser tracker may alternatively provide the light beam 784 to a retroreflector 2011. By providing the light beam 784 to any of a plurality of retroreflectors, the six-DOF probe 2000 may be oriented in a wide variety of directions while probing with the probing extension assembly 2050.

The six degrees of freedom measured by the laser tracker may be considered to include three translational degrees of freedom and three orientational degrees of freedom. The three translational degrees of freedom may include a radial distance measurement, a first angular measurement, and a second angular measurement. The radial distance measurement may be made with an IFM or an ADM. The first angular measurement may be made with an azimuth angular measurement device, such as an azimuth angular encoder, and the second angular measurement made with a zenith angular measurement device. Alternatively, the first angular measurement device may be the zenith angular measurement device and the second angular measurement device may be the azimuth angular measurement device. The radial distance, first angular measurement, and second angular measurement constitute three coordinates in a spherical coordinate system, which can be transformed into three coordinates in a Cartesian coordinate system or another coordinate system.

The three orientational degrees of freedom may be determined using a patterned cube corner, as described hereinabove and in patent '758. Alternatively, other methods of determining three orientational degrees of freedom may be used. The three translational degrees of freedom and the three orientational degrees of freedom fully define the position and orientation of the six-DOF probe 2000 in space. It is important to note that this is the case for the systems considered here because it is possible to have systems in which the six degrees of freedom are not independent so that six degrees of freedom are not sufficient to fully define the position of a position and orientation in space. The term "translational set" is a shorthand notation for three degrees of translational freedom of a six-DOF accessory (such as a six-DOF probe) in the tracker frame-of-reference (or device frame of reference). The term "orientational set" is a shorthand notation for three orientational degrees of freedom of a six-DOF accessory in a tracker frame of reference. The term "surface set" is a shorthand notation for three-dimensional coordinates of a point on the object surface in a device frame of reference.

Figure 15:
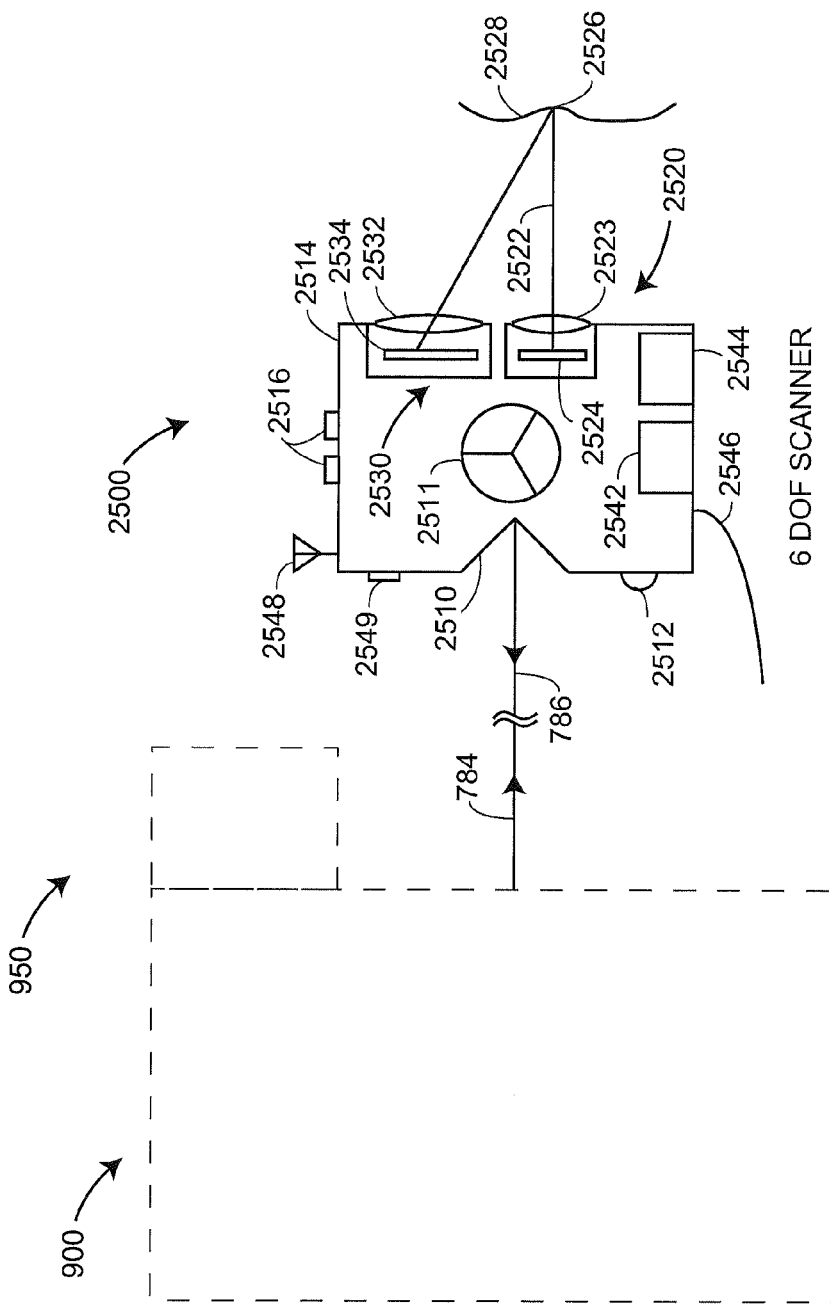
FIGS. 15 and 15C are block diagrams of elements in a laser tracker having six-DOF capability according to an embodiment of the present invention.

FIG. 15 shows an embodiment of a six-DOF scanner 2500 used in conjunction with an optoelectronic system 900 and a locator camera system 950. The six-DOF scanner 2500 may also be referred to as a "target scanner." The optoelectronic system 900 and the locator camera system 950 were discussed in reference to FIG. 13. In another embodiment, the optoelectronic system 900 is replaced by the optoelectronic system that uses two or more wavelengths of light. The six-DOF scanner 2500 includes a body 2514, one or more retroreflectors 2510, 2511 a scanner camera 2530, a scanner light projector 2520, an optional electrical cable 2546, an optional battery 2444, an interface component 2512, an identifier element 2549, actuator buttons 2516, an antenna 2548, and an electronics circuit board 2542. The retroreflector 2510, the optional electrical cable 2546, the optional battery 2544, the interface component 2512, the identifier element 2549, the actuator buttons 2516, the antenna 2548, and the electronics circuit board 2542 in FIG. 15 correspond to the retroreflector 2010, the optional electrical cable 2046, the optional battery 2044, the interface component 2012, the identifier element 2049, actuator buttons 2016, the antenna 2048, and the electronics circuit board 2042, respectively, in FIG. 14. The descriptions for these corresponding elements are the same as discussed in reference to FIG. 14. Together, the scanner projector 2520 and the scanner camera 2530 are used to measure the three dimensional coordinates of a workpiece 2528. The camera 2530 includes a camera lens system 2532 and a photosensitive array 2534. The photosensitive array 2534 may be a CCD or CMOS array, for example. The scanner projector 2520 includes a projector lens system 2523 and a source pattern of light 2524. The source pattern of light may emit a point of light, a line of light, or a structured (two dimensional) pattern of light. If the scanner light source emits a point of light, the point may be scanned, for example, with a moving mirror, to produce a line or an array of lines. If the scanner light source emits a line of light, the line may be scanned, for example, with a moving mirror, to produce an array of lines. In an embodiment, the source pattern of light might be an LED, laser, or other light source reflected off a digital micromirror device (DMD) such as a digital light projector (DLP) from Texas Instruments, an liquid crystal device (LCD) or liquid crystal on silicon (LCOS) device, or it may be a similar device used in transmission mode rather than reflection mode. The source pattern of light might also be a slide pattern, for example, a chrome-on-glass slide, which might have a single pattern or multiple patterns, the slides moved in and out of position as needed. Additional retroreflectors, such as retroreflector 2511, may be added to the first retroreflector 2510 to enable the laser tracker to track the six-DOF scanner from a variety of directions, thereby giving greater flexibility in the directions to which light may be projected by the six-DOF projector 2500.

The 6-DOF scanner 2500 may be held by hand or mounted, for example, on a tripod, an instrument stand, a motorized carriage, or a robot end effector. The three dimensional coordinates of the workpiece 2528 is measured by the scanner camera 2530 by using the principles of triangulation. There are several ways that the triangulation measurement may be implemented, depending on the pattern of light emitted by the scanner light source 2520 and the type of photosensitive array 2534. For example, if the pattern of light emitted by the scanner light source 2520 is a line of light or a point of light scanned into the shape of a line and if the photosensitive array 2534 is a two dimensional array, then one dimension of the two dimensional array 2534 corresponds to a direction of a point 2526 on the surface of the workpiece 2528. The other dimension of the two dimensional array 2534 corresponds to the distance of the point 2526 from the scanner light source 2520. Hence the three dimensional coordinates of each point 2526 along the line of light emitted by scanner light source 2520 is known relative to the local frame of reference of the 6-DOF scanner 2500. The six degrees of freedom of the 6-DOF scanner are known by the six-DOF laser tracker using the methods described in patent '758. From the six degrees of freedom, the three dimensional coordinates of the scanned line of light may be found in the tracker frame of reference, which in turn may be converted into the frame of reference of the workpiece 2528 through the measurement by the laser tracker of three points on the workpiece, for example.

If the 6-DOF scanner 2500 is held by hand, a line of laser light emitted by the scanner light source 2520 may be moved in such a way as to "paint" the surface of the workpiece 2528, thereby obtaining the three dimensional coordinates for the entire surface. It is also possible to "paint" the surface of a workpiece using a scanner light source 2520 that emits a structured pattern of light. Alternatively, when using a scanner 2500 that emits a structured pattern of light, more accurate measurements may be made by mounting the 6-DOF scanner on a tripod or instrument stand. The structured light pattern emitted by the scanner light source 2520 might, for example, include a pattern of fringes, each fringe having an irradiance that varies sinusoidally over the surface of the workpiece 2528. In an embodiment, the sinusoids are shifted by three or more phase values. The amplitude level recorded by each pixel of the camera 2530 for each of the three or more phase values is used to provide the position of each pixel on the sinusoid. This information is used to help determine the three dimensional coordinates of each point 2526. In another embodiment, the structured light may be in the form of a coded pattern that may be evaluated to determine three-dimensional coordinates based on single, rather than multiple, image frames collected by the camera 2530. Use of a coded pattern may enable relatively accurate measurements while the 6-DOF scanner 2500 is moved by hand at a reasonable speed.

Projecting a structured light pattern, as opposed to a line of light, has some advantages. In a line of light projected from a handheld six-DOF scanner 2500, the density of points may be high along the line but much less between the lines. With a structured light pattern, the spacing of points is usually about the same in each of the two orthogonal directions. In addition, in some modes of operation, the three-dimensional points calculated with a structured light pattern may be more accurate than other methods. For example, by fixing the six-DOF scanner 2500 in place, for example, by attaching it to a stationary stand or mount, a sequence of structured light patterns may be emitted that enable a more accurate calculation than would be possible other methods in which a single pattern was captured (i.e., a single-shot method). An example of a sequence of structured light patterns is one in which a pattern having a first spatial frequency is projected onto the object. In an embodiment, the projected pattern is pattern of stripes that vary sinusoidally in optical power. In an embodiment, the phase of the sinusoidally varying pattern is shifted, thereby causing the stripes to shift to the side. For example, the pattern may be made to be projected with three phase angles, each shifted by 120 degrees relative to the previous pattern. This sequence of projections provides enough information to enable relatively accurate determination of the phase of each point of the pattern, independent of the background light. This can be done on a point by point basis without considering adjacent points on the object surface.

Although the procedure above determines a phase for each point with phases running from 0 to 360 degrees between two adjacent lines, there may still be a question about which line is which. A way to identify the lines is to repeat the sequence of phases, as described above, but using a sinusoidal pattern with a different spatial frequency (i.e., a different fringe pitch). In some cases, the same approach needs to be repeated for three or four different fringe pitches. The method of removing ambiguity using this method is well known in the art and is not discussed further here.

To obtain the best possible accuracy using a sequential projection method such as the sinusoidal phase-shift method described above, it may be advantageous to minimize the movement of the six-DOF scanner. Although the position and orientation of the six-DOF scanner are known from the six-DOF measurements made by the laser tracker and although corrections can be made for movements of a handheld six-DOF scanner, the resulting noise will be somewhat higher than it would have been if the scanner were kept stationary by placing it on a stationary mount, stand, or fixture.

Figure 15A:
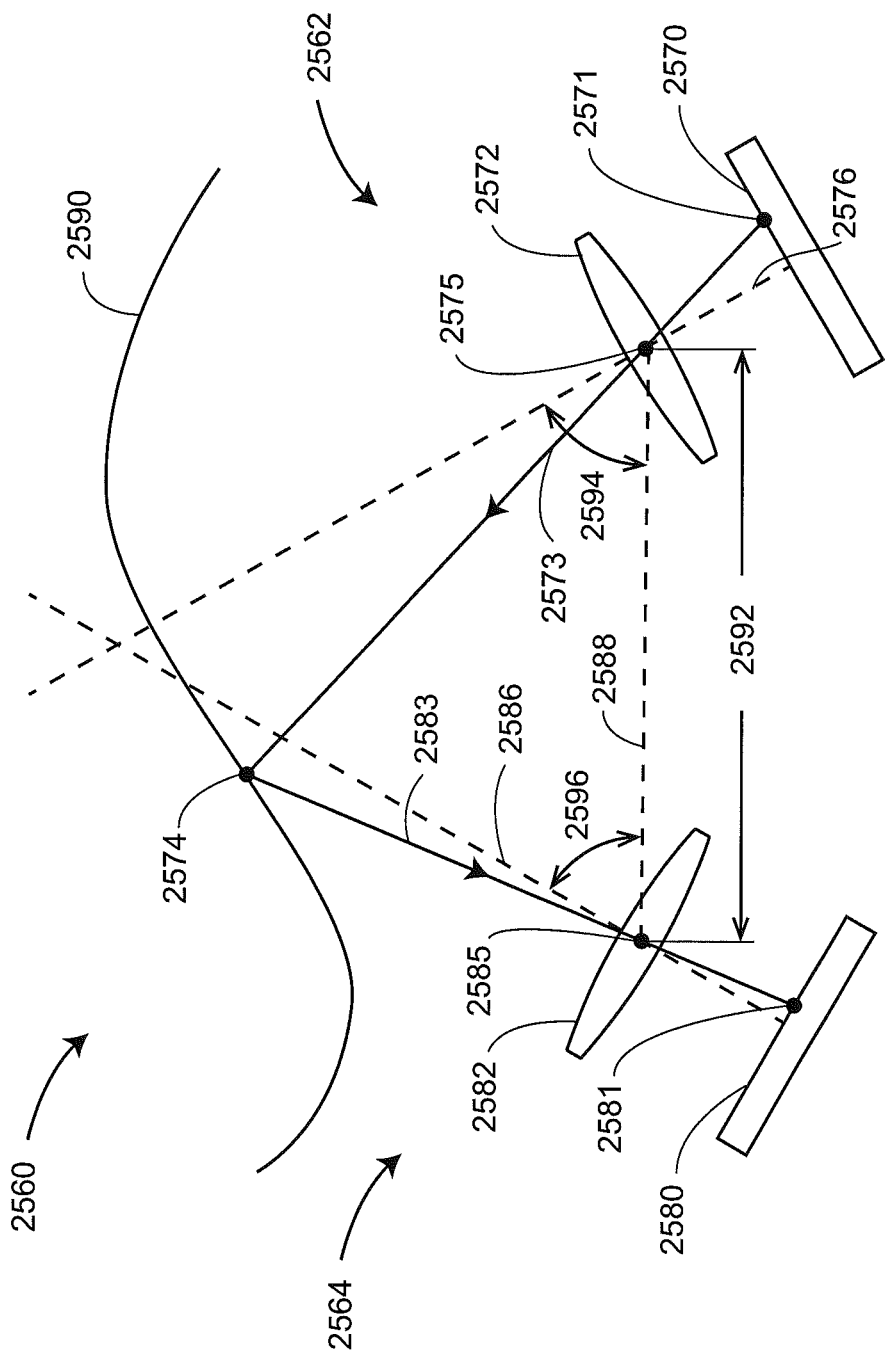
FIGS. 15A, 15B, 15D, and 15E are schematic representations illustrating the principles of operation of triangulation based scanning measurement systems.

The scanning methods represented by FIG. 15 are based on the principle of triangulation. A more complete explanation of the principles of triangulation are given with reference to the system 2560 of FIG. 15A and the system 4760 of FIG. 15B. Referring first to FIG. 15A, the system 2560 includes a projector 2562 and a camera 2564. The projector 2562 includes a source pattern of light 2570 lying on a source plane and a projector lens 2572. The projector lens may include several lens elements. The projector lens has a lens perspective center 2575 and a projector optical axis 2576. The ray of light 2573 travels from a point 2571 on the source pattern of light through the lens perspective center onto the object 2590, which it intercepts at a point 2574.

The camera 2564 includes a camera lens 2582 and a photosensitive array 2580. The camera lens 2582 has a lens perspective center 2585 and an optical axis 2586. A ray of light 2583 travels from the object point 2574 through the camera perspective center 2585 and intercepts the photosensitive array 2580 at point 2581.

Figure 15B:
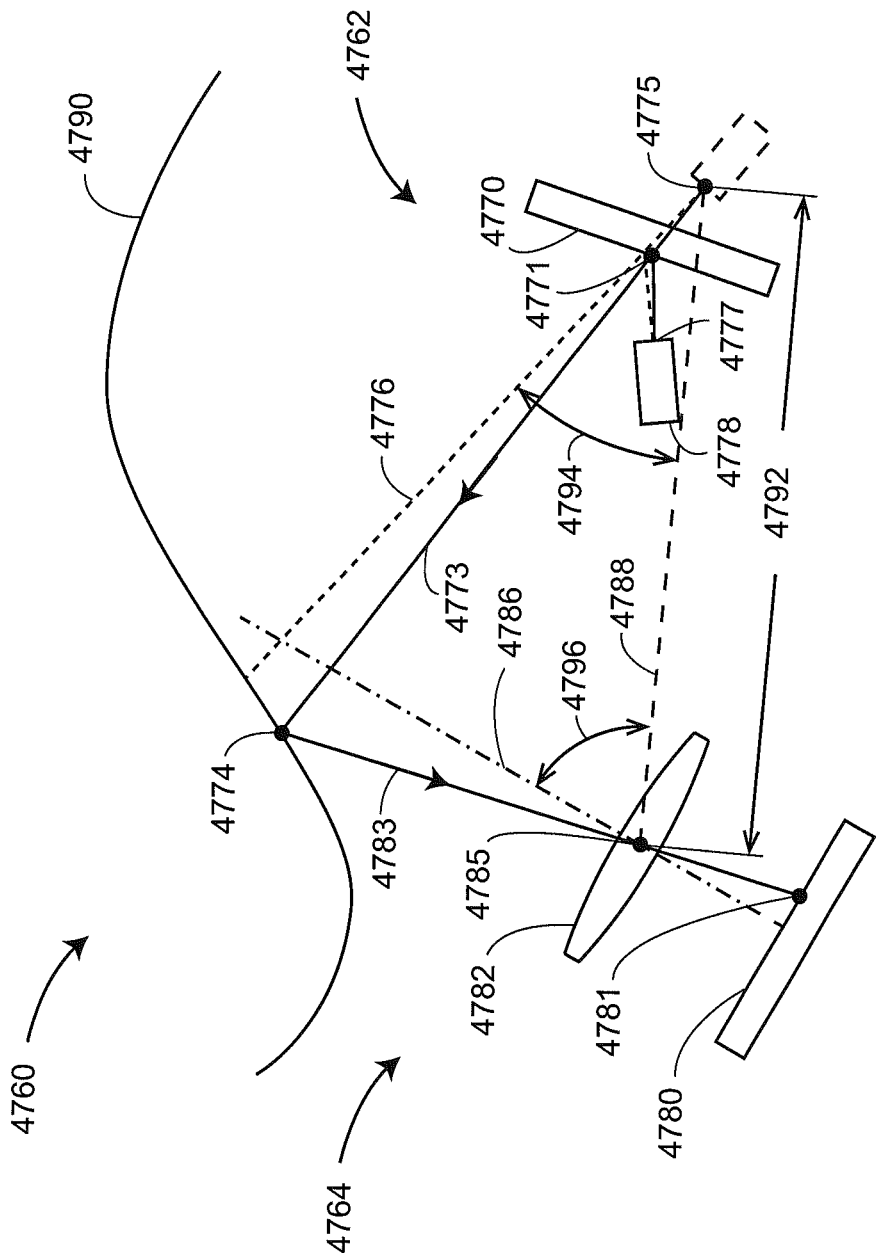

The line segment that connects the perspective centers is the baseline 2588 in FIG. 15A and the baseline 4788 in FIG. 15B. The length of the baseline is called the baseline length (2592, 4792). The angle between the projector optical axis and the baseline is the baseline projector angle (2594, 4794). The angle between the camera optical axis (2583, 4786) and the baseline is the baseline camera angle (2596, 4796). If a point on the source pattern of light (2570, 4771) is known to correspond to a point on the photosensitive array (2581, 4781), then it is possible using the baseline length, baseline projector angle, and baseline camera angle to determine the sides of the triangle connecting the points 2585, 2574, and 2575, and hence determine the surface coordinates of points on the surface of object 2590 relative to the frame of reference of the measurement system 2560. To do this, the angles of the sides of the small triangle between the projector lens 2572 and the source pattern of light 2570 are found using the known distance between the lens 2572 and plane 2570 and the distance between the point 2571 and the intersection of the optical axis 2576 with the plane 2570. These small angles are added or subtracted from the larger angles 2596 and 2594 as appropriate to obtain the desired angles of the triangle. It will be clear to one of ordinary skill in the art that equivalent mathematical methods can be used to find the lengths of the sides of the triangle 2574-2585-2575 or that other related triangles may be used to obtain the desired coordinates of the surface of object 2590.

Referring first to FIG. 15B, the system 4760 is similar to the system 2560 of FIG. 15A except that the system 4760 does not include a lens. The system may include a projector 4762 and a camera 4764. In the embodiment illustrated in FIG. 15B, the projector includes a light source 4778 and a light modulator 4770. The light source 4778 may be a laser light source since such a light source may remain in focus for a long distance using the geometry of FIG. 15B. A ray of light 4773 from the light source 4778 strikes the optical modulator 4770 at a point 4771. Other rays of light from the light source 4778 strike the optical modulator at other positions on the modulator surface. In an embodiment, the optical modulator 4770 changes the power of the emitted light, in most cases by decreasing the optical power to a degree. In this way, the optical modulator imparts an optical pattern to the light, referred to here as the source pattern of light, which is at the surface of the optical modulator 4770. The optical modulator 4770 may be a DLP or LCOS device for example. In some embodiments, the modulator 4770 is transmissive rather than reflective. The light emerging from the optical modulator 4770 appears to emerge from a virtual light perspective center 4775. The ray of light appears to emerge from the virtual light perspective center 4775, pass through the point 4771, and travel to the point 4774 at the surface of object 4790.

The baseline is the line segment extending from the camera lens perspective center 4785 to the virtual light perspective center 4775. In general, the method of triangulation involves finding the lengths of the sides of a triangle, for example, the triangle having the vertex points 4774, 4785, and 4775. A way to do this is to find the length of the baseline, the angle between the baseline and the camera optical axis 4786, and the angle between the baseline and the projector reference axis 4776. To find the desired angle, additional smaller angles are found. For example, the small angle between the camera optical axis 4786 and the ray 4783 can be found by solving for the angle of the small triangle between the camera lens 4782 and the photosensitive array 4780 based on the distance from the lens to the photosensitive array and the distance of the pixel from the camera optical axis. The angle of the small triangle is then added to the angle between the baseline and the camera optical axis to find the desired angle. Similarly for the projector, the angle between the projector reference axis 4776 and the ray 4773 is found can be found by solving for the angle of the small triangle between these two lines based on the known distance of the light source 4777 and the surface of the optical modulation and the distance of the projector pixel at 4771 from the intersection of the reference axis 4776 with the surface of the optical modulator 4770. This angle is subtracted from the angle between the baseline and the projector reference axis to get the desired angle.

The camera 4764 includes a camera lens 4782 and a photosensitive array 4780. The camera lens 4782 has a camera lens perspective center 4785 and a camera optical axis 4786. The camera optical axis is an example of a camera reference axis. From a mathematical point of view, any axis that passes through the camera lens perspective center may equally easily be used in the triangulation calculations, but the camera optical axis, which is an axis of symmetry for the lens, is customarily selected. A ray of light 4783 travels from the object point 4774 through the camera perspective center 4785 and intercepts the photosensitive array 4780 at point 4781. Other equivalent mathematical methods may be used to solve for the lengths of the sides of a triangle 4774-4785-4775, as will be clear to one of ordinary skill in the art.

Although the triangulation method described here is well known, some additional technical information is given hereinbelow for completeness. Each lens system has an entrance pupil and an exit pupil. The entrance pupil is the point from which the light appears to emerge, when considered from the point of view of first-order optics. The exit pupil is the point from which light appears to emerge in traveling from the lens system to the photosensitive array. For a multi-element lens system, the entrance pupil and exit pupil do not necessarily coincide, and the angles of rays with respect to the entrance pupil and exit pupil are not necessarily the same. However, the model can be simplified by considering the perspective center to be the entrance pupil of the lens and then adjusting the distance from the lens to the source or image plane so that rays continue to travel along straight lines to intercept the source or image plane. In this way, the simple and widely used model shown in FIG. 15A is obtained. It should be understood that this description provides a good first order approximation of the behavior of the light but that additional fine corrections can be made to account for lens aberrations that can cause the rays to be slightly displaced relative to positions calculated using the model of FIG. 15A. Although the baseline length, the baseline projector angle, and the baseline camera angle are generally used, it should be understood that saying that these quantities are required does not exclude the possibility that other similar but slightly different formulations may be applied without loss of generality in the description given herein.

When using a six-DOF scanner, several types of scan patterns may be used, and it may be advantageous to combine different types to obtain the best performance in the least time. For example, in an embodiment, a fast measurement method uses a two-dimensional coded pattern in which three-dimensional coordinate data may be obtained in a single shot. In a method using coded patterns, different characters, different shapes, different thicknesses or sizes, or different colors, for example, may be used to provide distinctive elements, also known as coded elements or coded features. Such features may be used to enable the matching of the point 2571 to the point 2581. A coded feature on the source pattern of light 2570 may be identified on the photosensitive array 2580.

A technique that may be used to simplify the matching of coded features is the use of epipolar lines. Epipolar lines are mathematical lines formed by the intersection of epipolar planes and the source plane 2570 or the image plane 2580. An epipolar plane is any plane that passes through the projector perspective center and the camera perspective center. The epipolar lines on the source plane and image plane may be parallel in some special cases, but in general are not parallel. An aspect of epipolar lines is that a given epipolar line on the projector plane has a corresponding epipolar line on the image plane. Hence, any particular pattern known on an epipolar line in the projector plane may be immediately observed and evaluated in the image plane. For example, if a coded pattern is placed along an epipolar line in the projector plane that the spacing between coded elements in the image plane may be determined using the values read out by pixels of the photosensitive array 2580 and this information used to determine the three-dimensional coordinates of an object point 2574. It is also possible to tilt coded patterns at a known angle with respect to an epipolar line and efficiently extract object surface coordinates.

An advantage of using coded patterns is that three-dimensional coordinates for object surface points can be quickly obtained. However, in most cases, a sequential structured light approach, such as the sinusoidal phase-shift approach discussed above, will give more accurate results. Therefore, the user may advantageously choose to measure certain objects or certain object areas or features using different projection methods according to the accuracy desired. By using a programmable source pattern of light, such a selection may easily be made.

Figure 15C:
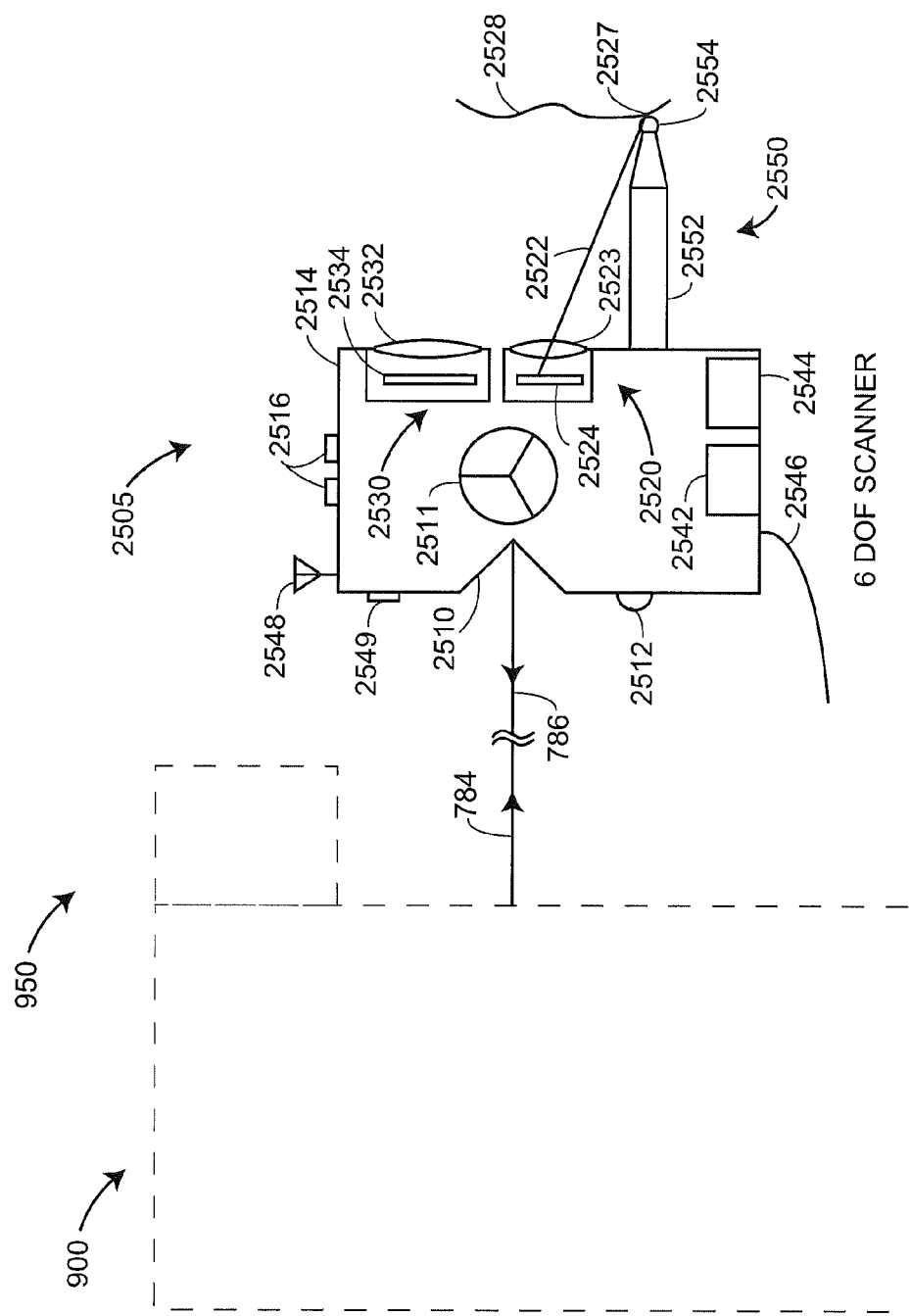

An important limitation in the accuracy of scanners may be present for certain types of objects. For example, some features such as holes or recesses may be difficult to scan effectively. The edges of objects or holes may be difficult to obtain as smoothly as might be desired. Some types of materials may not return as much light as desired or may have a large penetration depth for the light. In other cases, light may reflect off more than one surface (multipath interference) before returning to the scanner so that the observed light is "corrupted," thereby leading to measurement errors. In any of these cases, it may be advantageous to measure the difficult regions using a six-DOF scanner 2505 shown in FIG. 15C that includes a tactile probe such as the probe tip 2554, which is part of the probe extension assembly 2550. After it has been determined that it would be advantageous to measure with a tactile probe, the projector 2520 may send a laser beam to illuminate the region to be measured. In FIG. 15C, a projected ray of beam of light 2522 is illuminating a point 2527 on an object 2528, indicating that this point is to be measured by the probe extension assembly 2550. In some cases, the tactile probe may be moved outside the field of projection of the projector 2550 so as to avoid reducing the measurement region of the scanner. In this case, the beam 2522 from the projector may illuminate a region that the operator may view. The operator can then move the tactile probe 2550 into position to measure the prescribed region. In other cases, the region to be measured may be outside the projection range of the scanner. In this case, the scanner may point the beam 2522 to the extent of its range in the direction to be measured or it may move the beam 2522 in a pattern indicating the direction to which the beam should be placed. Another possibility is to present a CAD model or collected data on a display monitor and then highlight on the display those regions of the CAD model or collected data that should be re-measured. It is also possible to measure highlighted regions using other tools, for example, a spherically mounted retroreflector or a six-DOF probe under control of a laser tracker.

The projector 2520 may project a two dimensional pattern of light, which is sometimes called structured light. Such light emerges from the projector lens perspective center and travels in an expanding pattern outward until it intersects the object 2528. Examples of this type of pattern are the coded pattern and the periodic pattern, both discussed hereinabove. The projector 2520 may alternatively project a one-dimensional pattern of light. Such projectors are sometimes referred to as laser line probes or laser line scanners. Although the line projected with this type of scanner has width and a shape (for example, it may have a Gaussian beam profile in cross section), the information it contains for the purpose of determining the shape of an object is one dimensional. So a line emitted by a laser line scanner intersects an object in a linear projection. The illuminated shape traced on the object is two dimensional. In contrast, a projector that projects a two-dimensional pattern of light creates an illuminated shape on the object that is three dimensional. One way to make the distinction between the laser line scanner and the structured light scanner is to define the structured light scanner as a type of scanner that contains at least three non-collinear pattern elements. For the case of a two-dimensional pattern that projects a coded pattern of light, the three non-collinear pattern elements are recognizable because of their codes, and since they are projected in two dimensions, the at least three pattern elements must be non-collinear. For the case of the periodic pattern, such as the sinusoidally repeating pattern, each sinusoidal period represents a plurality of pattern elements. Since there is a multiplicity of periodic patterns in two dimensions, the pattern elements must be non-collinear. In contrast, for the case of the laser line scanner that emits a line of light, all of the pattern elements lie on a straight line. Although the line has width and the tail of the line cross section may have less optical power than the peak of the signal, these aspects of the line are not evaluated separately in finding surface coordinates of an object and therefore do not represent separate pattern elements. Although the line may contain multiple pattern elements, these pattern elements are collinear.

Figure 15D:
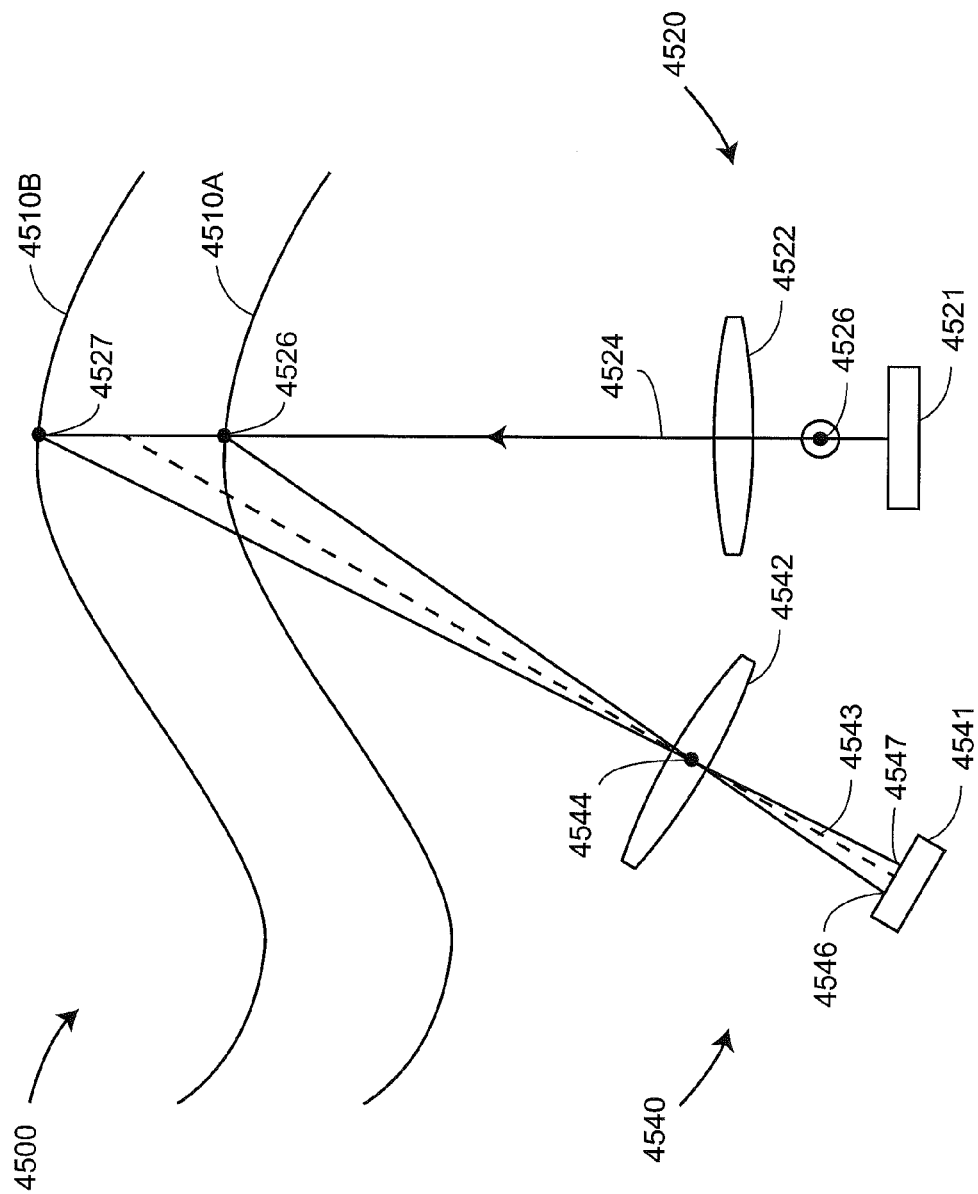

A method for calculating three dimensional coordinates of an object surface is now given with reference to FIG. 15D. The line scanner system 4500 includes a projector 4520 and a camera 4540. The projector 4520 includes a source pattern of light 4521 and a projector lens 4522. The source pattern of light includes an illuminated pattern in the form of a line. The projector lens includes a projector perspective center and a projector optical axis that passes through the projector perspective center. In the example of FIG. 15D, a central ray of the beam of light 4524 is aligned with the perspective optical axis. The camera 4540 includes a camera lens 4542 and a photosensitive array 4541. The lens has a camera optical axis 4543 that passes through a camera lens perspective center 4544. In the exemplary system 4500, the projector optical axis, which is aligned to the beam of light 4524, and the camera lens optical axis 4544, are perpendicular to the line of light 4526 projected by the source pattern of light 4521. In other words, the line 4526 is in the direction perpendicular to the paper in FIG. 15D. The line strikes an object surface, which at a first distance from the projector is object surface 4510A and at a second distance from the projector is object surface 4520A. It is understood that at different heights above or below the paper of FIG. 15D, the object surface may be at a different distance from the projector than the distance to either object surface 4520A or 4520B. For a point on the line of light 4526 that also lies in the paper of FIG. 15D, the line of light intersects surface 4520A in a point 4526 and it intersects the surface 4520B in a point 4527. For the case of the intersection point 4526, a ray of light travels from the point 4526 through the camera lens perspective center 4544 to intersect the photosensitive array 4541 in an image point 4546. For the case of the intersection point 4527, a ray of light travels from the point 4527 through the camera lens perspective center to intersect the photosensitive array 4541 in an image point 4547. By noting the position of the intersection point relative to the position of the camera lens optical axis 4544, the distance from the projector (and camera) to the object surface can be determined. The distance from the projector to other points on the line of light 4526, that is points on the line of light that do not lie in the plane of the paper of FIG. 15D, may similarly be found. In the usual case, the pattern on the photosensitive array will be a line of light (in general, not a straight line), where each point in the line corresponds to a different position perpendicular to the plane of the paper, and the position perpendicular to the plane of the paper contains the information about the distance from the projector to the camera. Therefore, by evaluating the pattern of the line in the image of the photosensitive array, the three-dimensional coordinates of the object surface along the projected line can be found. Note that the information contained in the image on the photosensitive array for the case of a line scanner is contained in a (not generally straight) line. In contrast, the information contained in the two-dimensional projection pattern of structured light contains information over both dimensions of the image in the photosensitive array.

It should be noted that although the descriptions given above distinguish between line scanners and area (structured light) scanners based on whether three or more pattern elements are collinear, it should be noted that the intent of this criterion is to distinguish patterns projected as areas and as lines. Consequently patterns projected in a linear fashion having information only along a single path are still line patterns even though the one-dimensional pattern may be curved.

An important advantage that a line scanner may have over a structured light scanner in some cases is in its greater ability to detect the multipath interference. In an ordinary (desired) case, each ray of light emerging from the projector and striking the object surface may be considered to generally reflect in a direction away from the object. For the usual case, the surface of the object is not highly reflective (i.e., a mirror like surface), so that almost all of the light is diffusely reflected (scattered) rather than being specularly reflected. The diffusely reflected light does not all travel in a single direction as would reflected light in the case of a mirror-like surface but rather scatters in a pattern. The general direction of the scattered light may be found in the same fashion as in the reflection of light off a mirror-like surface, however. This direction may be found by drawing a normal to the surface of the object at the point of intersection of the light from the projector with the object. The general direction of the scattered light is then found as the reflection of the incident light about the surface normal. In other words, the angle of reflection is equal to the angle of incidence, even though the angle of reflection is only a general scattering direction in this case.

The case of multipath interference occurs when the some of the light that strikes the object surface is first scattered off another surface of the object before returning to the camera. For the point on the object that receives this scattered light, the light sent to the photosensitive array then corresponds not only to the light directly projected from the projector but also to the light sent to a different point on the projector and scattered off the object. The result of multipath interference, especially for the case of scanners that project two-dimensional (structured) light, may be to cause the distance calculated from the projector to the object surface at that point to be inaccurate.

Figure 15E:
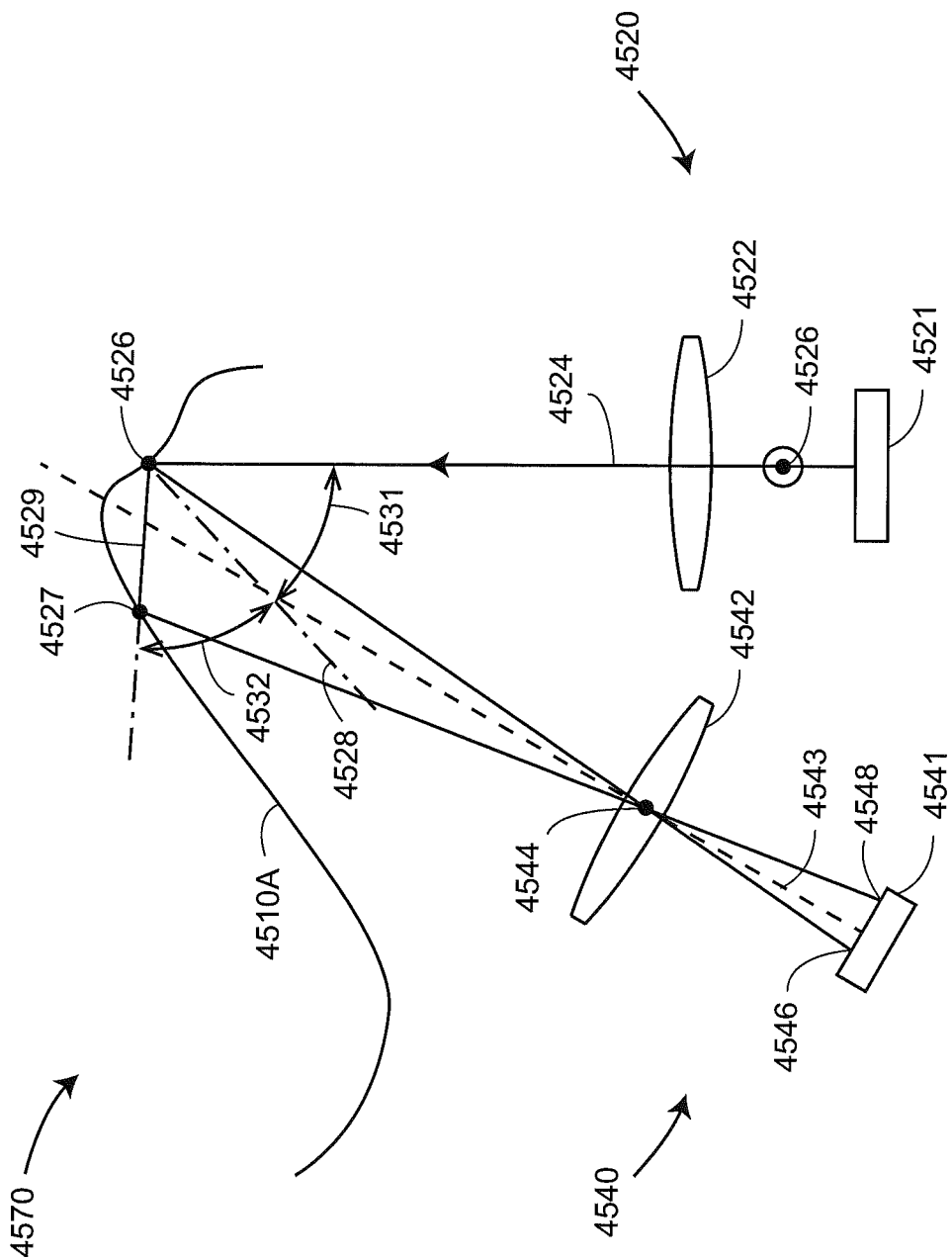

For the case of a line scanner, there is a way to determine if multipath interference is present. In an embodiment, the rows of a photosensitive array are parallel to the plane of the paper in FIG. 15E and the columns are perpendicular to the plane of the paper. Each row represents one point on the projected line 4526 in the direction perpendicular to the plane of the paper. In an embodiment, the distance from the projector to the object for that point on the line is found by first calculating the centroid for each row. However, the light on each row should be concentrated over a region of contiguous pixels. If there are two or more regions that receive a significant amount of light, multipath interference is indicated. An example of such a multipath interference condition and the resulting extra region of illumination on the photosensitive array are shown in FIG. 15E. The surface 4510A now has a greater curvature near the point of intersection 4526. The surface normal at the point of intersection is the line 4528, and the angle of incidence is 4531. The direction of the reflected line of light 4529 is found from the angle of reflection 4532, which is equal to the angle of incidence. As stated hereinabove, the line of light 4529 actually represents an overall direction for light that scatters over a range of angles. The center of the scattered light strikes the object 4510A at the point 4527, which is imaged by the lens 4544 at the point 4548 on the photosensitive array. The unexpectedly high amount of light received in the vicinity of point 4548 indicates that multipath interference is probably present. For a line scanner, the main concern with multipath interference is not for the case shown in FIG. 15E, where the two spots 4546 and 4541 are separated by a considerable distance and can be analyzed separately but rather for the case in which the two spots overlap or smear together. In this case, it is not possible to determine the centroid corresponding to the desired point, which in FIG. 15E corresponds to the point 4546. The problem is made worse for the case of a scanner that projects light in two dimensions as can be understood by again referring to FIG. 15E. If all of the light imaged onto the photosensitive array 4541 were needed to determine two-dimensional coordinates, then it is clear that the light at the point 4527 would correspond to the desired pattern of light directly projected from the projector as well as the unwanted light reflected to the point 4527 from a reflection off the object surface. As a result, in this case, the wrong three dimensional coordinates would likely be calculated for the point 4527 for two dimensional projected light.

For a projected line of light, in many cases, it is possible to eliminate multipath interference by changing the direction of the line. One possibility is to make a line scanner using a projector having inherent two-dimensional capability, thereby enabling the line to be swept or to be automatically rotated to different directions. For example, if multipath interference were suspected in a particular scan obtained with structured light, a measurement system could be automatically configured to switch to a measurement method using a swept line of light.

Another more complete way to eliminate multipath interference is to sweep a point of light, rather than a line of light or an area of light, over those regions for which multipath interference has been indicated. By illuminating a single point of light, no other illuminated points can reflect scattered light onto the point intended for measurement. For example, if the line 4526 were scanned as a collection of individual spots of light, the chance of multipath interference would be eliminated.

Another reflection problem that can be encountered when making scanner measurements is that of reflected specular light. Sometimes, a relatively smooth surface will have a curvature such that a large amount of light is specularly reflected onto the photosensitive array, thereby creating a "hot spot" that gets more light than surrounding pixels. Such hot spots of light are sometimes referred to as "glints." These hot spots can make it difficult to measure an object properly with a scanner. As in the case of multipath interference, the problem of glints may be overcome by using a laser line having an adjustable direction or a spot.

Figure 15F:
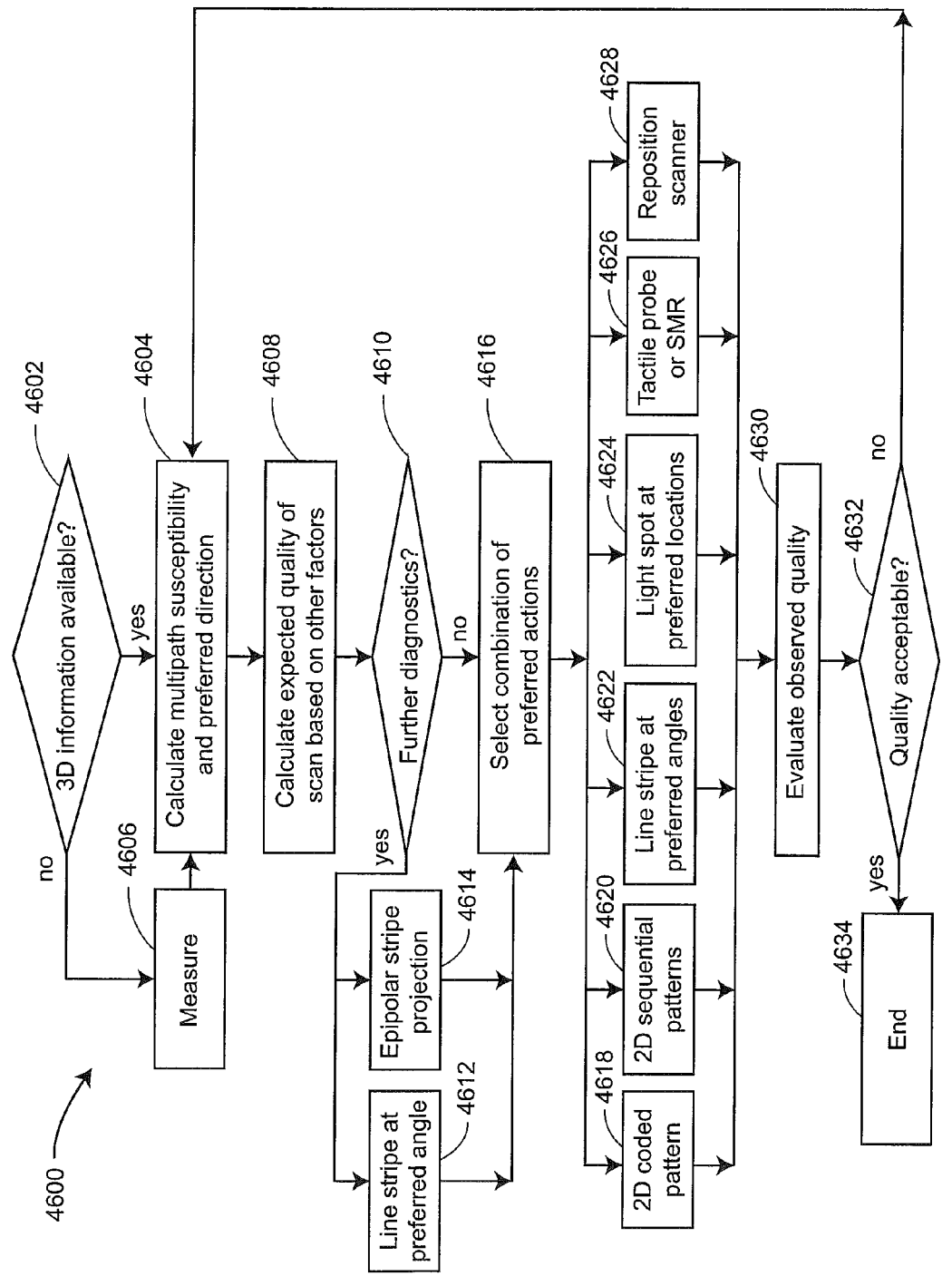
FIG. 15F illustrates steps that can be taken according to an embodiment of the present invention to ensure high quality measurement results.

It is easy to determine if a glint is present since small saturated regions on a photosensitive array can readily be detected. However, a systematic approach is needed to identify and overcome multipath problems. A general approach may be used to evaluate not only multipath interference but also quality in general, including resolution and effect of material type, surface quality, and geometry. Referring also to FIG. 15F, in an embodiment, a method 4600 may be carried out automatically under computer control. A step 4602 is to determine whether information on three-dimensional coordinates of an object under test are available. A first type of three-dimensional information is CAD data. CAD data usually indicates nominal dimensions of an object under test. A second type of three-dimensional information is measured three-dimensional data—for example, data previously measured with a scanner or other device. In some cases, the step 4602 may include a further step of aligning the frame of reference of the coordinate measurement device, for example, laser tracker or six-DOF scanner accessory, with the frame of reference of the object. In an embodiment, this is done by measuring at least three points on the surface of the object with the laser tracker.

If the answer to the question posed in step 4602 is that the three-dimensional information is available, then, in a step 4604, the computer or processor is used to calculate the susceptibility of the object measurement to multipath interference. In an embodiment, this is done by projecting each ray of light emitted by the scanner projector, and calculating the angle or reflection for each case. An example, given for the line scanner case, was described with reference to FIG. 5E. The calculations for the structured light scanner are carried out in the same way. The computer or software identifies each region of the object surface that is susceptible to error as a result of multipath interference. The step 4604 may also carry out an analysis of the susceptibility to multipath error for a variety of positions of the six-DOF probe relative to the object under test. In some cases, multipath interference may be avoided or minimize by selecting a suitable position and orientation of the six-DOF probe relative to the object under test. If the answer to the question posed in step 4602 is that three-dimensional information is not available, then a step 4606 is to measure the three-dimensional coordinates of the object surface using any desired or preferred measurement method. Following the calculation of multipath interference, a step 4608 may be carried out to evaluate other aspects of expected scan quality. One such quality factor is whether the resolution of the scan is sufficient for the features of the object under test. For example, if the resolution of a device is 3 mm, and there are sub-millimeter features for which valid scan data is desired, then these problem regions of the object should be noted for later corrective action. Another quality factor related partly to resolution is the ability to measure edges of the object and edges of holes. Knowledge of scanner performance will enable a determination of whether the scanner resolution is good enough for given edges. Another quality factor is the amount of light expected to be returned from a given feature. Little if any light may be expected to be returned to the scanner from inside a small hole, for example, or from a glancing angle. Also, little light may be expected from certain kinds and colors of materials. Certain types of materials may have a large depth of penetration for the light from the scanner, and in this case good measurement results would not be expected. In some cases, an automatic program may ask for user supplementary information. For example, if a computer program is carrying out steps 4604 and 4608 based on CAD data, it may not know the type of material being used or the surface characteristics of the object under test. In these cases, the step 4608 may include a further step of obtaining material characteristics for the object under test.

Following the analysis of steps 4604 and 4608, the step 4610 is to decide whether further diagnostic procedures should be carried out. A first example of a possible diagnostic procedure is the step 4612 of projecting a stripe at a preferred angle to note whether multipath interference is observed. The general indications of multipath interference for a projected line stripe were discussed hereinabove with reference to FIG. 15E. Another example of a diagnostic step is step 4614, which is to project a collection of lines aligned in the direction of epipolar lines on the source pattern of light, for example, the source pattern 2570 in FIG. 15A or the source pattern of light at 4770 in FIG. 15B. For the case in which lines of light in the source pattern of light are aligned to the epipolar lines, then these lines will also appear as straight lines in the image plane on the photosensitive array, for example, at the plane 2580 of FIG. 15A or the plane 4780 of FIG. 15B. If these patterns on the photosensitive array are not straight lines or if the lines are blurred or noisy, then a problem is indicated, possibly as a result of multipath interference.

The step 4616 is to select a combination of preferred actions based on the analyses and diagnostic procedure performed. If speed in a measurement is particularly important, a step 4618 of measuring using a 2D (structured) pattern of coded light may be preferred. If greater accuracy is more important, then a step 4620 of measuring using a 2D (structured) pattern of coded light using sequential patterns, for example, a sequence of sinusoidal patterns of varying phase and pitch, may be preferred. If the method 4618 or 4620 is selected, then it may be desirable to also select a step 4628, which is to reposition the scanner, in other words to adjust the position and orientation of the scanner to the position that minimizes multipath interference and specular reflections (glints) as provided by the analysis of step 4604. Such indications may be provided to a user by illuminating problem regions with light from the scanner projector or by displaying such regions on a monitor display. Alternatively, the next steps in the measurement procedure may be automatically selected by a computer or processor. If the preferred scanner position does not eliminate multipath interference and glints, several options are available. In some cases, the measurement can be repeated with the scanner repositioned and the valid measurement results combined. In other cases, alternative measurement steps may be added to the procedure or performed instead of using structured light. As discussed previously, a step 4622 of scanning a stripe of light provides a convenient way of obtaining information over an area with reduced chance of having a problem from multipath interference. A step 4624 of sweeping a small spot of light over a region of interest further reduces the chance of problems from multipath interference. A step of measuring a region of an object surface with a tactile probe or another mechanical sensor such as an SMR eliminates the possibility of multipath interference. A tactile probe provides a known resolution based on the size of the probe tip, and it eliminates issues with low reflectance of light or large optical penetration depth, which might be found in some objects under test.

In most cases, the quality of the data collected in a combination of the steps 4618-4628 may be evaluated in a step 4630 based on the data obtained from the measurements, combined with the results of the analyses carried out previously. If the quality is found to be acceptable in a step 4632, the measurement is completed at a step 4634. Otherwise, the analysis resumes at the step 4604. In some cases, the 3D information may not have been as accurate as desired. In this case, repeating some of the earlier steps may be helpful.

In another embodiment, the camera 2530 and projector 2520 may be configured to measure features that are too small to be seen by the human eye. In general, for this application, the structured light patterns will be reduced in size with the camera configured to measure a pattern of this size. Examples of applications using this type of projector 2500 include measuring of small weld spots, measuring of surface roughness and waviness, measuring of properties of materials such as paper, measuring of cutting edges, measuring of wear, abrasion, and erosion, measuring of planarity and step height. The scanner system of FIG. 15, which includes a six-DOF scanner and a laser tracker, enables the measurement of small features over large areas.

Figure 16:
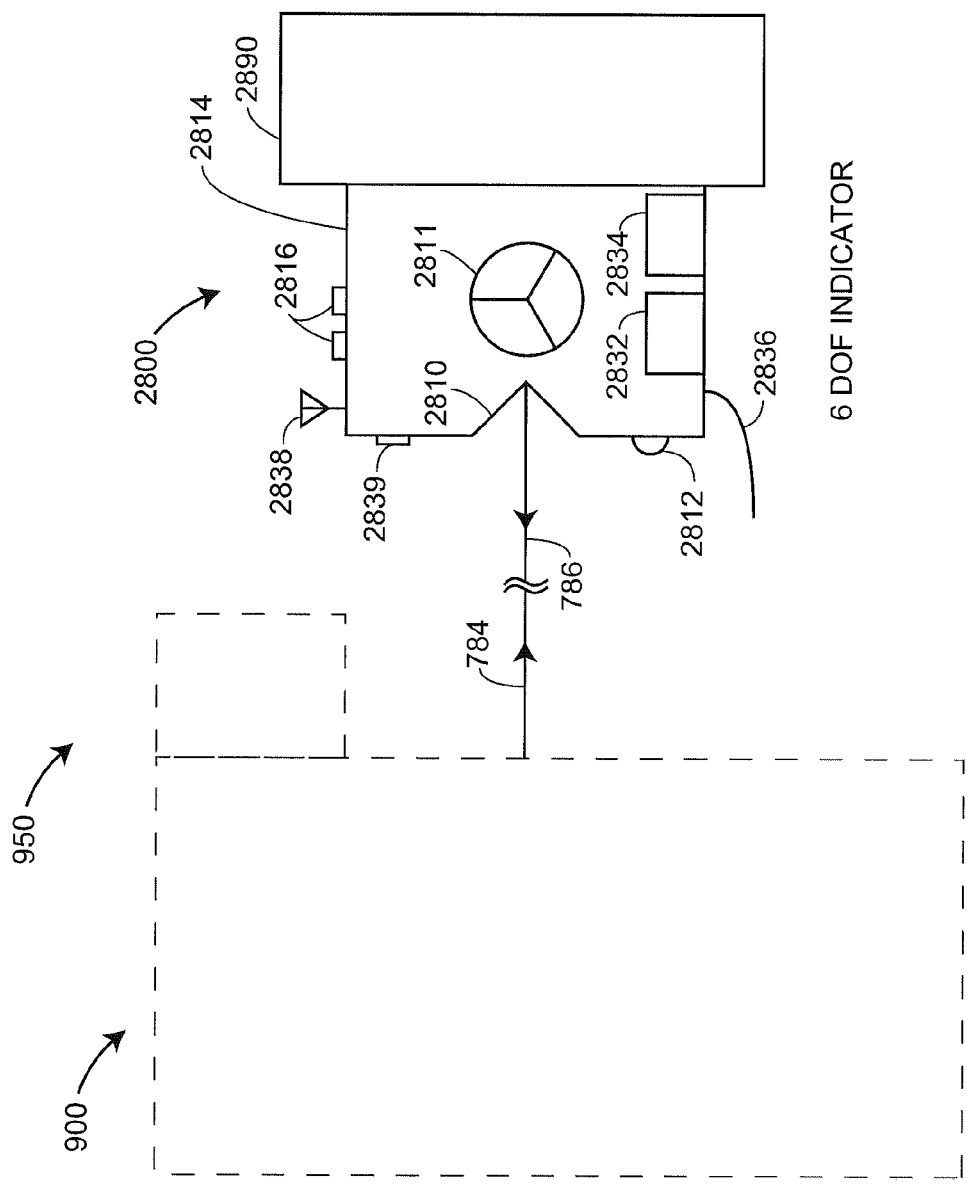

FIG. 16 shows an embodiment of a six-DOF indicator 2800 used in conjunction with an optoelectronic system 900 and a locator camera system 950. The optoelectronic system 900 and the locator camera system 950 were discussed in conjunction with FIG. 13, and this discussion will not be repeated here. In an embodiment, the optoelectronic system 900 is replaced by the optoelectronic system 1900. The six-DOF indicator 2800 includes a body 2814, one or more retroreflectors 2810, 2811, a mount 2890, an optional electrical cable 2836, an optional battery 2834, an interface component 2812, an identifier element 2839, actuator buttons 2816, an antenna 2838, and an electronics circuit board 2832. The retroreflector 2810, the optional electrical cable 2836, the optional battery 2834, the interface component 2812, the identifier element 2839, the actuator buttons 2816, the antenna 2838, and the electronics circuit board 2832 in FIG. 16 correspond to the retroreflector 2010, the optional electrical cable 2046, the optional battery 2044, the interface component 2012, the identifier element 2049, actuator buttons 2016, the antenna 2048, and the electronics circuit board 2042, respectively, in FIG. 14. The descriptions for these corresponding elements are the same as discussed hereinabove and will not be repeated. The mount 2890 may be attached to a moving element, thereby enabling the laser tracker to measure the six degrees of moving element. The moving element may be a robotic end effector, a machine tool, or a tool on an assembly (e.g., an assembly line carriage). The six-DOF indicator can be compact because the retroreflector 2810 may be small and most other elements of FIG. 16 are optional and can be omitted. This small size may provide an advantage in some cases. Additional retroreflectors, such as retroreflector 2611, may be added to the first retroreflector 2610 to enable the laser tracker to track the six-DOF scanner from a variety of directions.

FIG. 16A shows an embodiment in which the six-DOF indicator 4730 is a six-DOF spherically mounted retroreflector (SMR) 4734 mounted on a magnetic nest 4732. The six-DOF SMR may contain a patterned retroreflector, which might be an open air or glass retroreflector having markings along the intersections of the reflecting elements. In an embodiment, the initial orientation of the six-DOF indicator is determined by the operator by positioning the six-DOF SMR in a preferred orientation, for example, with a mark or a label pointed upwards. With this method, the six-DOF indicator can be completely passive, not requiring any electrical powers or any electrical signals from any other device. Such a six-DOF indicator provides considerable advantages since magnetic nests can be quickly and easily mounted at any desired location—for example, on a robot or a machine tool, without requiring any electrical cables or complex fixturing to be installed. In an embodiment, the magnetic nest 4732 is attached to the device, which might be a robot or machine tool, with a threaded screw attached to threaded opening 4734. In other embodiments, the magnetic nest is attached to the device with hot glue or epoxy.

FIG. 16B shows an embodiment 4760 in which the six-DOF indicator 4734 is a six-DOF SMR mounted on a nest 4732 having a constraint 4762. The constraint includes an element that comes in contact with the six-DOF SMR 4734—for example, a machined piece of metal, a plastic cover, or a strap. The constraint is brought into tight physical contact with the six-DOF SMR 4734 by means of a securing mechanism 4764. Examples of securing mechanisms including hooking clamps and screw clamp. The constraint 4762 provides protection against bumps or high accelerations.

Figure 17:
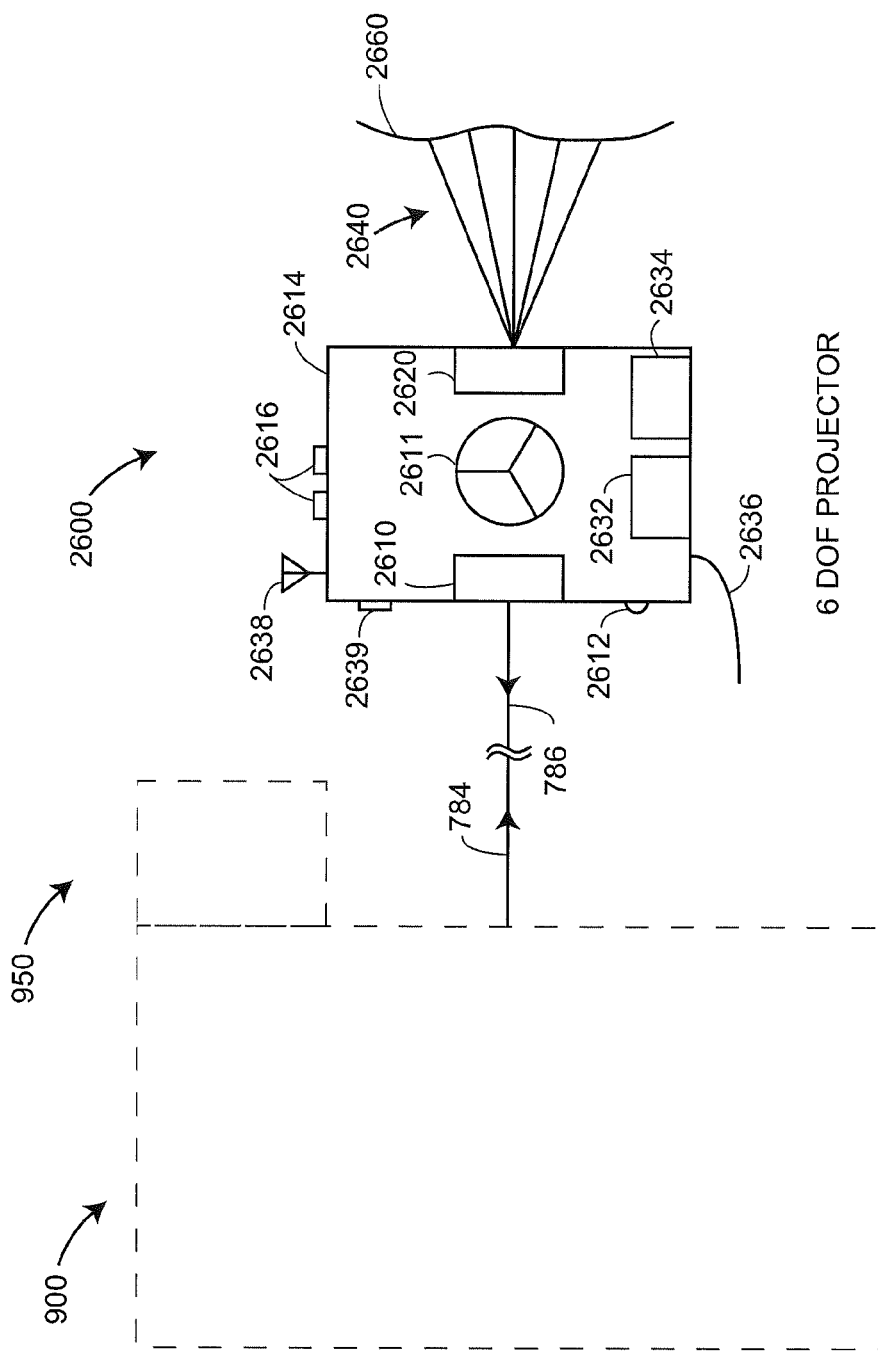
FIG. 17 is a block diagram of a six-DOF projector in accordance with an embodiment of the present invention.

FIG. 17 shows an embodiment of a six-DOF projector 2600 used in conjunction with an optoelectronic system 900 and a locator camera system 950. The optoelectronic system 900 and the locator camera system 950 were discussed in conjunction with FIG. 13, and that discussion will not be repeated here. In an embodiment, the optoelectronic system 900 is replaced by the optoelectronic system having two or more wavelengths of light. The six-DOF projector 2600 includes a body 2614, one or more retroreflectors 2610, 2611, a projector 2620, an optional electrical cable 2636, an optional battery 2634, an interface component 2612, an identifier element 2639, actuator buttons 2616, an antenna 2638, and an electronics circuit board 2632. The retroreflector 2610, the optional electrical cable 2636, the optional battery 2634, the interface component 2612, the identifier element 2639, the actuator buttons 2616, the antenna 2638, and the electronics circuit board 2632 of FIG. 17 correspond to the retroreflector 2010, the optional electrical cable 2046, the optional battery 2044, the interface component 2012, the identifier element 2049, actuator buttons 2016, the antenna 2048, and the electronics circuit board 2042, respectively, in FIG. 14. The descriptions for these corresponding elements are the same as discussed hereinabove and will not be repeated. The six-DOF projector 2600 may include a light source, a light source and a steering mirror, a MEMS micromirror, a liquid crystal projector, or any other device capable of projecting a pattern of light onto a workpiece 2600. The six degrees of freedom of the projector 2600 are known by the laser tracker using the methods described in patent '758. From the six degrees of freedom, the three dimensional coordinates of the projected pattern of light may be found in the tracker frame of reference, which in turn may be converted into the frame of reference of the workpiece through the measurement by the laser tracker of three points on the workpiece, for example. Additional retroreflectors, such as retroreflector 2611, may be added to the first retroreflector 2610 to enable the laser tracker to track the six-DOF scanner from a variety of directions, thereby giving greater flexibility in the directions to which light may be projected by the six-DOF projector 2600.

With the projected pattern of light 2640 on the surface of the workpiece 2660 known in the frame of reference of the workpiece, a variety of useful capabilities can be obtained. As a first example, the projected pattern may indicate where an operator should drill holes or perform other operations to enable the affixing of components onto the workpiece 2660. For example, gauges may be attached to the cockpit of an aircraft. Such a method of in-situ assembly can be cost effective in many cases. As a second example, the projected pattern may indicate where material needs to be added to or removed from a tool through the use of contour patterns, color coded tolerance patterns, or other graphical means. An operator may use a tool to abrade unwanted material or use a filler material to fill in an area. Because the laser tracker or an external computer attached to the laser tracker may know the details of the CAD model, the six-DOF projector can provide a relatively fast and simple method for modifying a tool to meet CAD tolerances. Other assembly operations might include scribing, applying adhesive, applying a coating, applying a label, and cleaning As a third example, the projected pattern may indicate hidden components. For example, tubing or electrical cables may be routed behind a surface and hidden from view. The location of these components may be projected onto the workpiece, thereby enabling the operator to avoid them in performing assembly or repair operations.

To project light from the projector scanner into the frame of reference of the workpiece, it is generally necessary to determine the frame of reference of the workpiece in the frame of reference of the laser tracker. One way to do this is to measure three points on the surface of the workpiece with the laser tracker. Then a CAD model or previously measured data may be used to establish a relationship between a workpiece and a laser tracker.

When an operator performs assembly operations with the assistance of a six-DOF projector, a useful technique is to mount the six-DOF projector on a stationary stand or mount, thereby enabling the operator to perform assembly operations with both hands free. A useful mode of the laser tracker and six-DOF projector is to have the six-DOF projector continue to project a pattern of light even after the laser tracker ceases to track the retroreflector on the six-DOF scanner. In this way, the operator may use the laser tracker to perform measurements, for example, with an SMR, a six-DOF probe, or a six-DOF scanner while the projector continues to display the pattern of light that indicates the assembly operations to be performed. In a similar manner, the tracker may be used to set up two or more scanner projectors that continue to project patterns after the tracker has stopped tracking the retroreflector on each scanner projector. Hence high levels of detail may be projected onto relatively large areas, enabling assistance to several operators simultaneously. It is also possible in a mode to enable the six-DOF scanner to project any of several alternative patterns, thereby enabling the operator to perform assembly operations is a prescribed sequence.

Besides assisting with assembly operations, the projector scanner can also assist in carrying out inspection procedures. In some cases, an inspection procedure may call for an operator to perform a sequence of measurements in a particular order. The six-DOF scanner may point to the positions at which the operator is to make a measurement at each step. The six-DOF scanner may demarcate a region over which a measurement is to be made. For example, by drawing a box, the six-DOF scanner may indicate that the operator is to perform a scanning measurement over the region inside the box, perhaps to determine the flatness of the regions or maybe as part of a longer measurement sequence. Because the projector can continue the sequence of steps with the six-DOF retroreflector being tracked by the laser tracker, the operator may continue an inspection sequence using the tracker or using other tools. If the tracker is performing the measurements, it will know when measurements have been successfully completed and may move onto the next step. The projector scanner may also provide information to the operator in the form of written messages or audio messages. The operator may signal commands to the laser tracker using gestures that may be picked up by the tracker cameras or by other means.

The six-DOF projector may use patterns of light, perhaps applied dynamically, to convey information. For example, the six-DOF projector may use a back and forth motion to indicate a direction to which an SMR is to be moved. The six-DOF projector may draw other patterns to give messages that may be interpreted by an operator according to a set of rules, the rules which may be available to the user in written or displayed form.

The six-DOF projector may also be used to convey information to the user about the nature of an object under investigation. For example, if dimensional measurements have been performed, the six-DOF projector might project a color coded pattern indicating regions of error associated in the surface coordinates of the object under test. It may, alternatively, just display regions or values that are out of tolerance. It may, for example, highlight a region for which the surface profile is outside the tolerance. Alternatively, it may draw a line to indicate a length measured between two points and then write a message on the part indicating the amount of error associated with that distance.

The six-DOF projector may also display information about measured characteristics besides dimensional characteristics, wherein the characteristics are tied to coordinate positions on the object. Such characteristics of an object under test may include temperature values, ultrasound values, microwave values, millimeter-wave values, X-ray values, radiological values, chemical sensing values, and many other types of values. Such object characteristics may be measured and matching to three-dimensional coordinates on an object using a six-DOF scanner, as discussed hereinafter. Alternatively, characteristics of an object may be measured on the object using a separate measurement device, with the data correlated in some way to dimensional coordinates of the object surface with an object frame of reference. Then by matching the frame of reference of the object to the frame of reference of the laser tracker or the six-DOF projector, information about the object characteristics may be displayed on the object, for example, in graphical form. For example, temperature values of an object surface may be measured using a thermal array. Each of the temperatures may be represented by a color code projected onto the object surface.

A six-DOF scanner may also project modeled data onto an object surface. For example, it might project the results of a thermal finite element analysis (FEA) onto the object surface and then allow the operator to select which of two displays— FEA or measured thermal data—is displayed at any one time. Because both sets of data are projected onto the object at the actual positions where the characteristic is found—for example, the positions at which particular temperatures have been measured or predicted to exist, the user is provided with a clear and immediate understanding of the physical effects affecting the object. The six-DOF projector may also be attached to a moveable carrier such as a robot or machine tool.

If a measurement of a small region has been made with features resolved that are too small for the human eye to see, the six-DOF projector may project a magnified view of those characteristics previously measured over a portion of the object surface onto the object surface, thereby enabling the user to see features too small to be seen without magnification. In an embodiment, the high resolution measurement is made with a six-DOF scanner, such as the scanner 2500 of FIG. 15, and the results projected with a projector, which might be the projector in the six-DOF scanner or in a six-DOF projector.

Figure 18:
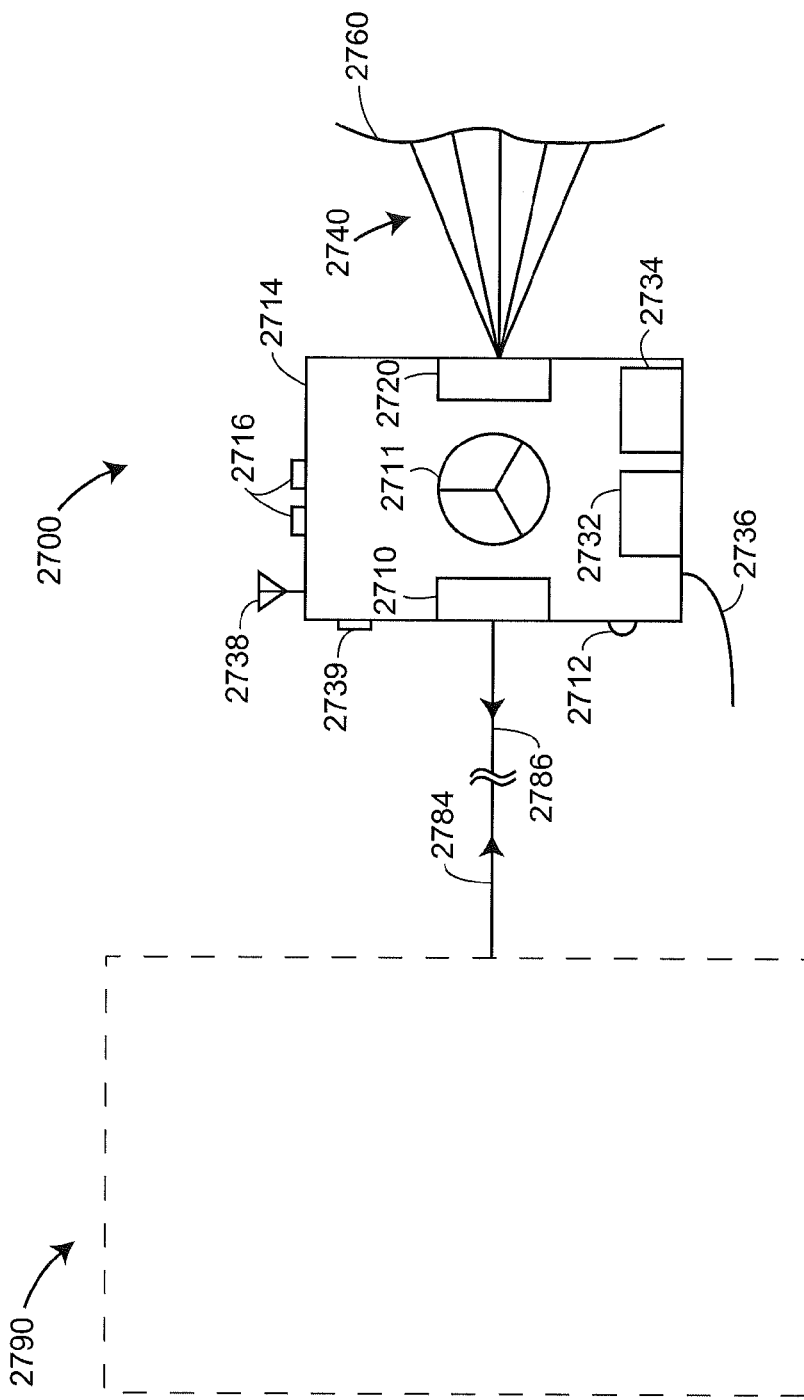
FIG. 18 is a block diagram of a six-DOF projector in accordance with an embodiment of the present invention.

FIG. 18 shows an embodiment of a six-DOF projector 2700 used in conjunction with an optoelectronic system 2790. The optoelectronic system 2790 may be any device capable of measuring the six degrees of freedom of a six-DOF projector 2700. In an embodiment, the optoelectronic system 2790 contains one or more cameras that view illuminated light sources of retroreflectors on the six-DOF projector 2700. By noting the relative positions of the light source images on the one or more cameras, the three degrees of orientational freedom are found. Three additional degrees of freedom are found, for example, by using a distance meter and two angular encoders to find the three dimensional coordinates of the retroreflector 2710. In another embodiment, the three degrees of orientational freedom are found by sending a beam of light through a vertex of a cube corner retroreflector 2710 to a position detector, which might be a photosensitive array, to determine two degrees of freedom and by sending a polarized beam of light, which may be the same beam of light, through at least one polarizing beam splitter to determine a third degree of freedom. In a third embodiment, the optoelectronic assembly 2790 sends a pattern of light onto the six-DOF projector 2700. In this embodiment, the interface component 2712 includes a plurality of linear position detectors, which may be linear photosensitive arrays, to detect the pattern and from this to determine the three degrees of orientational freedom of the six-DOF projector 2700. Many other optoelectronic systems 2790 are possible for determine the six degrees of freedom of the six-DOF projector 2700, as will be known to one of ordinary skill in the art. The six-DOF projector 2700 includes a body 2714, one or more retroreflectors 2710, 2711, a projector 2720, an optional electrical cable 2736, an optional battery 2734, an interface component 2712, an identifier element 2739, actuator buttons 2716, an antenna 2738, and an electronics circuit board 2732. The optional electrical cable 2736, the optional battery 2734, the interface component 2712, the identifier element 2739, the actuator buttons 2716, the antenna 2738, and the electronics circuit board 2732 of FIG. 18 correspond to the retroreflector 2010, the optional electrical cable 2046, the optional battery 2044, the interface component 2012, the identifier element 2049, actuator buttons 2016, the antenna 2048, and the electronics circuit board 2042, respectively, in FIG. 14. The descriptions for these corresponding elements are the same as discussed hereinabove and will not be repeated. Additional retroreflectors, such as retroreflector 2711, may be added to the first retroreflector 2710 to enable the laser tracker to track the six-DOF scanner from a variety of directions, thereby giving greater flexibility in the directions to which light may be projected by the six-DOF projector 2700.

Referring back to FIG. 15, we note that for the case in which the scanner light source 2520 serves as a projector for displaying a pattern in addition to providing a light source for use in combination with the scanner camera 2530 (for determining the three dimensional coordinates of the workpiece), other methods for finding the six degrees of freedom of the target 2500 can be used. Such methods may include the methods discussed with reference to FIG. 18, even though not explicitly shown in FIG. 15.

FIGS. 17 and 18 are similar except that the six-DOF projector FIG. 18 may use a wider range of six-DOF measurement methods than the six-DOF projector of FIG. 17. All of the comments made about the applications for the six-DOF projector 2600 also apply to the six-DOF projector 2700.

Figure 19:
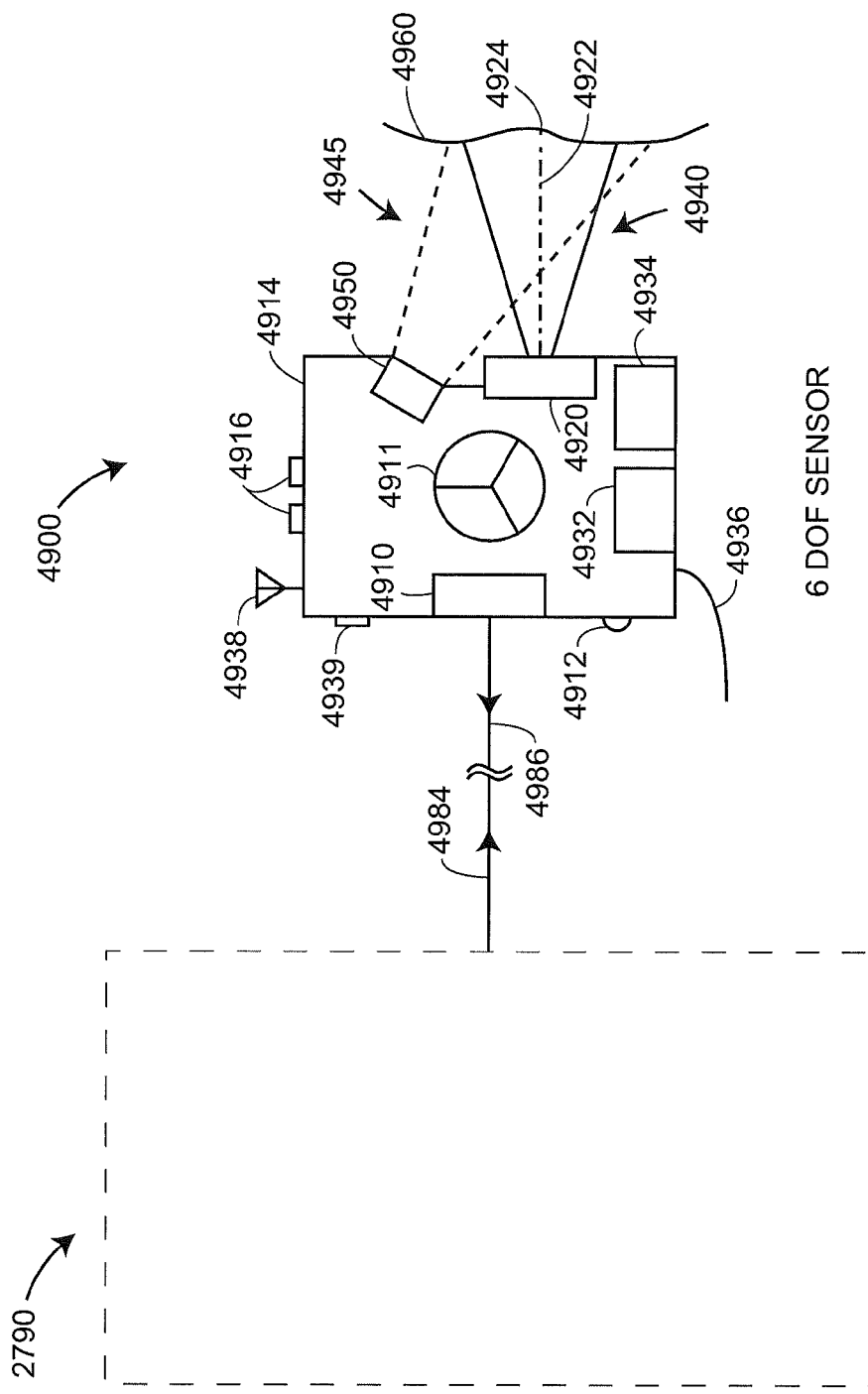
FIG. 19 is a block diagram of a six-DOF sensor in accordance with an embodiment of the present invention.

FIG. 19 shows an embodiment of a six-DOF sensor 4900 used in conjunction with an optoelectronic system 2790. The optoelectronic system 2790 may be any device capable of measuring the six degrees of freedom of a six-DOF sensor 4900. In an embodiment, the optoelectronic system 2790 contains one or more cameras that view illuminated light sources of retroreflectors on the six-DOF sensor 4900. By noting the relative positions of the light source images on the one or more cameras, the three degrees of orientational freedom are found. Three additional degrees of freedom are found, for example, by using a distance meter and two angular encoders to find the three dimensional coordinates of the retroreflector 4910. In another embodiment, the three degrees of orientational freedom are found by sending a beam of light through a vertex of a cube corner retroreflector 4910 to a position detector, which might be a photosensitive array, to determine two degrees of freedom and by sending a polarized beam of light, which may be the same beam of light, through at least one polarizing beam splitter to determine a third degree of freedom. In a third embodiment, the optoelectronic assembly 2790 sends a pattern of light onto the six-DOF sensor 4900. In this embodiment, the interface component 4912 includes a plurality of linear position detectors, which may be linear photosensitive arrays, to detect the pattern and from this to determine the three degrees of orientational freedom of the six-DOF projector 2700. Many other optoelectronic systems 2790 are possible for determine the six degrees of freedom of the six-DOF projector 2700, as will be known to one of ordinary skill in the art. The six-DOF sensor 4900 includes a body 4914, one or more retroreflectors 4910, 4911, a sensor 4920, an optional source 4950, an optional electrical cable 4936, an optional battery 4934, an interface component 4912, an identifier element 4939, actuator buttons 4916, an antenna 4938, and an electronics circuit board 4932. The optional electrical cable 4936, the optional battery 4934, the interface component 4912, the identifier element 4939, the actuator buttons 4916, the antenna 4938, and the electronics circuit board 4932 of FIG. 18 correspond to the retroreflector 2010, the optional electrical cable 2046, the optional battery 2044, the interface component 2012, the identifier element 2049, actuator buttons 2016, the antenna 2048, and the electronics circuit board 2042, respectively, in FIG. 14. The descriptions for these corresponding elements are the same as discussed hereinabove and will not be repeated. Additional retroreflectors, such as retroreflector 4911, may be added to the first retroreflector 4910 to enable the laser tracker to track the six-DOF scanner from a variety of directions, thereby giving greater flexibility in the directions to which an object may be sensed by the six-DOF sensor 4900.

The sensor 4920 may be of a variety of types. For example, it may respond to optical energy in the infrared region of the spectrum, the light having wavelengths from 0.7 to 20 micrometers, thereby enabling determination of a temperature of an object surface at a point 4924. The sensor 4920 is configured to collect infrared energy emitted by the object 4960 over a field of view 4940, which is generally centered about an axis 4922. The three-dimensional coordinates of the point on the object surface corresponding to the measured surface temperature may be found by projecting the axis 4922 onto the object 4960 and finding the point of intersection 4924. To determine the point of intersection, the relationship between the object frame of reference and the device (tracker) frame of reference needs to be known, Alternatively, the relationship between the object frame of reference and the six-DOF sensor frame of reference may be known since the relationship between the tracker frame of reference and the sensor frame of reference is already known. Alternatively, the relationship between the object frame of reference and the six-DOF sensor frame of reference may be known since the relationship between the tracker frame of reference and the six-DOF sensor is already known from measurements performed by the tracker on the six-DOF sensor. One way to determine the relationship between the object frame of reference and the tracker frame of reference is to measure the three-dimensional coordinates of three points on the surface of the object. By having information about the object in relation to the three measured points, all points on the object of the surface will be known. Information on the object in relation to the three measured points may be obtained, for example, from CAD drawings or from previous measurements made by any type of coordinate measurement device.

Besides measuring emitted infrared energy, the electromagnetic spectrum may be measured (sensed) over a wide range of wavelengths, or equivalently frequencies. For example, electromagnetic energy may be in the optical region and may include visible, ultraviolet, infrared, and terahertz regions. Some characteristics, such as the thermal energy emitted by the object according to the temperature of the object, are inherent in the properties of the object and do not require external illumination. Other characteristics, such as the color of an object, depend on background illumination and the sensed results may change according to the characteristics of the illumination, for example, in the amount of optical power available in each of the wavelengths of the illumination. Measured optical characteristics may include optical power received by an optical detector, and may integrate the energy a variety of wavelengths to produce an electrical response according to the responsivity of the optical detector at each wavelength.

In some cases, the illumination may be intentionally applied to the object by a source 4950. If an experiment is being carried out in which it is desired that the applied illumination be distinguished from the background illumination, the applied light may be modulated, for example, by a sine wave or a square wave. A lock-in amplifier or similar method can then be used in conjunction with the optical detector in the sensor 4920 to extract just the applied light.

Other examples of the sensing of electromagnetic radiation by the sensor 4940 include the sensing of X-rays at wavelengths shorter than those present in ultraviolet light and the sensing of millimeter-wave, microwaves, RF wave, and so forth are examples of wavelengths longer than those present in terahertz waves and other optical waves. X-rays may be used to penetrate materials to obtain information about interior characteristics of object, for example, the presence of defects or the presence of more than one type of material. The source 4950 may be used to emit X-rays to illuminate the object 4960. By moving the six-DOF sensor 4900 and observing the presence of a defect or material interface from a plurality of views, it is possible to determine the three-dimensional coordinates of the defect or material interface within the material. Furthermore, if a sensor 4940 is combined with a projector such as the projector 2720 in FIGS. 17 and 18, a pattern may be projected onto an object surface that indicates where repair work needs to be carried out to repair the defect.

In an embodiment, the source 4950 provides electromagnetic energy in the electrical region of the spectrum—millimeter-wave, microwave, or RF wave. The waves from the source illuminate the object 4960, and the reflected or scattered waves are picked up by the sensor 4920. In an embodiment, the electrical waves are used to penetrate behind walls or other objects. For example, such a device might be used to detect the presence of RFID tags. In this way, the six-DOF sensor 4900 may be used to determine the position of RFID tags located throughout a factory. Other objects besides RFID tags may also be located. For example, a source of RF waves or microwaves such as a welding apparatus emitting high levels of broadband electromagnetic energy that is interfering with computers or other electrical devices may be located using a six-DOF scanner.

In an embodiment, the source 4950 provides ultrasonic waves and the sensor 4920 is an ultrasonic sensor. Ultrasonic sensors may have an advantage over optical sensors when sensing clear objects, liquid levels, or highly reflective or metallic surfaces. In a medical context, ultrasonic sensors may be used to localize the position of viewed features in relation to a patient's body. The sensor 4920 may be a chemical sensor configured to detect trace chemical constituents and provide a chemical signature for the detected chemical constituents. The sensor 4920 may be configured to sense the presence of radioactive decay, thereby indicating whether an object poses a risk for human exposure. The sensor 4920 may be configured to measure surface texture such as surface roughness, waviness, and lay. The sensor may be a profilometer, an interferometer, a confocal microscope, a capacitance meter, or similar device. A six-DOF scanner may also be used for measure surface texture. Other object characteristics can be measured using other types of sensors not mentioned hereinabove.

Figure 19A:
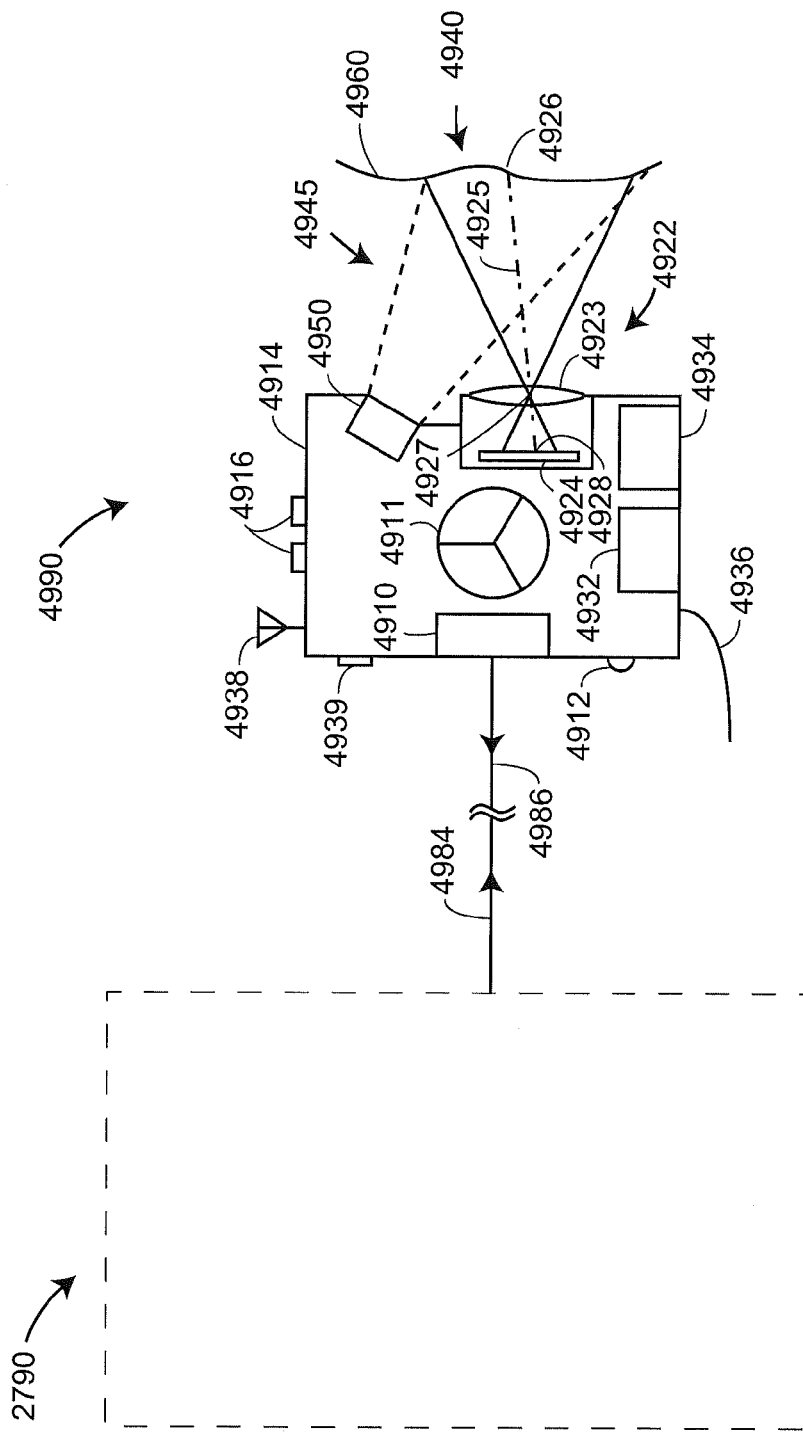
FIG. 19A is a block diagram of a six-DOF sensor in accordance with an embodiment of the present invention.

FIG. 19A shows an embodiment of a six-DOF sensor 4990 that is like the six-DOF sensor 4900 of FIG. 19 except that the sensor 4922 of the six-DOF sensor 4990 includes a lens 4923 and a photosensitive array 4924. An emitted or reflected ray of energy 4925 from within a field of view 4940 of the six-DOF sensor arises at a point 4926 on the object surface 4960, passes through a perspective center 4927 of sensor lens 4923 to arrive at a point 4928 on the photosensitive array 4924. A source 4950 may illuminate a region of the object surface 4960, thereby producing a response on the photosensitive array. Each point is associated with three-dimensional coordinates of the sensed characteristic on the object surface, each three-dimensional point determined by the three orientational degrees of freedom, the three translational degrees of freedom, the geometry of the camera and projector within the sensor assembly, and the position on the photosensitive array corresponding to the point on the object surface. An example of sensor 4922 is a thermal array sensor that responds by providing a temperature at a variety of pixels, each characteristic sensor value associated with a three-dimensional surface coordinate.

Figure 20:
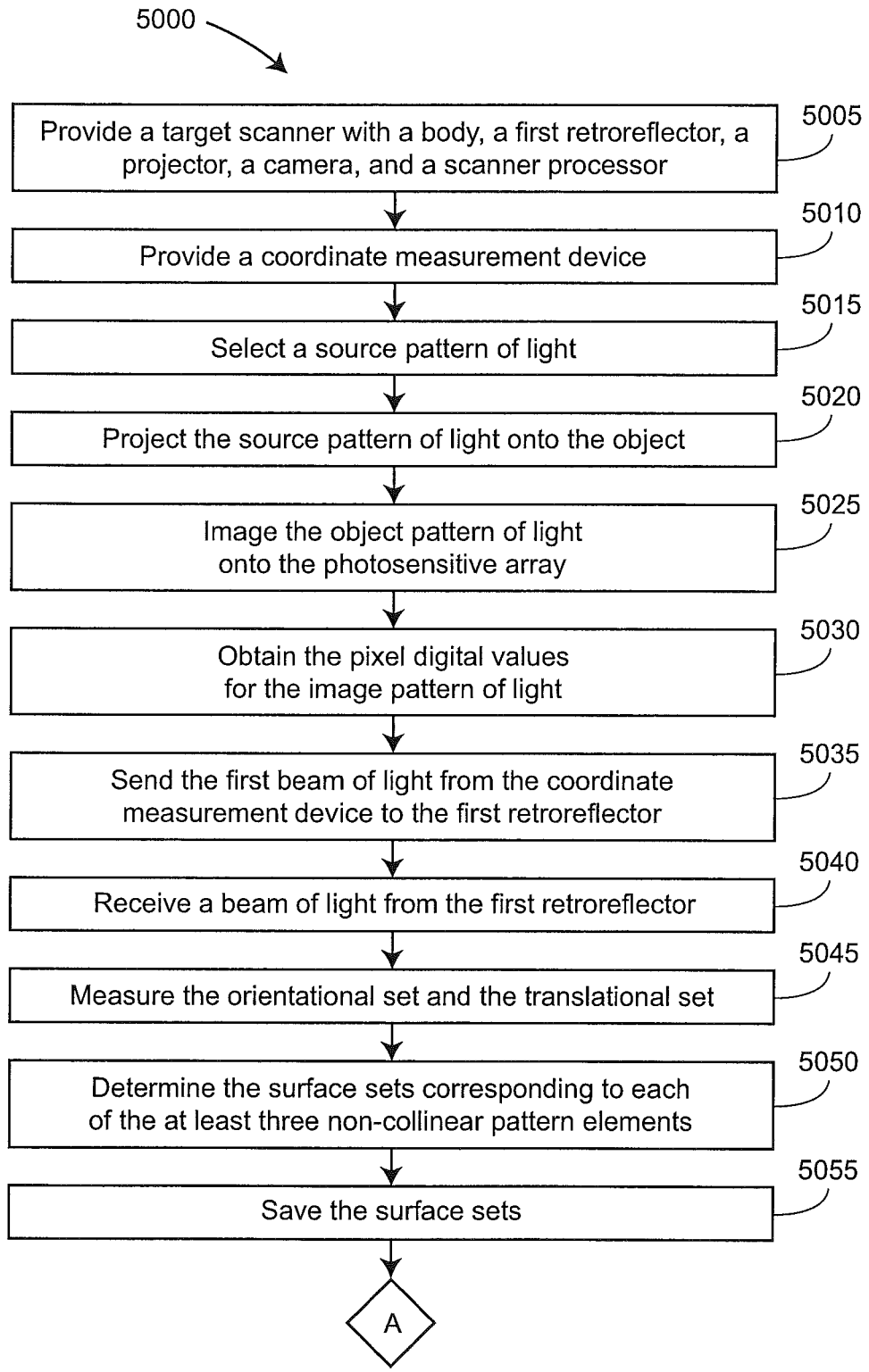
FIG. 20 is a flowchart of steps in a method of measuring three or more surface sets on an object surface with a coordinate measurement device and a target scanner according to an embodiment of the present invention.

FIG. 20 is a flowchart illustrating steps 5000 in a method of measuring three or more surface sets on an object surface with a coordinate measurement device and a target scanner, each of the three or more surface sets being three-dimensional coordinates of a point on the object surface in a device frame of reference, each surface set including three values, the device frame of reference being associated with the coordinate measurement device.

The step 5005 is to provide the target scanner with a body, a first retroreflector, a projector, a camera, and a scanner processor, wherein the first retroreflector, projector, and camera are rigidly affixed to the body, and the target scanner is mechanically detached from the coordinate measurement device. In this step, the projector includes a source pattern of light, the source pattern of light located on a source plane and including at least three non-collinear pattern elements, the projector is configured to project the source pattern of light onto the object to form an object pattern of light on the object, and each of the at least three non-collinear pattern elements correspond to at least one surface set. Also in this step, the camera includes a camera lens and a photosensitive array, the camera lens configured to image the object pattern of light onto the photosensitive array as an image pattern of light, the photosensitive array including camera pixels, the photosensitive array configured to produce, for each camera pixel, a corresponding pixel digital value responsive to an amount of light received by the camera pixel from the image pattern of light.

The step 5010 is to provide the coordinate measurement device, the coordinate measurement device configured to measure a translational set and an orientational set, the translational set being values of three translational degrees of freedom of the target scanner in the device frame of reference and the orientational set being values of three orientational degrees of freedom of the target scanner in the device frame of reference, the translational set and the orientational set being sufficient to define a position and orientation of the target scanner in space, the coordinate measurement device configured to send a first beam of light to the first retroreflector and to receive a second beam of light from the first retroreflector, the second beam of light being a portion of the first beam of light, the coordinate measurement device including a device processor, the device processor configured to determine the orientational set and the translational set, the translational set based at least in part on the second beam of light. Also in this step, the scanner processor and the device processor are jointly configured to determine the three or more surface sets, each of the surface sets based at least in part on the translational set, the orientational set, and the pixel digital values.

The step 5015 is to select the source pattern of light.

The step 5020 is to project the source pattern of light onto the object to produce the object pattern of light.

The step 5025 is to image the object pattern of light onto the photosensitive array to obtain the image pattern of light.

The step 5030 is to obtain the pixel digital values for the image pattern of light.

The step 5035 is to send the first beam of light from the coordinate measurement device to the first retroreflector.

The step 5040 is to receive the second beam of light from the first retroreflector.

The step 5045 is to measure the orientational set and the translational set, the translational set based at least in part on the second beam of light.

The step 5050 is to determine the surface sets corresponding to each of the at least three non-collinear pattern elements.

The step 5055 is to save the surface sets. The method 5000 concludes with marker A.

Figure 21:
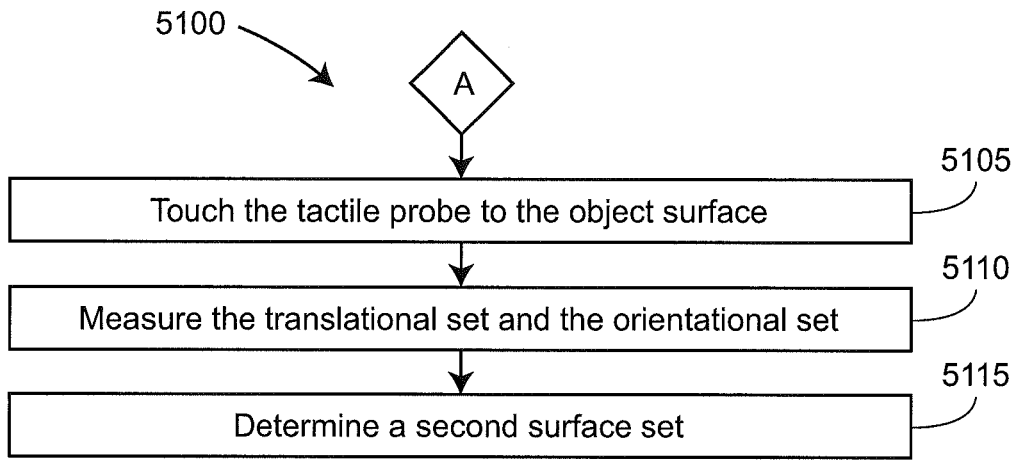
FIG. 21 is a flowchart of steps in a method that follows on marker A in FIG. 20.

FIG. 21 is a flowchart illustrating steps 5100 in a method that follows on marker A of FIG. 20.

A step 5105 is to touch the tactile probe to the object surface.

A step 5110 is to measure the translational set and the orientational set.

A step 5115 is to determine a second surface set based at least in part on the translational set and the orientational set.

Figure 22:
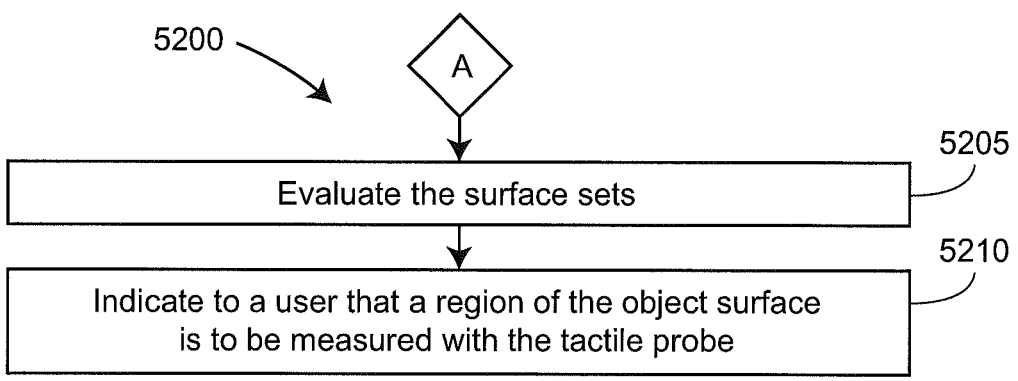
FIG. 22 is a flowchart of steps in a method that follows on marker A in FIG. 20.

FIG. 22 is a flowchart illustrating steps 5200 in a method that follows on marker A of FIG. 20. A step 5205 is to evaluate the surface sets. A step 5210 is to indicate to a user that a region of the object surface is to be measured with the tactile probe based at least in part on the evaluated surface sets.

Figure 23:
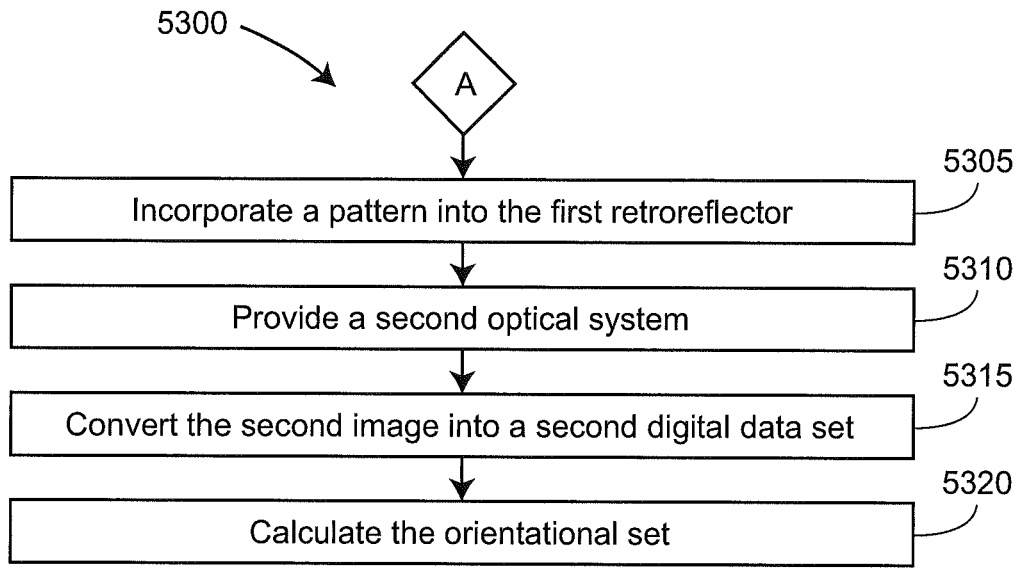
FIG. 23 is a flowchart of steps in a method that follows on marker A in FIG. 20.

FIG. 23 is a flowchart illustrating steps 5300 in a method that follows on marker A of FIG. 20. A step 5305 is to incorporate a pattern into the first retroreflector. A step 5310 is to provide a second optical system including a second lens and a second photosensitive array, the second lens configured to form a second image of at least a portion of the first retroreflector on the second photosensitive array. A step 5315 is to convert the second image into a second digital data set. The step 5320 is to calculate the orientational set based at least in part on the second digital data set.

Figure 24:
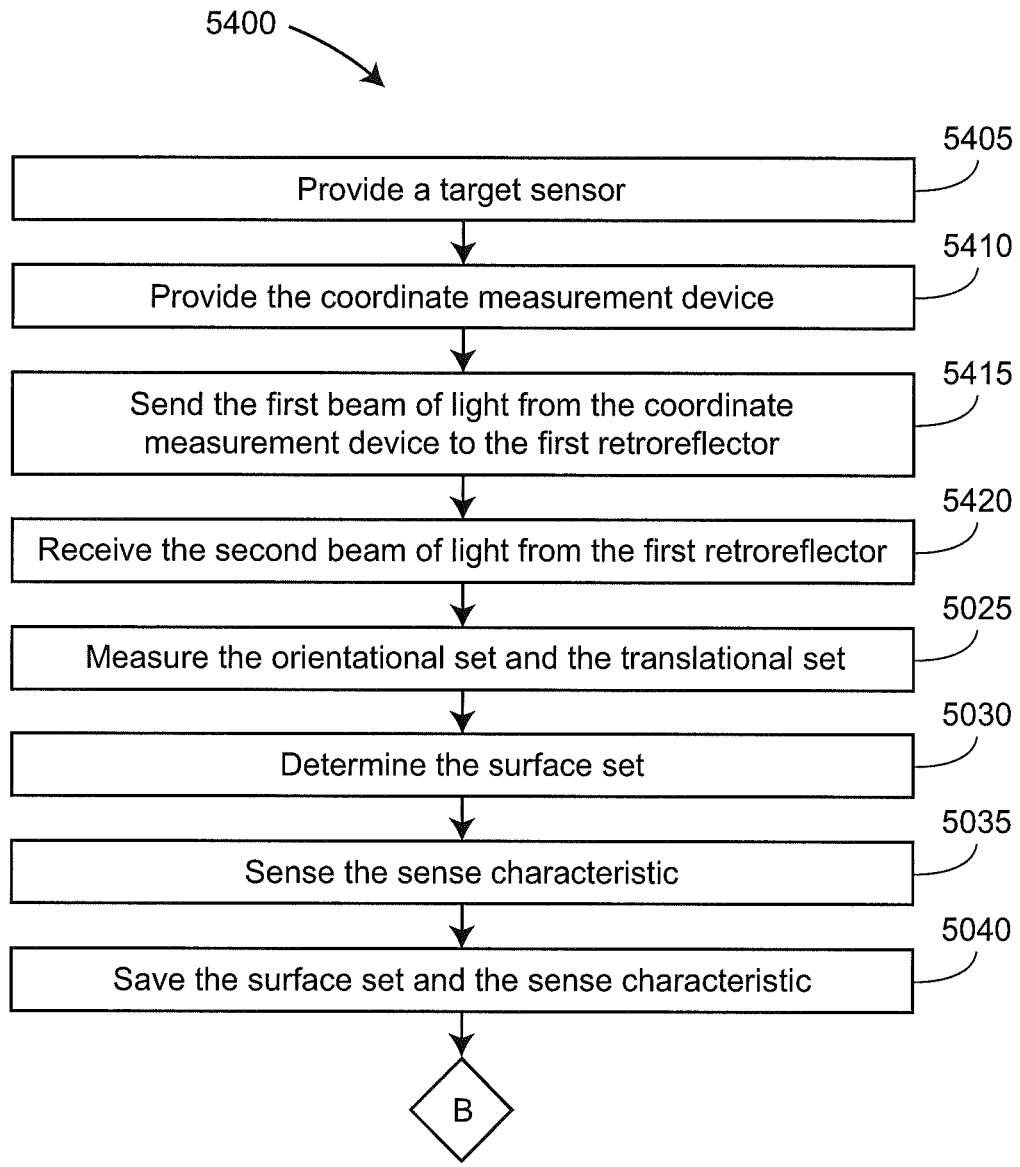
FIG. 24 is a flowchart of steps in a method of measuring with a coordinate measurement device and a target sensor a sense characteristic and a surface set associated with the sense characteristic according to an embodiment of the present invention.

FIG. 24 is a flowchart illustrating steps 5400 in a method of measuring with a coordinate measurement device and a target sensor a sense characteristic and a surface set associated with the sense characteristic, the surface set being three-dimensional coordinates of a point on the object surface in a device frame of reference, each surface set including three values, the device frame of reference being associated with the coordinate measurement device.

The step 5405 is to provide the target sensor having a body, a first retroreflector, a sensor, and a sensor processor, wherein the first retroreflector and the sensor are rigidly affixed to the body, and the target sensor is mechanically detached from the coordinate measurement device, the target sensor configured to measure the sense characteristic, the sense characteristic being a value associated with a quantity measured by the sensor.

The step 5410 is to provide the coordinate measurement device, the coordinate measurement device configured to measure a translational set and an orientational set, the translational set being values of three translational degrees of freedom of the target sensor in the device frame of reference and the orientational set being values of three orientational degrees of freedom of the target sensor in the device frame of reference, the translational set and the orientational set being sufficient to define a position and orientation of the target sensor in space, the coordinate measurement device configured to send a first beam of light to the first retroreflector and to receive a second beam of light from the first retroreflector, the second beam of light being a portion of the first beam of light, the coordinate measurement device including a device processor, the device processor configured to determine the orientational set and the translational set, the translation set based at least in part on the second beam of light, wherein the sensor processor and the device processor are jointly configured to determine the sense characteristic and the surface set, the surface set based at least in part on the translational set and the orientational set.

The step 5415 is to send the first beam of light from the coordinate measurement device to the first retroreflector.

The step 5420 is to receive the second beam of light from the first retroreflector.

The step 5425 is to measure the orientational set and the translational set, the translational set based at least in part on the second beam of light.

The step 5430 is to determine the surface set.

The step 5435 is to sense the sense characteristic.

The step 5440 is to save the surface set and the sense characteristic. The method 5400 concludes at a marker B.

Figure 25:
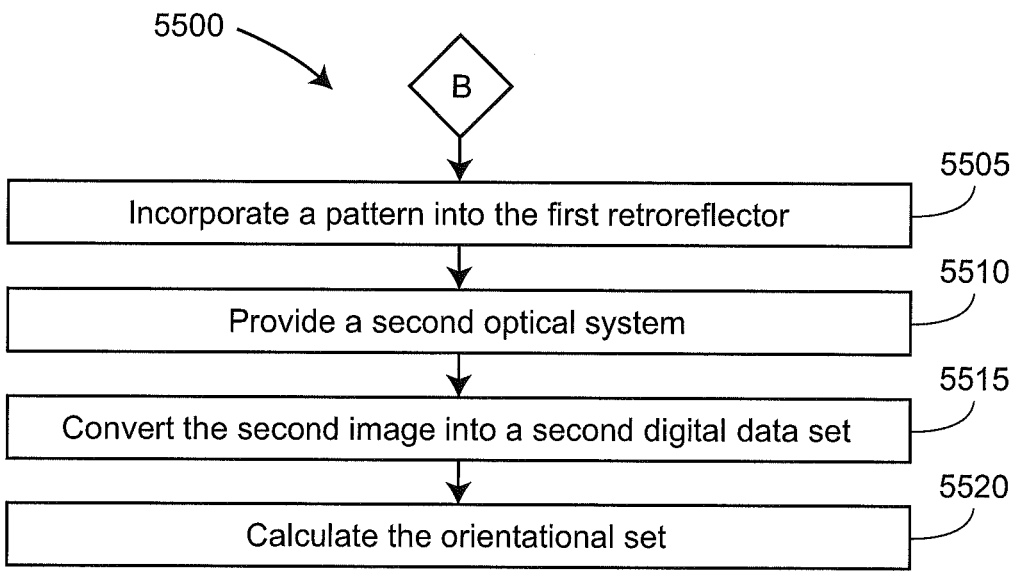
FIG. 25 is a flowchart of steps in a method that follows on marker B in FIG. 24.

FIG. 25 is a flowchart illustrating steps 5500 in a method that begins with the marker B of FIG. 24. A step 5505 is to incorporate a pattern into the first retroreflector.

A step 5510 is to provide an optical system including a second lens and a second photosensitive array, the second lens configured to form a second image of at least a portion of the patterned retroreflector on the second photosensitive array.

A step 5515 is to convert the second image into a second digital data set.

The step 5520 is to calculate the orientational set based at least in part on the second digital data set.

Figure 26:
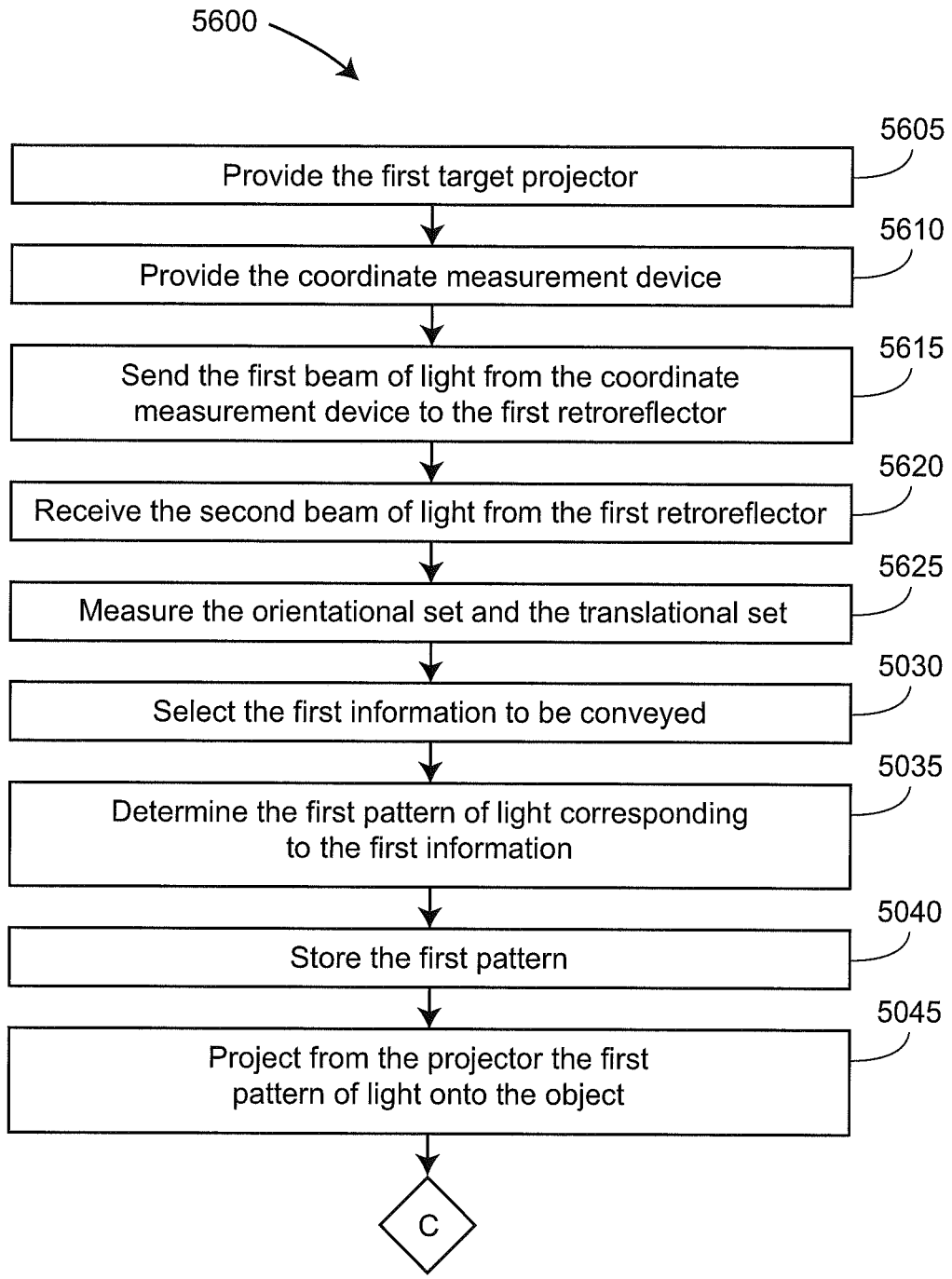
FIG. 26 is a flowchart of steps in a method of conveying first information to a user of a coordinate measurement device by projecting a first pattern with a first target projector according to an embodiment of the present invention.

FIG. 26 is a flowchart illustrating steps 5600 in a method of conveying first information to a user of a coordinate measurement device by projecting a first pattern with a first target projector.

The step 5605 is to provide the first target projector having a target-projector frame of reference and to include a body, a first retroreflector, and a projector, wherein the first retroreflector and projector are rigidly affixed to the body, the first target projector mechanically detached from the coordinate measurement device, the projector configured to project a pattern of light in two dimensions, the pattern of light forming a three-dimensional pattern of light when intercepted by a three-dimensional object.

The step 5610 is to provide the coordinate measurement device having a device frame of reference, the coordinate measurement device configured to measure a translational set and an orientational set, the translational set being values of three translational degrees of freedom of the first target projector in the device frame of reference and the orientational set being values of three orientational degrees of freedom of the first target projector in the device frame of reference, the translational set and the orientational set being sufficient to define a position and orientation of the first target projector in space, the coordinate measurement device configured to send a first beam of light to the first retroreflector and to receive a second beam of light from the first retroreflector, the second beam of light being a portion of the first beam of light, the coordinate measurement device including a device processor configured to determine the orientation set and the translational set, the translational set based at least in part on the second beam of light.

The step 5615 is to send the first beam of light from the coordinate measurement device to the first retroreflector.

The step 5620 is to receive the second beam of light from the first retroreflector.

The step 5625 is to measure the orientational set and translational set, the translational set based at least in part on the second beam of light.

The step 5630 is to select the first information to be conveyed, the first information selected from the group consisting of a position on the object, a plurality of positions on the object, a direction indicated by a moving pattern, a message that includes one or more symbols or alphanumeric characters, a hidden feature, a measured object characteristic, a modeled characteristic, a magnified representation of surface characteristics, a pattern having meaning according to a rule, and combinations thereof.

The step 5635 is to determine the first pattern of light corresponding to the first information.

The step 5640 is to store the first pattern.

The step 5645 is to project from the projector the first pattern of light onto the object based at least in part on the translational set and the orientational set. The method 5600 concludes at a marker C.

Figure 27:
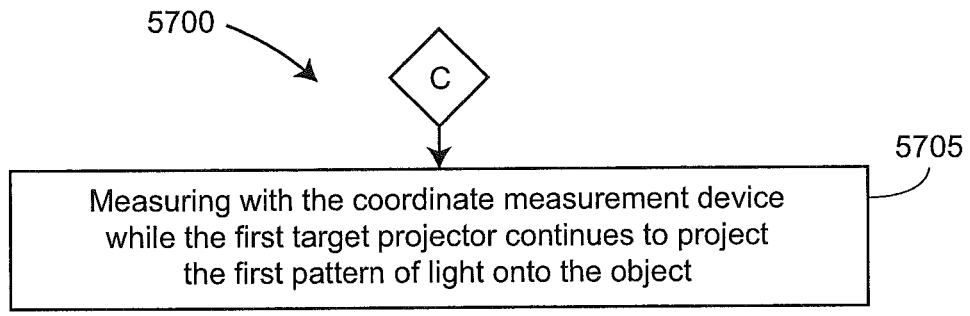
FIG. 27 is a flowchart of steps in a method that follows on marker C in FIG. 26.

FIG. 27 a flowchart illustrating steps 5700 in a method that begins with the marker C of FIG. 26. The step 5705 is to measure with the coordinate measurement device while the first target projector continues to project the first pattern of light onto the object.

Figure 28:
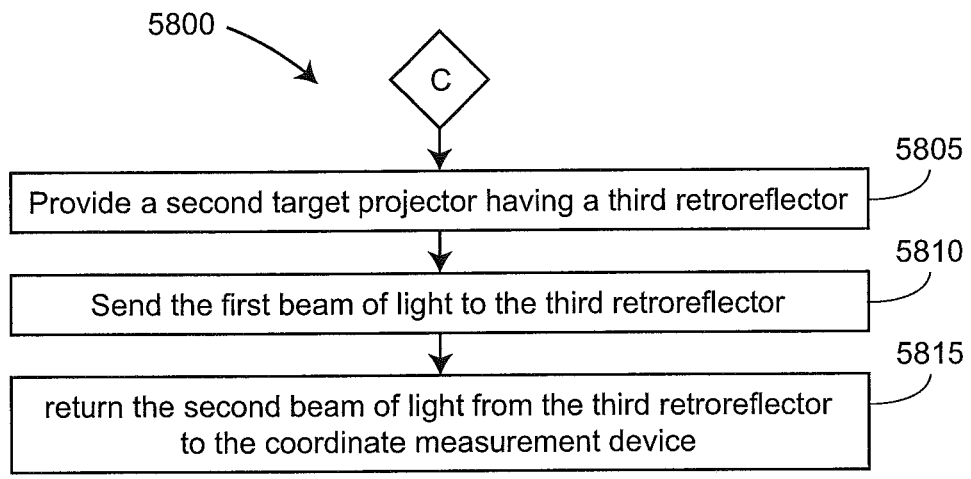
FIG. 28 is a flowchart of steps in a method that follows on marker C in FIG. 26.

FIG. 28 is a flowchart illustrating steps 5800 in a method that begins with the marker C of FIG. 26. The step 5805 is to provide a second target projector having a third retroreflector. The step 5810 is to send the first beam of light to the third retroreflector. The step 5815 is to return the second beam of light from the third retroreflector to the coordinate measurement device.

Figure 29:
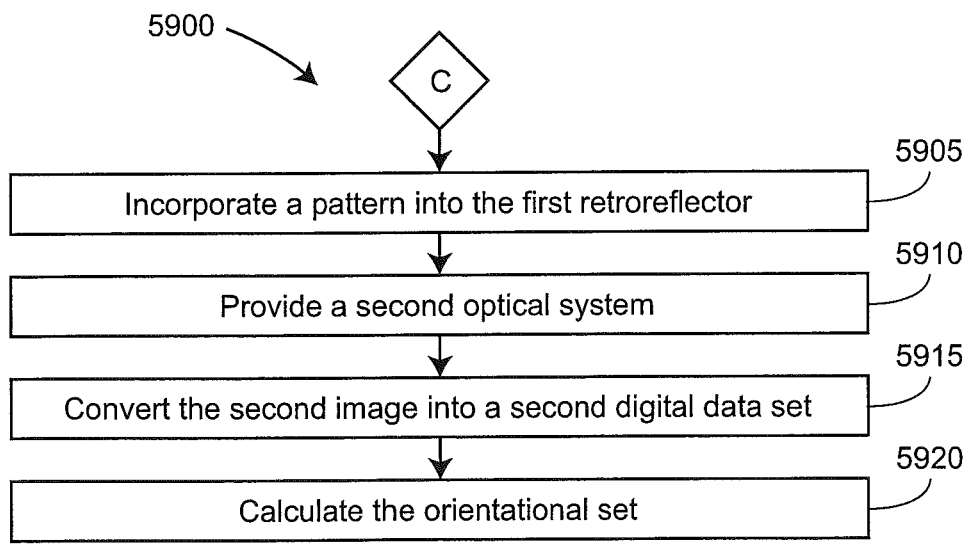
FIG. 29 is a flowchart of steps in a method that follows on marker C in FIG. 26.

FIG. 29 is a flowchart illustrating steps 5900 in a method that begins with a marker C of FIG. 26. The step 5905 is to incorporate a pattern into the first retroreflector. The step 5910 is to provide a second optical system. The step 5915 is to convert the second image into a second digital data set. The step 5920 is to calculate the orientational set based at least in part on the second digital data set.

Figure 30:
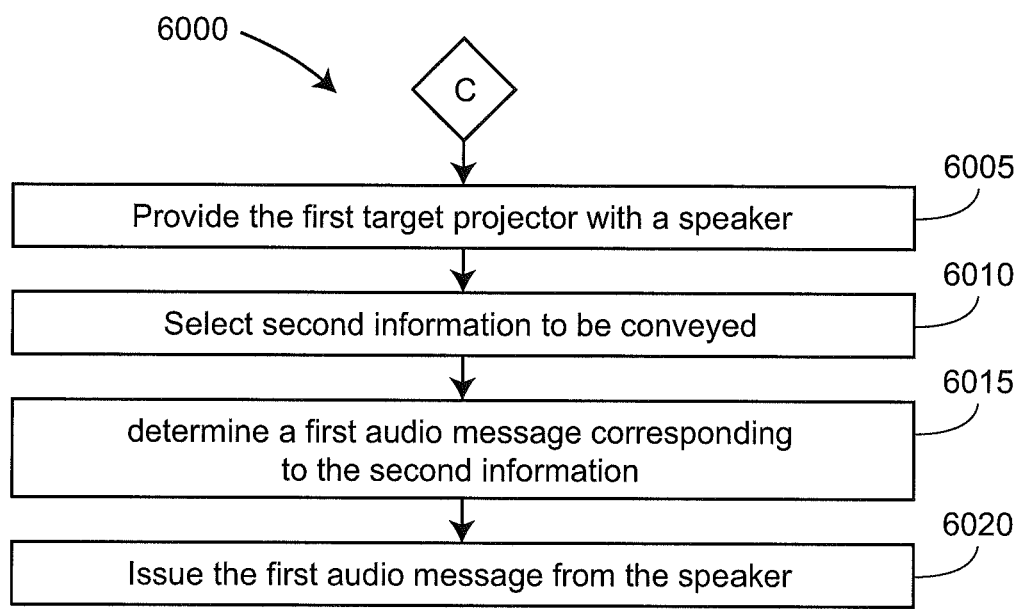
FIG. 30 is a flowchart of steps in a method that follows on marker C in FIG. 26.

FIG. 30 is a flowchart illustrating steps 6000 in a method that begins with the marker C of FIG. 26. The step 6005 is to provide the first target projector with a speaker. The step 6010 is to select second information to be conveyed. The step 6015 is to determine a first audio message corresponding to the second information. The step 6020 is to issue the first audio message from the speaker.

Figure 31:
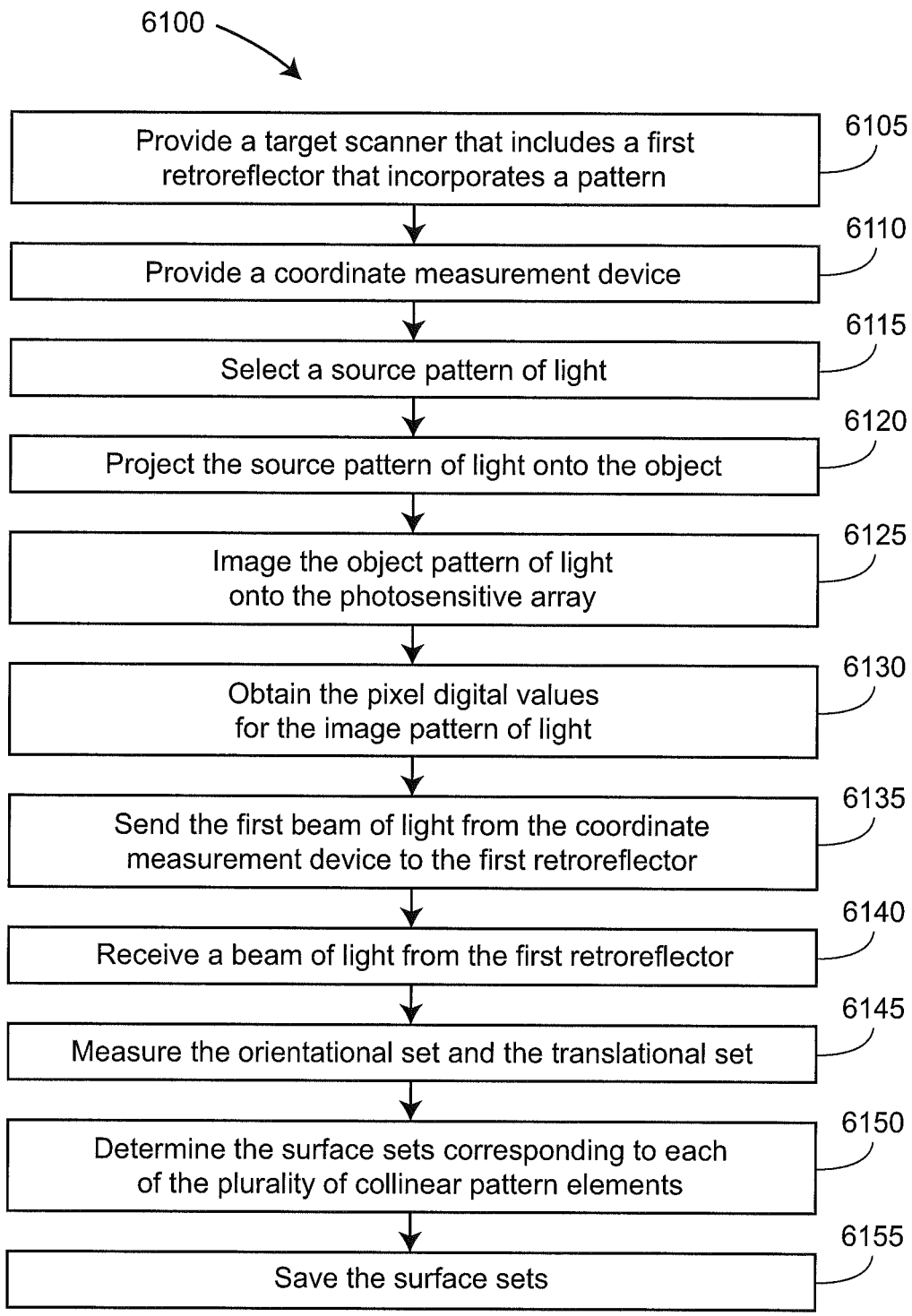
FIG. 31 is a flowchart of steps in a method to measure a plurality of surface sets on an object surface with a coordinate measurement device and a target scanner according to an embodiment of the present invention.

FIG. 31 is a flowchart illustrating steps 6100 to measure a plurality of surface sets on an object surface with a coordinate measurement device and a target scanner, each of the surface sets being three-dimensional coordinates of a point on the object surface in a device frame of reference, each surface set including three values, the device frame of reference being associated with the coordinate measurement device.

The step 6105 is to provide the target scanner having a body, a first retroreflector incorporating a pattern, a projector, a camera, and a scanner processor, wherein the first retroreflector, projector, and camera are rigidly affixed to the body, and the target scanner is mechanically detached from the coordinate measurement device, wherein the projector includes a source pattern of light, the source pattern of light located on a source plane and including a plurality of collinear pattern elements, the projector configured to project the source pattern of light onto the object to form an object pattern of light on the object, each of the pattern elements corresponding to at least one surface set, wherein the camera includes a first lens and a first photosensitive array, the first lens configured to image the object pattern of light onto the first photosensitive array as an image pattern of light, the first photosensitive array including camera pixels, the first photosensitive array configured to produce, for each camera pixel, a corresponding pixel digital value responsive to an amount of light received by the camera pixel from the image pattern of light.

The step 6110 is to provide the coordinate measurement device, the coordinate measurement device configured to measure a translational set and an orientational set, the translational set being values of three translational degrees of freedom of the target scanner in the device frame of reference and the orientational set being values of three orientational degrees of freedom of the target scanner in the device frame of reference, the translational set and the orientational set being sufficient to define a position and orientation of the target scanner in space, the coordinate measurement device configured to send a first beam of light to the first retroreflector and to receive a second beam of light from the first retroreflector, the second beam of light being a portion of the first beam of light, the coordinate measurement device including a device processor, the device processor configured to determine the orientational set and the translational set, the orientational set and the translational set based at least in part on the second beam of light, the coordinate measurement device including a second optical system, the second optical system including a second lens and a second photosensitive array, the second lens configured to form a second image of at least a portion of the first retroreflector on the second photosensitive array, the coordinate measurement device configured to convert the second image into a second digital data set and to calculate the orientational set based at least in part on the second digital data set, wherein the scanner processor and the device processor are jointly configured to determine the plurality of surface sets, each of the surface sets based at least in part on the translational set, the orientational set, and the pixel digital values.

The step 6115 is to select the source pattern of light.

The step 6120 is to project the source pattern of light onto the object to produce the object pattern of light.

The step 6125 is to image the object pattern of light onto the photosensitive array to obtain the image pattern of light.

The step 6130 is to obtain the pixel digital values for the image pattern of light.

The step 6135 is to send the first beam of light from the coordinate measurement device to the first retroreflector.

The step 6140 is to receive the second beam of light from the first retroreflector.

The step 6145 is to measure the orientational set and the translational set based at least in part on the second beam of light.

The step 6150 is to determine the surface sets corresponding to the plurality of collinear pattern elements.

The step 6155 is to save the surface sets.

Figure 32:
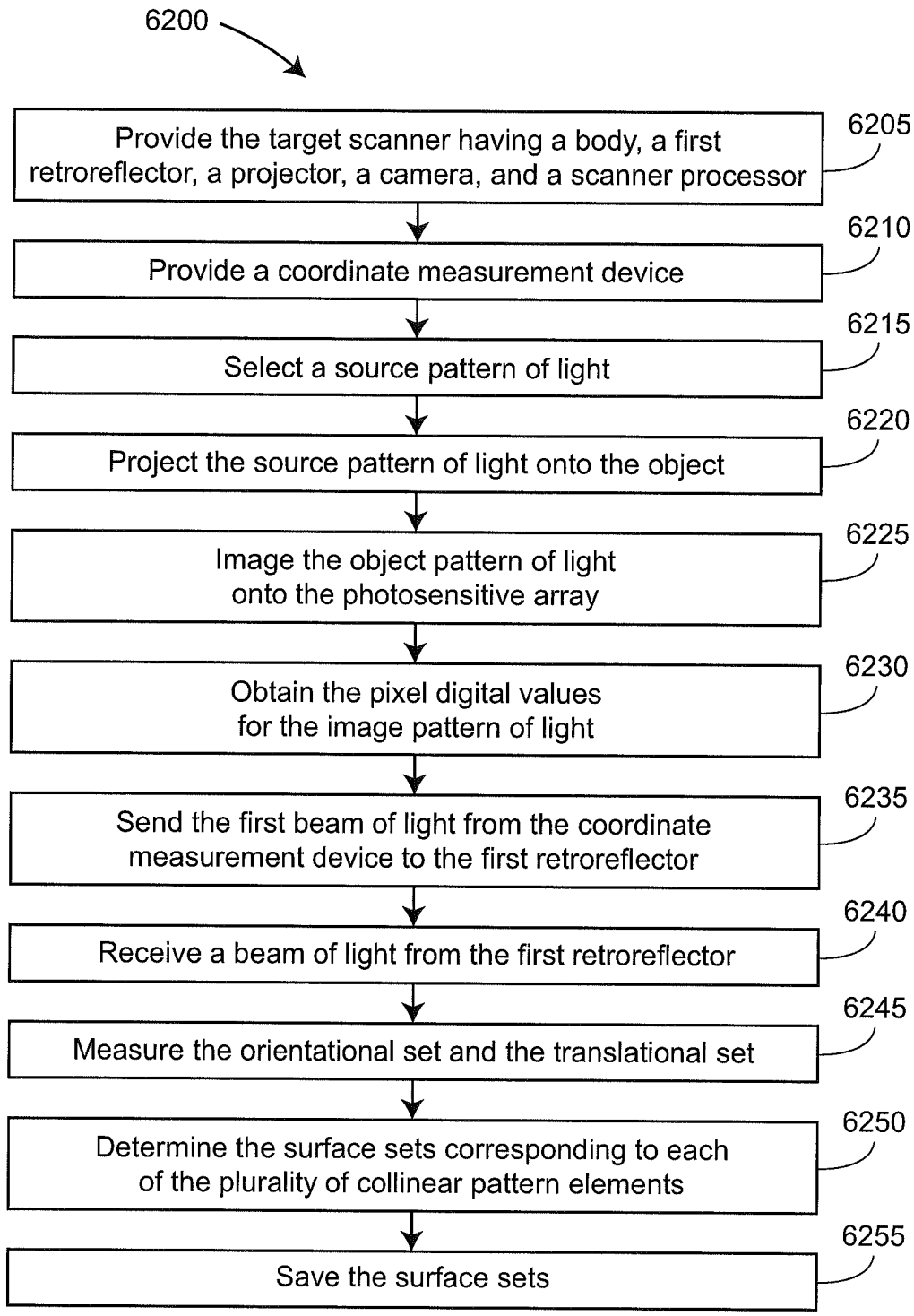
FIG. 32 is a flowchart of steps in a method to measure a plurality of surface sets on an object surface with a coordinate measurement device and a target scanner according to an embodiment of the present invention.

FIG. 32 is a flowchart illustrating steps 6200 to measure a plurality of surface sets on an object surface with a coordinate measurement device and a target scanner, each of the surface sets being three-dimensional coordinates of a point on the object surface in a device frame of reference, each surface set including three values, the device frame of reference being associated with the coordinate measurement device.

The step 6205 is to provide a target scanner having a body, a first retroreflector, a projector, a camera, and a scanner processor, wherein the first retroreflector, projector, and camera are rigidly affixed to the body, and the target scanner is mechanically detached from the coordinate measurement device, wherein the projector includes a source pattern of light, the source pattern of light located on a source plane and including a plurality of collinear pattern elements, the projector configured to project the source pattern of light onto the object to form an object pattern of light on the object, each of the pattern elements corresponding to at least one surface set, wherein the camera includes a first lens and a first photosensitive array, the first lens configured to image the object pattern of light onto the first photosensitive array as an image pattern of light, the first photosensitive array including camera pixels, the first photosensitive array configured to produce, for each camera pixel, a corresponding pixel digital value responsive to an amount of light received by the camera pixel from the image pattern of light.

The step 6210 is to provide the coordinate measurement device, the coordinate measurement device configured to measure a translational set and an orientational set, the translational set being values of three translational degrees of freedom of the target scanner in the device frame of reference and the orientational set being values of three orientational degrees of freedom of the target scanner in the device frame of reference, the translational set and the orientational set being sufficient to define a position and orientation of the target scanner in space, the coordinate measurement device configured to send a first beam of light to the first retroreflector and to receive a second beam of light from the first retroreflector, the second beam of light being a portion of the first beam of light, the coordinate measurement device including a device processor, the device processor configured to determine the orientational set and the translational set, the translational set based at least in part on the second beam of light, wherein the scanner processor and the device processor are jointly configured to determine the plurality of surface sets, each of the surface sets based at least in part on the translational set, the orientational set, and the pixel digital values.

The step 6215 is to select the source pattern of light.

The step 6220 is to project the source pattern of light onto the object to produce the object pattern of light.

The step 6225 is to image the object pattern of light onto the photosensitive array to obtain the image pattern of light.

The step 6230 is to obtain the pixel digital values for the image pattern of light.

The step 6235 is to send the first beam of light from the coordinate measurement device to the first retroreflector.

The step 6240 is to receive the second beam of light from the first retroreflector.

The step 6245 is to measure the orientational set and the translational set, the translational set based at least in part on the second beam of light.

The step 6250 is to determine the surface sets corresponding to the plurality of collinear pattern elements.

The step 6255 is to save the surface sets.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of conveying first information to a user of a coordinate measurement device by projecting a first pattern with a first target projector, the method comprising steps of:

providing the first target projector having a target-projector frame of reference and including a body, a first retroreflector, and a projector, wherein the first retroreflector and projector are rigidly affixed to the body, the first target projector mechanically detached from the coordinate measurement device, the projector configured to project a pattern of light in two dimensions, the pattern of light forming a three-dimensional pattern of light when intercepted by a three-dimensional object;

providing the coordinate measurement device having a device frame of reference, the coordinate measurement device including a first motor, a second motor, a first angle measuring device, a second angle measuring device, a distance meter, a position detector, a control system, and a device processor, the coordinate measurement device configured to send a first beam of light to the first retroreflector and to receive a second beam of light from the first retroreflector, the second beam of light being a portion of the first beam of light, the first motor and the second motor together configured to direct the first beam of light to a first direction, the first direction determined by a first angle of rotation about a first axis and a second angle of rotation about a second axis, the first angle of rotation produced by the first motor and the second angle of rotation produced by the second motor, the first angle measuring device configured to measure the first angle of rotation and the second angle measuring device configured to measure the second angle of rotation, the distance meter configured to measure a first distance from the coordinate measurement device to the first retroreflector, the distance meter being selected from the group consisting of an interferometer and an absolute distance meter, the position detector configured to receive a second portion of the second beam of light and to send a first signal to the control system, the first signal produced in response to a position of the second portion on the position detector, the control system configured to send a second signal to the first motor, to send a third signal to the second motor, and to adjust the first direction of the first beam of light to the position in space of the first retroreflector, the second signal and the third signal based at least in part on the first signal, the device processor configured to determine a translational set and an orientational set, the translational set being values of three translational degrees of freedom of the first target projector in the device frame of reference and the orientational set being values of three orientational degrees of freedom of the first target projector in the device frame of reference, the translational set and the orientational set substantially defining a position and orientation of the first target projector in space, the translational set based at least in part on the first distance, the first angle of rotation, and the second angle of rotation;

sending the first beam of light from the coordinate measurement device to the first retroreflector;

receiving by the coordinate measurement device the second beam of light from the first retroreflector;

determining by the device processor the orientational set and the translational set, the translational set based at least in part on the second beam of light;

selecting the first information to be conveyed, the first information selected from the group consisting of a position on the object, a plurality of positions on the object, a direction indicated by a moving pattern, a message that includes one or more symbols or alphanumeric characters, a hidden feature, a measured object characteristic, a modeled characteristic, a magnified representation of surface characteristics, a pattern having meaning according to a rule, and combinations thereof;

determining the first pattern of light corresponding to the first information;

storing the first pattern; and projecting from the projector the first pattern of light onto the object based at least in part on the translational set and the orientational set.

2. The method of claim 1, wherein the step of determining the first pattern of light further includes a step of determining a transformation relationship between an object frame of reference for the object and a frame of reference selected from the group consisting of the device frame of reference and the target-projector frame of reference.

3. The method of claim 2, wherein the step of determining the first pattern of light further includes measuring with the coordinate measurement device three dimensional coordinates of at least three non-collinear points on the object.

4. The method of claim 2, wherein:
the step of selecting the first information to be conveyed further includes selecting a first position on the object where an assembly operation is to be performed or a first plurality of positions on the object where an assembly operation is to be performed; and
the step of projecting from the projector the first pattern further includes projecting the first pattern to the first position or the first plurality of positions.

5. The method of claim 4, wherein, in the step of selecting the first information to be conveyed, the assembly operation to be performed is selected from the group consisting of drilling, scribing, removing surface material, adding surface material, attaching a component, applying adhesive, applying a coating, applying a label, cleaning, and combinations thereof.

6. The method of claim 2, wherein:
the step of selecting the first information to be conveyed further includes directing measurements with the dimensional measurement device; and
the step of projecting from the projector the first pattern further includes projecting a pattern of light in the direction at which a dimensional measurement is to be made.

7. The method of claim 1, wherein the step of selecting the first information to be conveyed further includes selecting a pattern having meaning according to a rule from among a plurality of rules, the plurality of rules configured to be available to the user in written or displayed form.

8. The method of claim 2, wherein:
the step of selecting the first information to be conveyed further includes selecting a hidden feature, the hidden feature obtained from drawings or measured data; and
the step of projecting from the projector the first pattern further includes projecting the first pattern over a portion of a first area, the first area being an area of the object for which the hidden feature information is available.

9. The method of claim 2, wherein:
the step of selecting the first information to be conveyed further includes selecting measured object characteristics that include measured error, the measured error taken as the difference between measured dimensional values and nominal or specified dimensional values; and
the step of projecting from the projector the first pattern further includes projecting the first pattern over a portion of a first area, the first area being an area of the object for which the measured object characteristics are available.

10. The method of claim 2, wherein:
the step of selecting the first information to be conveyed further includes selecting measured object characteristics, the measured object characteristic selected from the group consisting of temperature values, ultrasound values, microwave values, millimeter-wave values, X-ray values, radiological values, chemical sensing values, and combinations thereof; and
the step of projecting from the projector the first pattern further includes projecting the first pattern over a portion of a first area, the first area being an area of the object for which the measured object characteristics are available.

11. The method of claim 2, wherein:
the step of selecting the first information to be conveyed further includes selecting modeled characteristics, the modeled characteristics including values obtained from finite-element analysis; and
the step of projecting from the projector the first pattern onto the object further includes projecting the first pattern over a portion of a first area, the first area being an area of the object for which the modeled characteristics are available.

12. The method of claim 1, wherein the step of selecting the first information to be conveyed includes selecting the first information based at least in part on a gesture given by the user and detected and interpreted by the coordinate measurement device or by a computer attached to the coordinate measurement device.

13. The method of claim 1, wherein the step of providing the first target projector further includes providing a fixture rigidly attached to the body, the fixture stationary with respect to the device frame of reference.

14. A method of conveying first information to a user of a coordinate measurement device by projecting a first pattern with a first target projector, the method comprising steps of:
providing the first target projector having a target-projector frame of reference and including a body, a first retroreflector, and a projector, wherein the first retroreflector and projector are rigidly affixed to the body, the first target projector mechanically detached from the coordinate measurement device, the projector configured to project a pattern of light in two dimensions, the pattern of light forming a three-dimensional pattern of light when intercepted by a three-dimensional object;
sending the first beam of light from the coordinate measurement device to the first retroreflector;
receiving the second beam of light from the first retroreflector;
measuring the orientational set and the translational set, the translational set based at least in part on the second beam of light;
selecting the first information to be conveyed, the first information selected from the group consisting of a position on the object, a plurality of positions on the object, a direction indicated by a moving pattern, a message that includes one or more symbols or alphanumeric characters, a hidden feature, a measured object characteristic, a modeled characteristic, a magnified representation of surface characteristics, a pattern having meaning according to a rule, and combinations thereof;

determining the first pattern of light corresponding to the first information;

storing the first pattern;

projecting from the projector the first pattern of light onto the object based at least in part on the translational set and the orientational set;

wherein the step of providing the first target projector further includes providing a fixture rigidly attached to the body, the fixture stationary with respect to the device frame of reference; and wherein the step of projecting from the projector the first pattern of light onto the object further includes continuing to project the first pattern of light onto the object when the coordinate measurement device no longer sends the first beam of light to the first retroreflector.

15. The method of claim 14, further including a step of measuring with the coordinate measurement device while the first target projector continues to project the first pattern of light onto the object.

16. The method of claim 14, further including:

providing a second target projector having a third retroreflector;

sending the first beam of light to the third retroreflector; and returning the second beam of light from the third retroreflector to the coordinate measurement device.

17. The method of claim 1, wherein the step of providing the first target projector further includes providing a movable carrier, the first target projector attached to the movable carrier.

18. The method of claim 17, wherein, in the step of providing the first target projector, the movable carrier is a robot.

19. The method of claim 2, wherein, in the step of providing the coordinate measurement device and the first target projector, the first target projector further includes a tactile probe configured to measure three-dimensional coordinates of a first point on a surface of the object, the measured three-dimensional coordinates based at least in part on the translational set and the orientational set.

20. The method of claim 19, wherein the step of projecting from the projector the first pattern of light onto the object further includes indicating a position to be measured on the object surface, the indication given by projecting the first pattern of light onto the object surface.

21. The method of claim 1, further including steps of:

incorporating a pattern into the first retroreflector;

providing a second optical system including a second lens and a second photosensitive array, the second lens configured to form a second image of at least a portion of the first retroreflector on the second photosensitive array;

converting the second image into a second digital data set; and calculating the orientational set based at least in part on the second digital data set.

22. The method of claim 1, further including steps of:

providing the first target projector with a speaker, the speaker configured to give audio messages;

selecting second information to be conveyed;

determining a first audio message corresponding to the second information; and issuing the first audio message from the speaker.

23. The method of claim 1, wherein:

the step of providing the first target projector further includes providing a second retroreflector rigidly attached to the body; and the step of measuring the translational set and the orientational set with the coordinate measurement device further includes rotating the first target projector to acquire the second retroreflector with the first beam of light from the coordinate measurement device.

24. The method of claim 2, wherein the step of providing the first target projector further includes providing a handle on the first target projector.

25. The method of claim 1, wherein:

the step of selecting the first information to be conveyed further includes selecting a magnified representation of surface characteristics, the magnified representation of surface characteristics obtained from measurements; and the step of projecting from the projector the first pattern onto the object further includes projecting the first pattern over a portion of a first area, the first area being an area of the object for which the magnified representation of surface characteristics is available.

* * * * *